US009088746B2

(12) United States Patent
Ikushima et al.

(10) Patent No.: US 9,088,746 B2
(45) Date of Patent: Jul. 21, 2015

(54) VIDEO DATA TRANSMITTER APPARATUS AND VIDEO DATA RECEIVER APPARATUS FOR TRANSMISSION SYSTEM USING MULTI-VALUE AMPLITUDE MODULATION

(71) Applicant: Panasonic Corporation, Osaka (JP)

(72) Inventors: Tsuyoshi Ikushima, Nara (JP); Osamu Shibata, Hyogo (JP); Hiroshi Tanaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/498,011

(22) Filed: Sep. 26, 2014

(65) Prior Publication Data

US 2015/0009410 A1  Jan. 8, 2015

Related U.S. Application Data

(63) Continuation of application No. PCT/JP2013/000994, filed on Feb. 21, 2013.

(30) Foreign Application Priority Data

Apr. 3, 2012  (JP) ................. 2012-084885

(51) Int. Cl.
*H04N 7/26* (2006.01)
*H04N 5/40* (2006.01)
*G09G 5/00* (2006.01)

(52) U.S. Cl.
CPC ... *H04N 5/40* (2013.01); *G09G 5/00* (2013.01)

(58) Field of Classification Search
CPC ... H04N 11/002; H04N 11/02; H04N 11/004; H04N 11/06; H04N 7/24; H04N 2007/243; H04N 2007/246; H04N 9/804; H04N 9/8042; H04N 9/808; H04N 9/8081; H04N 5/40; G09G 5/00

USPC ............... 348/724, 390.1, 426.1; 375/240.02, 375/240.25, 240.26; 386/326, 353–357
See application file for complete search history.

(56) References Cited

U.S. PATENT DOCUMENTS

| 4,907,081 | A | * | 3/1990 | Okamura et al. | ........ 375/240.01 |
| 5,014,127 | A | * | 5/1991 | Richards | .................... 348/384.1 |

(Continued)

FOREIGN PATENT DOCUMENTS

| JP | 64-81438 | 3/1989 |
| JP | 2004-531909 | 10/2004 |
| JP | 2008-257844 | 10/2008 |

OTHER PUBLICATIONS

International Preliminary Report on Patentability and Written Opinion of the International Searching Authority issued Oct. 16, 2014 in International (PCT) Application No. PCT/JP2013/000994.

(Continued)

*Primary Examiner* — Victor Kostak
(74) *Attorney, Agent, or Firm* — Wenderoth, Lind & Ponack, L.L.P.

(57) ABSTRACT

A video data transmitter apparatus generates and transmits a multi-value amplitude modulation signal by performing a multi-value amplitude modulation of a plurality of N bits per one symbol according to video data of a video signal or a color signal constituting the video signal, or a brightness signal and a color-difference signal. A data separator portion separates the video data into first to N-th pixel data, a difference calculator portion calculates (N−1) pieces of predetermined difference information based on the separated first to N-th pixel data, and a multi-value amplitude modulator portion performs a multi-value modulation so that predetermined N-bit data corresponds to a multi-value signal level closest to an intermediate level having an intermediate value between a maximum level and a minimum level of the multi-value signal level of the multi-value amplitude modulation signal.

29 Claims, 36 Drawing Sheets

(56) References Cited

U.S. PATENT DOCUMENTS

| | | | |
|---|---|---|---|
| 5,220,410 A * | 6/1993 | Wakeland et al. | 348/472 |
| 5,225,904 A * | 7/1993 | Golin et al. | 375/240.12 |
| 5,258,826 A * | 11/1993 | Wakeland et al. | 348/488 |
| 5,438,635 A * | 8/1995 | Richards | 382/232 |
| 5,960,193 A * | 9/1999 | Guttag et al. | 712/221 |
| 6,128,309 A * | 10/2000 | Tariki | 370/441 |
| 6,173,305 B1 * | 1/2001 | Poland | 708/650 |
| 6,370,193 B1 * | 4/2002 | Lee | 375/240.15 |
| 6,914,939 B1 * | 7/2005 | Boice et al. | 375/240.21 |
| 7,124,221 B1 | 10/2006 | Zerbe et al. | |
| 7,447,354 B2 * | 11/2008 | Sasaki et al. | 382/166 |
| 7,558,326 B1 * | 7/2009 | Lyle et al. | 375/244 |
| 2002/0048322 A1 * | 4/2002 | Yamamoto et al. | 375/240.12 |
| 2002/0054638 A1 * | 5/2002 | Hanamura et al. | 375/240.03 |
| 2002/0084962 A1 * | 7/2002 | Yamaguchi | 345/87 |
| 2003/0110444 A1 | 6/2003 | Sakagami et al. | |
| 2006/0092329 A1 * | 5/2006 | Noji | 348/607 |
| 2007/0103204 A1 * | 5/2007 | Egan et al. | 327/100 |
| 2008/0317116 A1 * | 12/2008 | Lee et al. | 375/240.01 |
| 2010/0172583 A1 * | 7/2010 | Shimauchi et al. | 382/166 |

OTHER PUBLICATIONS

International Preliminary Report on Patentability and Written Opinion of the International Searching Authority issued Oct. 16, 2014 in International (PCT) Application No. PCT/JP2013/000993.

International Search Report issued Mar. 26, 2013 in International (PCT) Application No. PCT/JP2013/000994.

International Search Report issued Mar. 26, 2013 in International (PCT) Application No. PCT/JP2013/000993.

* cited by examiner

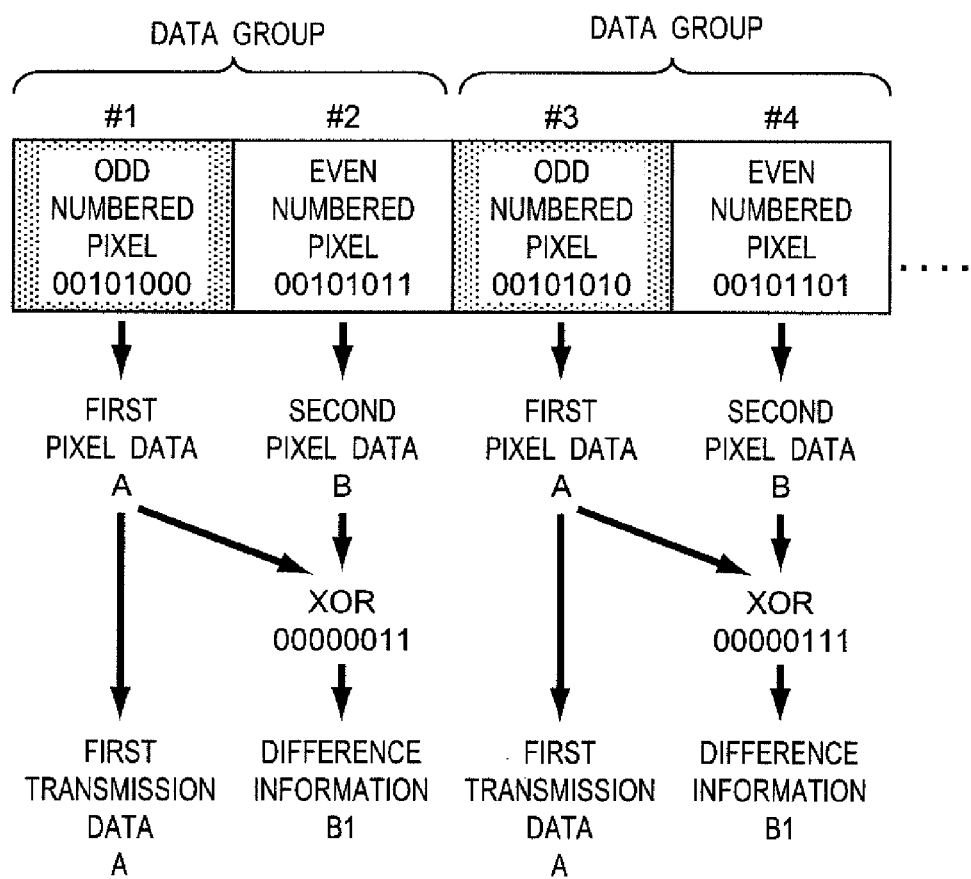

Fig.3A

| A | B1 | MULTI-VALUE SIGNAL LEVEL |
|---|----|--------------------------|
| 1 | 1  | +3 |
| 1 | 0  | +1 |
| 0 | 0  | −1 |
| 0 | 1  | −3 |

INTERMEDIATE LEVEL (between +1 and −1)

Fig.3B

| A | B1 | MULTI-VALUE SIGNAL LEVEL |
|---|----|--------------------------|
| 1 | 1  | +6 |
| 1 | 0  | +4 |
| 0 | 0  | +2 |
| 0 | 1  | 0  |

INTERMEDIATE LEVEL (between +4 and +2)

Fig.3C

| A | B1 | MULTI-VALUE SIGNAL LEVEL |
|---|----|--------------------------|
| 1 | 1  | 0  |
| 1 | 0  | −2 |
| 0 | 0  | −4 |
| 0 | 1  | −6 |

INTERMEDIATE LEVEL (between −2 and −4)

Fig.3D

| A | B1 | MULTI-VALUE SIGNAL LEVEL |
|---|----|--------------------------|
| 0 | 1  | +3 |
| 0 | 0  | +1 |
| 1 | 0  | −1 |
| 1 | 1  | −3 |

INTERMEDIATE LEVEL (between +1 and −1)

Fig.3E

| A | B1 | MULTI-VALUE SIGNAL LEVEL |
|---|----|--------------------------|
| 0 | 1  | +6 |
| 0 | 0  | +4 |
| 1 | 0  | +2 |
| 1 | 1  | 0  |

INTERMEDIATE LEVEL (between +4 and +2)

Fig.3F

| A | B1 | MULTI-VALUE SIGNAL LEVEL |
|---|----|--------------------------|
| 0 | 1  | 0  |
| 0 | 0  | −2 |
| 1 | 0  | −4 |
| 1 | 1  | −6 |

INTERMEDIATE LEVEL (between −2 and −4)

| A | B1 | C1 | MULTI-VALUE SIGNAL LEVEL |
|---|----|----|--------------------------|
| 1 | 1  | 1  | +7 |
| 1 | 1  | 0  | +5 |
| 1 | 0  | 1  | +3 |
| 1 | 0  | 0  | +1 |
| 0 | 0  | 0  | −1 |
| 0 | 0  | 1  | −3 |
| 0 | 1  | 0  | −5 |
| 0 | 1  | 1  | −7 |

— INTERMEDIATE LEVEL (between +1 and −1 rows)

Fig.7B

| A | B1 | C1 | MULTI-VALUE SIGNAL LEVEL |
|---|----|----|--------------------------|
| 0 | 1  | 1  | +7 |
| 0 | 1  | 0  | +5 |
| 0 | 0  | 1  | +3 |
| 0 | 0  | 0  | +1 |
| 1 | 0  | 0  | −1 |
| 1 | 0  | 1  | −3 |
| 1 | 1  | 0  | −5 |
| 1 | 1  | 1  | −7 |

— INTERMEDIATE LEVEL (between +1 and −1 rows)

Fig.10A

| A1 | B2 | MULTI-VALUE SIGNAL LEVEL |
|---|---|---|
| 1 | 1 | +3 |
| 1 | 0 | +1 |
| 0 | 0 | −1 |
| 0 | 1 | −3 |

INTERMEDIATE LEVEL (between rows 2 and 3)

Fig.10B

| A1 | B2 | MULTI-VALUE SIGNAL LEVEL |
|---|---|---|
| 1 | 1 | +6 |
| 1 | 0 | +4 |
| 0 | 0 | +2 |
| 0 | 1 | 0 |

INTERMEDIATE LEVEL (between rows 2 and 3)

Fig.10C

| A1 | B2 | MULTI-VALUE SIGNAL LEVEL |
|---|---|---|
| 1 | 1 | 0 |
| 1 | 0 | −2 |
| 0 | 0 | −4 |
| 0 | 1 | −6 |

INTERMEDIATE LEVEL (between rows 2 and 3)

Fig.10D

| A1 | B2 | MULTI-VALUE SIGNAL LEVEL |
|---|---|---|
| 0 | 1 | +3 |
| 0 | 0 | +1 |
| 1 | 0 | −1 |
| 1 | 1 | −3 |

INTERMEDIATE LEVEL (between rows 2 and 3)

Fig.10E

| A1 | B2 | MULTI-VALUE SIGNAL LEVEL |
|---|---|---|
| 0 | 1 | +6 |
| 0 | 0 | +4 |
| 1 | 0 | +2 |
| 1 | 1 | 0 |

INTERMEDIATE LEVEL (between rows 2 and 3)

Fig.10F

| A1 | B2 | MULTI-VALUE SIGNAL LEVEL |
|---|---|---|
| 0 | 1 | 0 |
| 0 | 0 | −2 |
| 1 | 0 | −4 |
| 1 | 1 | −6 |

INTERMEDIATE LEVEL (between rows 2 and 3)

*Fig.18*

| VIDEO DATA (PIXEL DATA) NUMERICAL VALUE | VIDEO DATA (PIXEL DATA) BIT VALUE |
|---|---|
| 0 | 00000000 |
| 1 | 00000001 |
| 2 | 00000011 |
| 3 | 00000010 |
| 4 | 00000110 |
| 5 | 00000111 |
| 6 | 00000101 |
| 7 | 00000100 |
| ⋮ | ⋮ |
| 40 | 00101100 |
| 41 | 00101101 |
| 42 | 00101111 |
| 43 | 00101110 |
| 44 | 00101010 |
| 45 | 00101011 |
| 46 | 00101001 |
| 47 | 00101000 |
| ⋮ | ⋮ |

Fig.26

| A | B | MULTI-VALUE SIGNAL LEVEL |
|---|---|---|
| 1 | 1 | +3 |
| 1 | 0 | +1 |
| 0 | 1 | −1 |
| 0 | 0 | −3 |

INTERMEDIATE LEVEL (between +1 and −1 rows)

*Fig.35A*

| A | B1 | MULTI-VALUE SIGNAL LEVEL | |
|---|---|---|---|
| 1 | 0 | +3 | |
| 1 | 1 | +1 | |
| 0 | 1 | −1 | INTERMEDIATE LEVEL |
| 0 | 0 | −3 | |

*Fig.35B*

| A | B1 | MULTI-VALUE SIGNAL LEVEL | |
|---|---|---|---|
| 1 | 0 | +6 | |
| 1 | 1 | +4 | |
| 0 | 1 | +2 | INTERMEDIATE LEVEL |
| 0 | 0 | 0 | |

*Fig.35C*

| A | B1 | MULTI-VALUE SIGNAL LEVEL | |
|---|---|---|---|
| 1 | 0 | 0 | |
| 1 | 1 | −2 | |
| 0 | 1 | −4 | INTERMEDIATE LEVEL |
| 0 | 0 | −6 | |

*Fig.35D*

| A | B1 | MULTI-VALUE SIGNAL LEVEL | |
|---|---|---|---|
| 0 | 0 | +3 | |
| 0 | 1 | +1 | |
| 1 | 1 | −1 | INTERMEDIATE LEVEL |
| 1 | 0 | −3 | |

*Fig.35E*

| A | B1 | MULTI-VALUE SIGNAL LEVEL | |
|---|---|---|---|
| 0 | 0 | +6 | |
| 0 | 1 | +4 | |
| 1 | 1 | +2 | INTERMEDIATE LEVEL |
| 1 | 0 | 0 | |

*Fig.35F*

| A | B1 | MULTI-VALUE SIGNAL LEVEL | |
|---|---|---|---|
| 0 | 0 | 0 | |
| 0 | 1 | −2 | |
| 1 | 1 | −4 | INTERMEDIATE LEVEL |
| 1 | 0 | −6 | |

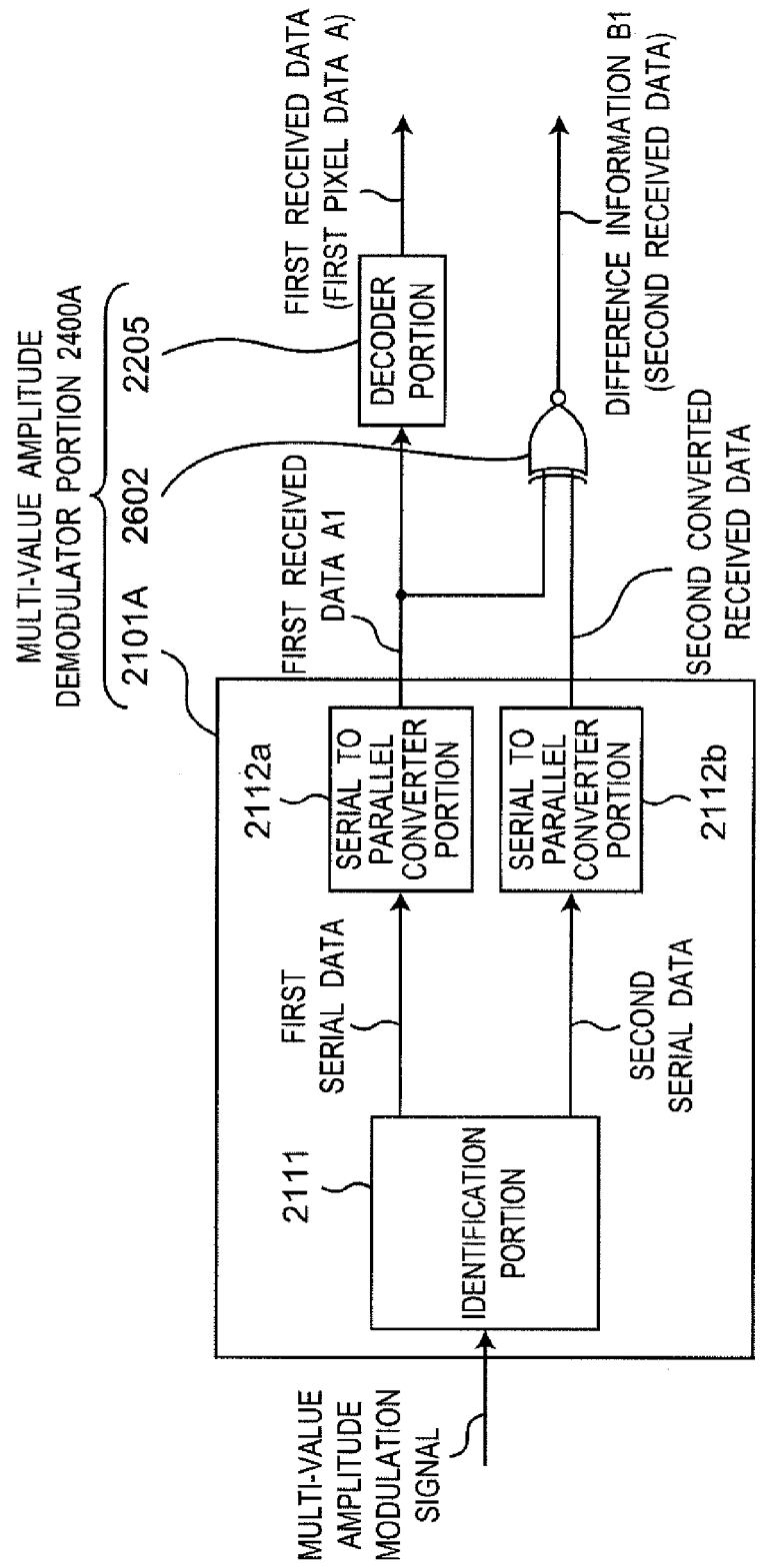

VIDEO DATA TRANSMITTER APPARATUS AND VIDEO DATA RECEIVER APPARATUS FOR TRANSMISSION SYSTEM USING MULTI-VALUE AMPLITUDE MODULATION

CROSS-REFERENCE TO RELATED APPLICATIONS

This is a continuation application of International Application No. PCT/JP2013/000994, with an international filing date of Feb. 21, 2013, which claims priority of Japanese Patent Application No. 2012-084885 filed on Apr. 3, 2012, the content of which is incorporated herein by reference.

BACKGROUND OF THE INVENTION

1. Technical Field

The technical field relates to a transmission technique of high-speed signal, and in particular, relates to a video data transmitter apparatus and a method therefor, and a video data receiver apparatus and a method therefor.

2. Description of Related Art

With high definition of video signals handled by AV apparatuses such as a television set or a recorder, an amount of data of the video signals increases, and therefore, a speed required for a data transmission among these apparatuses has been heightened. Therefore, it has been increasingly required to efficiently transmit large volumes of data within a limited bandwidth of a transmission line.

One of methods for transmitting more data with the transmission line of the limited bandwidth is a multi-value transmission. For example, in a multi-value amplitude modulation method of Patent Literature 1 of Japanese Patent Laid-open Publication No. JP2004-531909A, data of a plurality of bits are transmitted with one symbol by using voltage levels equal to or more than 4. For example, in the 4-value amplitude modulation method, a binary transmission is performed for one symbol, and therefore, the 4-value amplitude modulation method can transmit two times the amount of data of a binary transmission with the same bandwidth as that of the binary transmission, as compared with a case of the binary transmission. In this case, a case where non-compressed video data is transmitted using the 4-value amplitude modulation method will be described.

As illustrated in FIG. 25, video data constituting one frame is transmitted every horizontal line sequentially, normally from top to bottom, and data included in one line is transmitted sequentially from a pixel on the left of the one line. The data of each pixel is transmitted using one or a plurality of transmission lines. In case that the plurality of transmission lines are used, there is used such a method that one transmission line is allocated to each of R (red) signal, G (green) signal, and B (blue) signal, respectively, or that one transmission line is allocated to a brightness signal, and the other transmission line is allocated to a color-difference signal, etc. In this case, a case where data of each color signal included in one pixel is of 8-bit, where odd numbered bits are allocated to higher-order bit of the 4-value amplitude modulation signal, and where even numbered bits are allocated to low-order bit of the 4-value amplitude modulation signal will be described. A correspondence relationship between a multi-value signal level of a multi-value amplitude modulation signal and a value of pixel data to be inputted is set, for example, as illustrated in FIG. 26.

However, in a transmission system using the conventional multi-value amplitude modulation method as described above, it has been required to reduce a consumed power.

SUMMARY

One non-limiting and exemplary embodiment provides a video data transmitter apparatus and a method therefor, and a video data receiver apparatus and a method therefor, capable of reducing the consumed power.

According to a first aspect of the present disclosure, there is provided a video data transmitter apparatus configured to generate and transmit a multi-value amplitude modulation signal by performing a multi-value amplitude modulation of a plurality of N bits per one symbol according to video data of a video signal or a color signal constituting the video signal, or a brightness signal and a color-difference signal. The video data transmitter apparatus includes a data separator portion configured to separate the video data into first to N-th pixel data and a difference calculator portion configured to calculate (N−1) pieces of predetermined difference information based on the separated first to N-th pixel data. The video data transmitter apparatus includes a multi-value amplitude modulator portion configured to perform a multi-value modulation on the (N−1) pieces of predetermined difference information so that predetermined N-bit data corresponds to a multi-value signal level closest to an intermediate level having an intermediate value between a maximum level and a minimum level of the multi-value signal level of the multi-value amplitude modulation signal, when the first pixel data or data obtained by performing an encoding process on the first pixel data is allocated to a first bit of the multi-value amplitude modulation as first transmission data, and when the respective pieces of differential information or data obtained by adding one bit or a plurality of predetermined bits to the respective pieces of differential information are respectively allocated to second to N-th bits of the multi-value amplitude modulation as second to N-th transmission data. A predetermined first bit value of the predetermined N-bit data is allocated to the second to N-th bits, and an occurrence probability of the predetermined first bit value of the predetermined N-bit data is higher than that of a predetermined second bit value.

According to a second aspect of the present disclosure, there is provided a video data transmitter apparatus configured to generate and transmit a multi-value amplitude modulation signal by performing a multi-value amplitude modulation of a plurality of N bits per one symbol according to video data of a video signal or a color signal constituting the video signal, or a brightness signal and a color-difference signal. The video data transmitter apparatus includes a data separator portion configured to separate the video data into first to N-th pixel data and a difference calculator portion configured to calculate (N−1) pieces of predetermined difference information based on the separated first to N-th pixel data. The video data transmitter apparatus includes a multi-value amplitude modulator portion configured to perform a multi-value modulation on the (N−1) pieces of predetermined difference information so that predetermined N-bit data corresponds to a maximum level and a minimum level of the multi-value signal level of the multi-value amplitude modulation signal, when the first pixel data or data obtained by performing an encoding process on the first pixel data is allocated to a first bit of the multi-value amplitude modulation as first transmission data, and when the respective pieces of differential information or data obtained by adding one bit or a plurality of predetermined bits to the respective pieces of differential information are respectively allocated to second to N-th bits of the multi-value amplitude modulation as second to N-th transmission data. A predetermined second bit value of the predetermined N-bit data is allocated to the second to N-th bits, and an occurrence probability of the predetermined second bit value of the predetermined N-bit data is lower than that of a predetermined first bit value.

According to a third aspect of the present disclosure, there is provided a video data receiver apparatus configured to receive, demodulate, and restore a multi-value amplitude modulation signal transmitted by performing a multi-value amplitude modulation of a plurality of N bits per one symbol according to video data of a video signal or a color signal constituting the video signal, or a brightness signal and a color-difference signal. The video data receiver apparatus includes a multi-value amplitude demodulator portion configured to demodulate the multi-value amplitude modulation signal to first to N-th received data so that predetermined N-bits data corresponds to a multi-value signal level closest to an intermediate level having an intermediate value between a maximum level and a minimum level of the multi-value signal level of the multi-value amplitude modulation signal, when a first bit of the multi-value amplitude modulation is allocated to the first received data, and second to N-th bits of the multi-value amplitude modulation are allocated to the second to N-th received data. The video data receiver apparatus includes a restoring portion configured to restore to second to N-th pixel data based on the demodulated first received data and the second to N-th received data of (N−1) pieces of predetermined difference information. A predetermined first bit value of the predetermined N-bit data is allocated to the second to N-th bits, and an occurrence probability of the predetermined first bit value of the predetermined N-bit data is higher than that of a predetermined second bit value.

According to a fourth aspect of the present disclosure, there is provided a video data receiver apparatus configured to receive, demodulate, and restore a multi-value amplitude modulation signal transmitted by performing a multi-value amplitude modulation of a plurality of N bits per one symbol according to video data of a video signal or a color signal constituting the video signal, or a brightness signal and a color-difference signal. The video data receiver apparatus includes a multi-value amplitude demodulator portion configured to demodulate the multi-value amplitude modulation signal to first to N-th received data so that predetermined N-bits data corresponds to a multi-value signal level of a maximum level and a minimum level of the multi-value amplitude modulation signal, when a first bit of the multi-value amplitude modulation is allocated to the first received data, and second to N-th bits of the multi-value amplitude modulation are allocated to the second to N-th received data. The video data receiver apparatus includes a restoring portion configured to restore to second to N-th pixel data based on the demodulated first received data and the second to N-th received data of (N−1) pieces of predetermined difference information A predetermined second bit value of the predetermined N-bit data is allocated to the second to N-th bits, and an occurrence probability of the predetermined second bit value of the predetermined N-bit data is lower than that of a predetermined first bit value.

According to a fifth aspect of the present disclosure, there is provided a video data transmitter apparatus configured to generate and transmit a multi-value amplitude modulation signal by performing a multi-value amplitude modulation of a plurality of N bits per one symbol according to video data of a video signal or a color signal constituting the video signal, or a brightness signal and a color-difference signal. The video data transmitter apparatus includes a data separator portion configured to separate the video data into first to N-th pixel data, and a difference calculator portion configured to calculate (N−1) pieces of predetermined difference information by performing an operation including at least an exclusive-NOR based on the separated first to N-th pixel data. The video data transmitter apparatus includes a multi-value amplitude modulator portion configured to perform a multi-value modulation on the (N−1) pieces of predetermined difference information so that predetermined N-bit data corresponds to a multi-value signal level closest to an intermediate level having an intermediate value between a maximum level and a minimum level of the multi-value signal level of the multi-value amplitude modulation signal, when the first pixel data or data obtained by performing an encoding process on the first pixel data is allocated to a first bit of the multi-value amplitude modulation as first transmission data, and when the respective pieces of differential information or data obtained by adding one bit or a plurality of predetermined bits to the respective pieces of differential information are respectively allocated to second to N-th bits of the multi-value amplitude modulation as second to N-th transmission data. A predetermined first bit value of the predetermined N-bit data is allocated to the second to N-th bits, and an occurrence probability of the predetermined first bit value of the predetermined N-bit data is higher than that of a predetermined second bit value.

According to a sixth aspect of the present disclosure, there is provided a video data transmitter apparatus configured to generate and transmit a multi-value amplitude modulation signal by performing a multi-value amplitude modulation of a plurality of N bits per one symbol according to video data of a video signal or a color signal constituting the video signal, or a brightness signal and a color-difference signal. The video data transmitter apparatus includes a data separator portion configured to separate the video data into first to N-th pixel data, and a difference calculator portion configured to calculate (N−1) pieces of predetermined difference information by performing an operation including at least an exclusive-NOR based on the separated first to N-th pixel data. The video data transmitter apparatus includes a multi-value amplitude modulator portion configured to perform a multi-value modulation on the (N−1) pieces of predetermined difference information so that predetermined N-bit data corresponds to a maximum level and a minimum level of the multi-value signal level of the multi-value amplitude modulation signal, when the first pixel data or data obtained by performing an encoding process on the first pixel data is allocated to a first bit of the multi-value amplitude modulation as first transmission data, and when the respective pieces of differential information or data obtained by adding one bit or a plurality of predetermined bits to the respective pieces of differential information are respectively allocated to second to N-th bits of the multi-value amplitude modulation as second to N-th transmission data. A predetermined second bit value of the predetermined N-bit data is allocated to the second to N-th bits, and an occurrence probability of the predetermined second bit value of the predetermined N-bit data is lower than that of a predetermined first bit value.

These general and specific aspects may be implemented using a system, a method, a computer program, and any combination of systems, methods, and computer programs.

According to the video data transmitter apparatus and video data receiver apparatus of the present disclosure, it is possible to reduce a consumed power of a transmission system.

Additional benefits and advantageous effects of the disclosed embodiments will be apparent from the specification and Figures. The benefits and/or advantageous effects may be individually provided by the various embodiments and features of the specification and drawings disclosure, and need not all be provided in order to obtain one or more of the same.

BRIEF DESCRIPTION OF THE DRAWINGS

FIG. 2 is a flow chart showing a data process, when a number of bits of pixel data is 8 bits, inside the transmitter apparatus 1100 of FIG. 1.

FIG. 3A is a table showing a multi-value signal level arrangement of a multi-value amplitude modulation signal generated by a multi-amplitude modulator portion 1105 of the transmitter apparatus 1100 of FIG. 1 based on first pixel data A and difference information B1.

FIG. 3B is a table showing a modified embodiment of the multi-value signal level arrangement of the multi-value amplitude modulation signal generated by the multi-amplitude modulator portion 1105 of the transmitter apparatus 1100 of FIG. 1 based on the first pixel data A and the difference information B1.

FIG. 3C is a table showing a modified embodiment of the multi-value signal level arrangement of the multi-value amplitude modulation signal generated by the multi-amplitude modulator portion 1105 of the transmitter apparatus 1100 of FIG. 1 based on the first pixel data A and the difference information B1.

FIG. 3D is a table showing a modified embodiment of the multi-value signal level arrangement of the multi-value amplitude modulation signal generated by the multi-amplitude modulator portion 1105 of the transmitter apparatus 1100 of FIG. 1 based on the first pixel data A and the difference information B1.

FIG. 3E is a table showing a modified embodiment of the multi-value signal level arrangement of the multi-value amplitude modulation signal generated by the multi-amplitude modulator portion 1105 of the transmitter apparatus 1100 of FIG. 1 based on the first pixel data A and the difference information B1.

FIG. 3F is a table showing a modified embodiment of the multi-value signal level arrangement of the multi-value amplitude modulation signal generated by the multi-amplitude modulator portion 1105 of the transmitter apparatus 1100 of FIG. 1 based on the first pixel data A and the difference information B1.

FIG. 7A is a table showing a multi-value signal level arrangement of a multi-value amplitude modulation signal generated by a multi-amplitude modulator portion 1106 of the transmitter apparatus 1100A of FIG. 6 based on first pixel data A, difference information B1, and difference information C1.

FIG. 7B is a table showing a modified embodiment of the multi-value signal level arrangement of the multi-value amplitude modulation signal generated by the multi-amplitude modulator portion 1106 of the transmitter apparatus 1100A of FIG. 6 based on the first pixel data A, the difference information B1, and the difference information C1.

FIG. 10A is a table showing a multi-value signal level arrangement of a multi-value amplitude modulation signal generated by the multi-amplitude modulator portion 1105 of the transmitter apparatus 1200 of FIG. 9 based on first transmission data A1 and second transmission data B2.

FIG. 10B is a table showing a modified embodiment of the multi-value signal level arrangement of the multi-value amplitude modulation signal generated by the multi-amplitude modulator portion 1105 of the transmitter apparatus 1200 of FIG. 9 based on the first transmission data A1 and the second transmission data B2.

FIG. 10C is a table showing a modified embodiment of the multi-value signal level arrangement of the multi-value amplitude modulation signal generated by the multi-amplitude modulator portion 1105 of the transmitter apparatus 1200 of FIG. 9 based on the first transmission data A1 and the second transmission data B2.

FIG. 10D is a table showing a modified embodiment of the multi-value signal level arrangement of the multi-value amplitude modulation signal generated by the multi-amplitude modulator portion 1105 of the transmitter apparatus 1200 of FIG. 9 based on the first transmission data A1 and the second transmission data B2.

FIG. 10E is a table showing a modified embodiment of the multi-value signal level arrangement of the multi-value amplitude modulation signal generated by the multi-amplitude modulator portion 1105 of the transmitter apparatus 1200 of FIG. 9 based on the first transmission data A1 and the second transmission data B2.

FIG. 10F is a table showing a modified embodiment of the multi-value signal level arrangement of the multi-value amplitude modulation signal generated by the multi-amplitude modulator portion 1105 of the transmitter apparatus 1200 of FIG. 9 based on the first transmission data A1 and the second transmission data B2.

FIG. 18 is a table showing one example of a correspondence relationship between a numerical value and a bit value of video data, in a gray encode converter portion 1507 of FIG. 17.

FIG. 26 is a table showing a multi-value signal level arrangement of a multi-value amplitude modulation signal generated based on higher-order bits A of video data and low-order bits B of the video data.

FIG. 35A is a table showing a multi-value signal level arrangement of a multi-value amplitude modulation signal generated by the multi-amplitude modulator portion 1300A of the transmitter apparatus 1100D of FIG. 32 based on first pixel data A and difference information B1.

FIG. 35B is a table showing a modified embodiment of the multi-value signal level arrangement of the multi-value amplitude modulation signal generated by the multi-amplitude modulator portion 1300A of the transmitter apparatus 1100D of FIG. 32 based on first pixel data A and difference information B1.

FIG. 35C is a table showing a modified embodiment of the multi-value signal level arrangement of the multi-value amplitude modulation signal generated by the multi-amplitude modulator portion 1300A of the transmitter apparatus 1100D of FIG. 32 based on first pixel data A and difference information B1.

FIG. 35D is a table showing a modified embodiment of the multi-value signal level arrangement of the multi-value amplitude modulation signal generated by the multi-amplitude modulator portion 1300A of the transmitter apparatus 1100D of FIG. 32 based on first pixel data A and difference information B1.

FIG. 35E is a table showing a modified embodiment of the multi-value signal level arrangement of the multi-value amplitude modulation signal generated by the multi-amplitude modulator portion 1300A of the transmitter apparatus 1100D of FIG. 32 based on first pixel data A and difference information B1.

FIG. 35F is a table showing a modified embodiment of the multi-value signal level arrangement of the multi-value amplitude modulation signal generated by the multi-amplitude modulator portion 1300A of the transmitter apparatus 1100D of FIG. 32 based on first pixel data A and difference information B1.

FIG. 37 is a block diagram showing components of a multi-value amplitude demodulator portion 2400A of FIG. 36.

DETAILED DESCRIPTION

In general, in a transmission system using a multi-value amplitude modulation method, a maximum amplitude of the transmission system using the multi-value amplitude modulation method needs to be larger than that of a transmission system using a binary amplitude modulation method, for example, in order to secure the same SN ratio as that of the transmission system using the binary amplitude modulation method (for example, a transmission system using a 4-value amplitude modulation method has three times the maximum amplitude of the transmission system using the binary amplitude modulation method.). This leads to an increase of the necessary consumed power. In addition, with high definition of video signals, a difference between data of adjacent pixels is smaller, and therefore, there is much waste such as a continuous transmission of similar data.

According to a video data transmitter apparatus and a video data receiver apparatus of the present disclosure, N-bit data corresponds to a multi-value signal level closest to an intermediate level having an intermediate value between a maximum level and a minimum level of a multi-value signal level of a multi-value amplitude modulation signal, where a predetermined first bit value having a high occurrence probability is allocated to the N-bit data. Accordingly, for example, when the SN ratio equal to that of a binary transmission is to be secured, it is possible to reduce the consumed power of the transmission system.

In addition, it is possible to provide a video data transmitter apparatus and a method therefor, and a video data receiver apparatus and a method therefor, capable of reducing the waste such as a necessity of the continuous transmission of similar data, even if the difference between data of the adjacent pixels is smaller with the high definition of the video signals.

Embodiments of the present disclosure will be described below with reference to the drawings. It is noted that like components are denoted by the same reference signs in each of the embodiments described below.

First Embodiment

Figure 1:
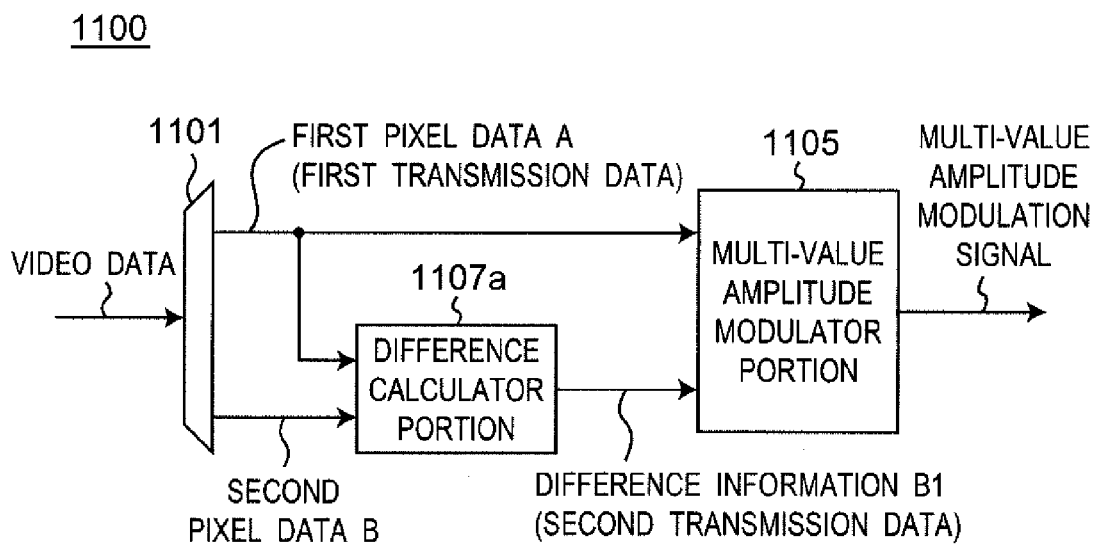
FIG. 1 is a block diagram showing a configuration of a transmitter apparatus 1100 for a transmission system using a 4-value amplitude modulation method according to a first embodiment of the present disclosure.

FIG. 1 is a block diagram showing a configuration of a transmitter apparatus 1100 of a transmission system using a 4-value amplitude modulation method, according to a first embodiment of the present disclosure. FIG. 1 is an example in the case where a number of multi-values is set to 4 (a binary transmission with one symbol), and a number of pixels included in one data group is set to 2.

Referring to FIG. 1, in a video data transmitter apparatus configured to generate and transmit a multi-value amplitude modulation signal by performing a multi-value amplitude modulation of a plurality of N bits per one symbol according to video data of a video signal or a color signal constituting the video signal, or a brightness signal and a color-difference signal, the video data transmitter apparatus transmits the video data, where first pixel data of a data group obtained by dividing the video data into N pixel data adjacent to each other is allocated to first bit such as a highest-order bit of the multi-value amplitude modulation, and difference information corresponding to second to N-th pixel data other than the first pixel data is respectively allocated to second to N-th bits other than the first bit of the multi-value amplitude modulation as second to N-th transmission data. In this case, the difference information represents the data difference between each of the pixels included in the data group. In particular, since the data difference between the adjacent pixels in high definition video data becomes smaller, for example, if the bit value is set to "0" when the data difference between the pixels is smaller, in the difference information between the adjacent pixel data, the occurrence probability of the bit value "0" is larger than that of the bit value "1". Accordingly, the bit value "0" of the difference information is allocated to a multi-value signal level closest to an intermediate level having an intermediate value between the maximum level and the minimum level of the multi-value signal level of the multi-value amplitude modulation signal generated by the transmitter apparatus 1100, and therefore, it is possible to lower an average signal amplitude of the multi-value amplitude modulation signal and to reduce the consumed power of the transmission system. It is noted that the video data means a video signal or a color signal constituting the video signal, or a brightness signal and a color-difference signal, and the pixel data means data corresponding to a pixel, or data of respective colors of a RGB signal in each of the pixels, or the brightness signal and the color-difference signal in each of the pixels, in the following descriptions.

Referring to FIG. 1, the transmitter apparatus 1100 is configured to include a data separator portion 1101 of data separator means, a difference calculator portion 1107a for calculating the difference of the pixel data outputted from the data separator portion 1101, and a multi-value amplitude modulator portion 1105.

Figure 25:
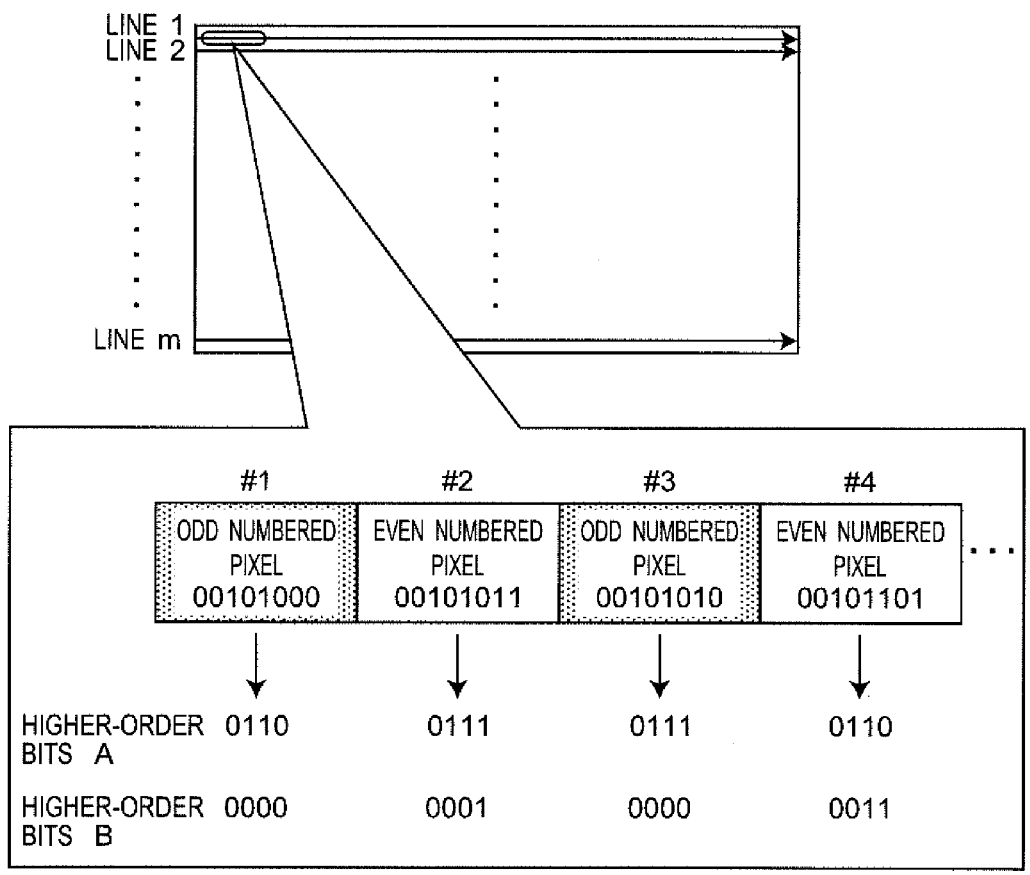
FIG. 25 is a diagram showing one example of an allocation of a video signal to a bit of the multi-value amplitude modulation signal.

Referring to FIG. 1, the data separator portion 1101 receives each 8-bit parallel video data of the RGB signal, separates the received video data into first pixel data A and second pixel data B adjacent to the first pixel data A, and outputs the first pixel data A to the difference calculator portion 1107a. Further, the data separator portion 1101 outputs the first pixel data A as first transmission data to the multi-value amplitude modulator portion 1105. Further, the data separator portion 1101 outputs the second pixel data B to the difference calculator portion 1107a. It is noted that pixels included in the same horizontal line (that is, which are adjacent to each other in a transverse direction) are set as one data group, as illustrated in FIG. 25.

Referring to FIG. 1, the difference calculator portion 1107a receives the first pixel data A and the second pixel data B, and calculates and outputs difference information B1 as second transmission data to the multi-value amplitude modulator portion 1105. That is, the difference calculator portion 1107a is difference calculator means configured to calculate the one difference information B1 based on the first pixel data A and the second pixel data B separated by the data separator portion 1101, and to output the difference information B1 as the second transmission data. In this case, the difference information B1 represents a difference between the first pixel data A and the second pixel data B, for example, the difference information B1 is obtained by performing an exclusive-OR operation, which compares the first pixel data A with the second pixel data B every bit, and if the bit value of the first pixel data A is identical with that of the second pixel data B, the difference information B1 has a bit value of "0". If the bit value of the first pixel data A is different from that of the second pixel data B, the difference information B1 has a bit value of "1".

Referring to FIG. 1, in case that the multi-value amplitude modulator portion 1105 allocates the first pixel data as the first transmission data to a first bit of the multi-value amplitude modulation, and allocates the difference information as the second transmission data to a second bit of the multi-value amplitude modulation, the multi-value amplitude modulator portion 1105 performs the multi-value amplitude modulation so that predetermined binary data corresponds to the multi-value signal level closest to the intermediate level having the intermediate value between the maximum level and the minimum level of the multi-value signal level of the multi-value amplitude modulation signal. The predetermined binary data is defined by such data that a predetermined first bit value "0" is allocated to the second bit of the predetermined binary data, where the occurrence probability of the predetermined first bit value "0" is larger than that of the predetermined second bit value "1".

In other words, in case that the first pixel data is allocated as the first transmission data to the first bit of the multi-value amplitude modulation, and the difference information is allocated as the second transmission data to the second bit of the multi-value amplitude modulation, the multi-value amplitude modulator portion 1105 performs a multi-value amplitude modulation so that the predetermined binary data corresponds to the maximum level and the minimum level of the multi-value signal level of the multi-value amplitude modulation signal. The predetermined binary data is defined by such data that the predetermined second bit value "1" is allocated to the second bit of the predetermined binary data, where the occurrence probability of the predetermined second bit value "1" is lower than that of the predetermined first bit value "0".

FIG. 2 is a flow chart showing a data process, when a number of bits of pixel data is 8 bits, inside the transmitter apparatus 1100 of FIG. 1. Referring to FIG. 2, the data separator portion 1101 of FIG. 1 separates the video data into the first pixel data A having a value of an odd numbered pixel #1 ("00101000" in binary notation) and the second pixel data B having a value of an even numbered pixel #2 ("00101011" in binary notation), every data group. Then, in the difference calculator portion 1107a of FIG. 1, for example, when the exclusive-OR operation between the first pixel data A and the second pixel data B is performed, the value of the last binary of the first pixel data A is different from that of the second pixel data B. Accordingly, the value of the difference information B1 becomes "00000011". Similarly, in the case of the data group comprising of the odd numbered pixel #3 and the even numbered pixel #4, the value of the difference information B1 becomes "00000111".

FIG. 3A is a table showing a multi-value signal level arrangement of a multi-value amplitude modulation signal generated by a multi-amplitude modulator portion 1105 of the transmitter apparatus 1100 of FIG. 1 based on first pixel data A and difference information B1. In this case, in the high definition video data, the data difference between the adjacent pixels is smaller. Accordingly, when the first pixel data A is compared with the second pixel data B, the number of bits having different values is smaller. For example, if the bit value is "0" when the data difference between pixels becomes smaller, in the difference information B1 representing a difference between adjacent pixel data, the occurrence probability of the bit value "0" is larger than that of the bit value "1". Accordingly, it is possible to increase the occurrence probability of the multi-value signal level closest to the intermediate level by allocating the bit value "0" to the multi-value signal levels (+1 and −1) closest to the intermediate level having the intermediate value between the maximum level (+3) and the minimum level (−3) of the multi-value signal level of the generated multi-value amplitude modulation signal. In other words, it is possible to lower the occurrence probability of the maximum level and the minimum level by allocating the bit value "1" to the maximum level (+3) and the minimum level (−3) of the multi-value signal level of the generated multi-value amplitude modulation signal. Accordingly, it is possible to lower the average signal amplitude of the multi-value amplitude modulation signal and to reduce the consumed power of the transmission system.

Figure 4:
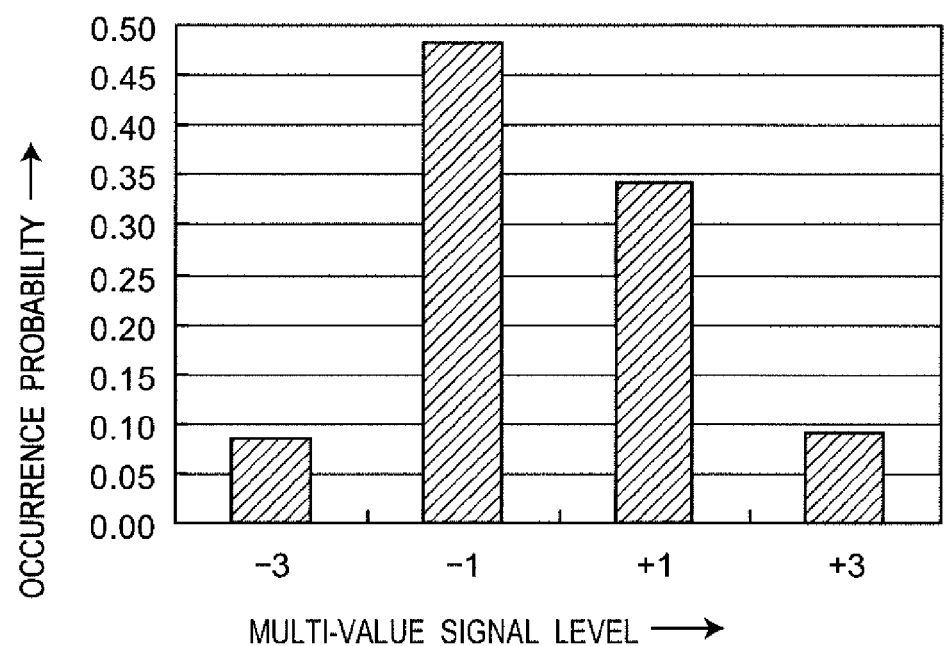
FIG. 4 is a graph showing an occurrence probability distribution of the multi-value signal level of the multi-value amplitude modulation signal of FIG. 3A of the transmitter apparatus 1100 of FIG. 1, which is obtained by a calculation.

FIG. 4 is a graph showing an occurrence probability distribution of the multi-value signal level of the multi-value amplitude modulation signal of FIG. 3A of the transmitter apparatus 1100 of FIG. 1, which is obtained by a calculation. Referring to FIG. 4, in fact, it is understood that the occurrence probability of the multi-value signal levels (the multi-value signal level +1 and the multi-value signal level −1) close to the intermediate level become larger.

Figure 5:
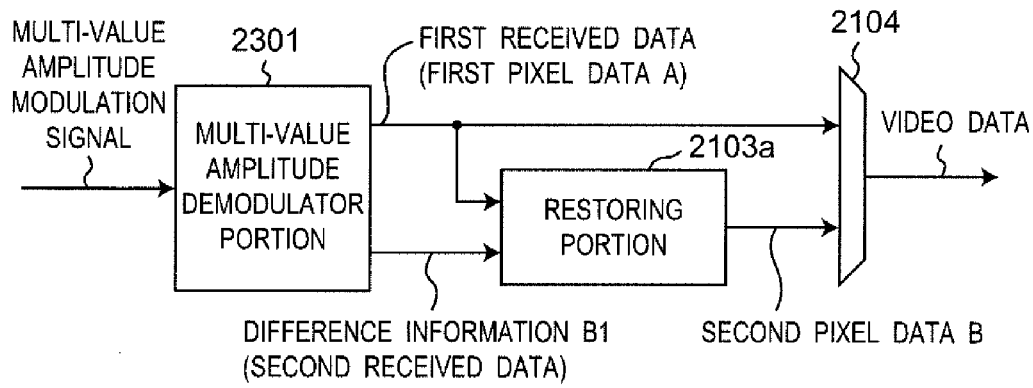
FIG. 5 is a block diagram showing a configuration of a receiver apparatus 2100 of the transmission system using the 4-value amplitude modulation method, according to the first embodiment of the present disclosure.

FIG. 5 is a block diagram showing a configuration of a receiver apparatus 2100 of the transmission system using the 4-value amplitude modulation method according to the first embodiment of the present disclosure. Referring to FIG. 5, the receiver apparatus 2100 restores received data corresponding to the first bit such as the highest-order bit or the most significant bit, to the first pixel data A, and restores received data corresponding to the second bit other than the first bit, to the second pixel data B, according to the video data of the video signal or the color signal constituting the video signal, or the brightness signal and the color-difference signal, where the received data is obtained by receiving and decoding the transmitted multi-value amplitude modulation signal obtained by performing the multi-value amplitude modulation of N bits per one symbol.

Referring to FIG. 5, the receiver apparatus 2100 is configured to include a multi-value amplitude demodulator portion 2301, a data coupler portion 2104, and a restoring portion 2103a. Referring to FIG. 5, the receiver apparatus 2100 performs a reverse process of the transmitter apparatus 1100. In the present embodiment, when the number of multi-values of the multi-value amplitude modulation is set to 4 (binary transmission by one symbol), and the number of pixels included in one data group is set to 2, a function of each portion of the receiver apparatus 2100 is described as follows.

Referring to FIG. 5, the multi-value amplitude demodulator portion 2301 receives and decodes the multi-value amplitude modulation signal transmitted from the transmitter apparatus 1100, outputs data corresponding to the first bit of the multi-value modulation as first received data to the restoring portion 2103a, and outputs data corresponding to bits other than the first bit of the multi-value amplitude modulation as the difference information B1 to the restoring portion 2103a. Further, the multi-value amplitude demodulator portion 2301 outputs the first received data as the first pixel data A to the data coupler portion 2104. That is, when the first bit of the multi-value amplitude modulation is allocated to the first received data and the second bit of the multi-value amplitude modulation is allocated to the second received data, the multi-value amplitude demodulator portion 2301 decodes the multi-value amplitude modulation signal to the first received data so that the predetermined binary data corresponds to the multi-value signal level closest to the intermediate level having the intermediate value between the maximum level and the minimum level of the multi-value signal level of the multi-value amplitude modulation signal. The predetermined binary data is defined by such data that the predetermined first bit value "0" is allocated to the second bit of the predetermined binary data, where the occurrence probability of the predetermined first bit value "0" is higher than that of the predetermined second bit value.

In other words, in case that the first bit of the multi-value amplitude modulation is allocated to the first received data and the second bit of the multi-value amplitude modulation is allocated to the second received data, the multi-value amplitude demodulator portion 2301 decodes the multi-value amplitude modulation signal to the first received data so that the predetermined binary data corresponds to the multi-value signal level of the maximum level and the minimum level of the multi-value signal level of the multi-value amplitude modulation signal. The predetermined binary data is defined by such data that the predetermined second bit value "1" is allocated to the second bit of the predetermined binary data, where the occurrence probability of the predetermined second bit value "1" is lower than that of the predetermined first bit value "0".

Referring to FIG. 5, for example, the restoring portion 2103a restores the first pixel data A and the difference information B1 to the second pixel data B by performing the exclusive-OR operation between the first pixel data A and the difference information B1, and outputs the second pixel data B to the data coupler portion 2104. In this case, the difference information B1 is the difference information B1 generated by the transmitter apparatus 1100. In the transmitter apparatus 1100, for example, the difference information B1 is calculated by performing the exclusive-OR operation between adjacent pixel data. Referring to FIG. 5, the data coupler portion 2104 inputs the first pixel data A and the second pixel data B, rearranges each of the pixel data to an original order, and outputs the same data as original video data.

According to the receiver apparatus 2100 of the present embodiment as described above, it is possible to receive the multi-value amplitude modulation signal transmitted from the transmitter apparatus 1100.

An operation and an action of the transmission system including the transmitter apparatus 1100 and the receiver apparatus 2100 using the multi-value amplitude modulation method, as configured as described above, are described as follows.

First of all, the transmission system of the present embodiment transmits data by allocating the first pixel data A to the first bit such as the highest-order bit or the most significant bit of the multi-value amplitude modulation as it is, and by allocating the difference information B1, which is calculated by performing an operation such as an exclusive-OR operation between the first pixel data A and the second pixel data B, to the second bit such as a lower bit of the multi-value amplitude modulation as data corresponding to the second pixel data B. In particular, it is possible to increase the occurrence probability of the multi-value signal level closest to the intermediate level by performing such a bit allocation that the bit value "0" of the difference information B1, where the occurrence probability of the bit value "0" thereof is large, is allocated to the multi-value signal level close to the intermediate level having the intermediate value between the maximum level and the minimum level of the multi-value amplitude modulation signal. In other words, it is possible to reduce the occurrence probability of the maximum level and the minimum level of the multi-value signal level of the multi-value amplitude modulation signal by allocating the bit value "1" of the difference information B1 to the maximum level and the minimum level of the multi-value signal level of the multi-value amplitude modulation signal, where the occurrence probability of the bit value "1" thereof is smaller. Accordingly, it is possible to lower the average amplitude of the multi-value amplitude modulation to be transmitted.

In addition, each of FIGS. 3B to 3F is a table showing a modified embodiment of the multi-value signal level arrangement of the multi-value amplitude modulation signal generated by the multi-amplitude modulator portion 1105 of the transmitter apparatus 1100 of FIG. 1 based on the first pixel data A and the difference information B1, and shows a modified embodiment of the present embodiment. The present modified embodiment can obtain the same advantageous effects as those of the first embodiment. Referring to FIGS. 3B and 3E, the bit value "0" is allocated to the multi-value signal level (+4 and +2) close to the intermediate level (+3) having the intermediate value between the maximum level (+6) and the minimum level (0) of the multi-value signal level of the generated multi-value amplitude modulation signal. In other words, the bit value "1" having a lower occurrence probability is allocated to the maximum level (+6) and the minimum level (0). Therefore, it is possible to lower the average signal amplitude of the multi-value amplitude modulation signal, and to reduce the consumed power of the transmission system. In addition, referring to FIG. 3C and FIG. 3F, the bit value "0" is allocated to the multi-value signal level (−2 and −4) close to the intermediate level (−3) having the intermediate value between the maximum level (0) and the minimum level (−6) of the multi-value signal level of the generated multi-value amplitude modulation signal. In other words, the bit value "1" having a lower occurrence probability is allocated to the maximum level (0) and the minimum level (−6). Therefore, it is possible to lower the average signal amplitude of the multi-value amplitude modulation signal, and to reduce the consumed power of the transmission system. In addition, FIG. 3D is configured in a manner similar to that of FIG. 3A. It is noted that FIG. 3D is obtained by inverting the bit values of the first pixel data A of FIG. 3A, FIG. 3E is obtained by inverting the bit values of the first pixel data A of FIG. 3B, and FIG. 3F is obtained by inverting the bit values of the first pixel data A of FIG. 3C.

According to each of the transmission systems of the embodiment and the modified embodiments thereof as described above, the transmission system transmits data by allocating the first pixel data A to the first bit such as the highest-order bit or the most significant bit of the multi-value amplitude modulation as it is, and by allocating the difference information B1, which is calculated by performing an operation such as the exclusive-OR operation between the first pixel data A and the second pixel data B, to bits other than the first bit of the multi-value amplitude modulation as data corresponding to the second pixel data B. In particular, the transmission system performs the multi-value amplitude modulation by allocating the bit value "0" of the difference information B1 having a larger occurrence probability to the multi-value signal level close to the intermediate level having the intermediate value between the maximum level and the minimum level of the signal level of the multi-value amplitude modulation signal. Accordingly, it is possible to secure the same SN ratio as that of the binary transmission, and to reduce the consumed power as compared with the conventional transmission system of the multi-value amplitude modulation method.

In addition, according to each of the transmission systems of the embodiment and the modified embodiments thereof as described above, the difference information between adjacent pixel data is calculated by the operation such as the exclusive-OR operation between the pixel data. Accordingly, it is possible to simplify a configuration and to reduce the consumed power as compared with the conventional transmission system of the multi-value amplitude modulation method. Further, it is possible to reduce the waste such as the continuous transmission of similar data.

Second Embodiment

In the first embodiment, the case where the number of multi-values is set to 4 (the binary transmission by one symbol) is described. However, the embodiment of the present disclosure is not limited thereto. For example, the number of multi-values can be set to a value other than 4. As an example, a configuration example in case where the number of multi-values is set to 8 (a 3-bit transmission by one symbol) will be described. In this case, a number of pixels included in one data group is set to 3.

Figure 6:
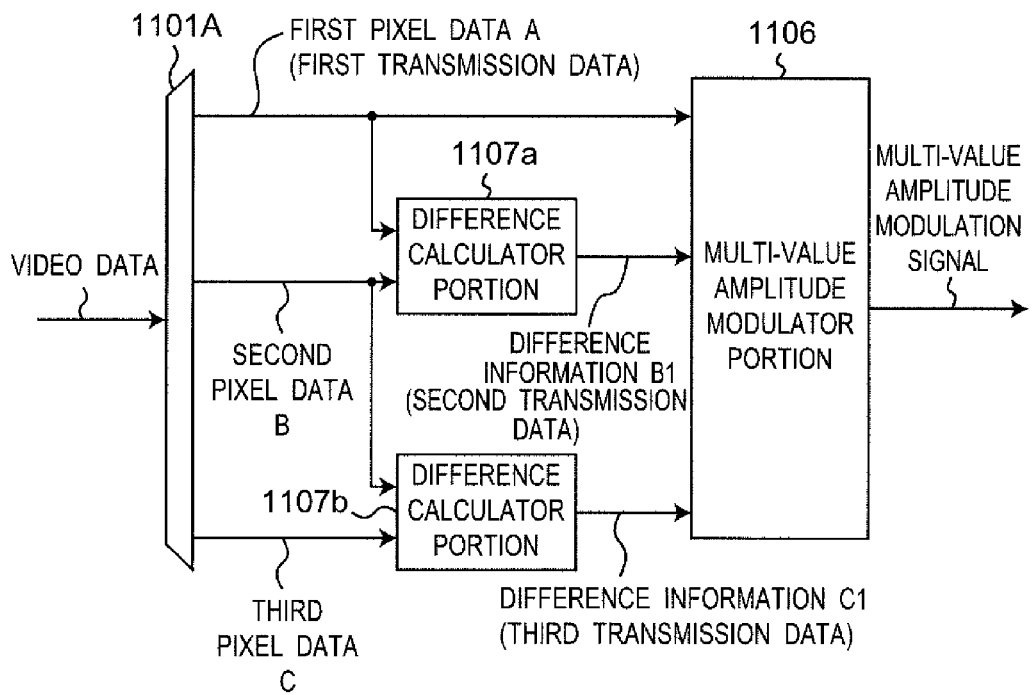
FIG. 6 is a block diagram showing a configuration of a transmitter apparatus 1100A of a transmission system using an 8-value amplitude modulation method according to a second embodiment of the present disclosure.

FIG. 6 is a block diagram showing a configuration of a transmitter apparatus 1100A of a transmission system using an 8-value amplitude modulation method according to a second embodiment of the present disclosure. As compared with the transmitter apparatus 1100 of FIG. 1, the transmitter apparatus 1100A of FIG. 6 is configured to include a data separator portion 1101A instead of the data separator portion 1101, a multi-value amplitude modulator portion 1106 instead of the multi-value amplitude modulator portion 1105, and a difference calculator portion 1107b. Referring to FIG. 6, in case that the multi-value amplitude modulator portion 1106 allocates the first pixel data as the first transmission data to a first bit such as the highest-order bit or the most significant bit of the multi-value amplitude modulation signal, and allocates the difference information as the second transmission data and third transmission data to bits other than the first bit, the multi-value amplitude modulator portion 1106 performs the multi-value amplitude modulation so that predetermined 3-bit data corresponds to the multi-value signal level closest to the intermediate level having the intermediate value between the maximum level and the minimum level of the multi-value signal level of the multi-value amplitude modulation signal. The predetermined 3-bit data is defined by such data that a predetermined first bit value "0" is allocated to the second to third bits of the predetermined 3-bit data, where the occurrence probability of the predetermined first bit value "0" is larger than that of the predetermined second bit value "1".

In other words, in case that the first pixel data is allocated as the first transmission data to the first bit of the multi-value amplitude modulation, and each of the difference information is allocated as the second to third transmission data to the second to third bits of the multi-value amplitude modulation, respectively, the multi-value amplitude modulator portion 1106 performs a multi-value amplitude modulation so that the predetermined 3-bit data corresponds to the maximum level and the minimum level of the multi-value signal level of the multi-value amplitude modulation signal. The predetermined 3-bit data is defined by such data that the predetermined second bit value "1" is allocated to the second to third bits of the predetermined 3-bit data, where the occurrence probability of the predetermined second bit value "1" is lower than that of the predetermined first bit value "0".

Referring to FIG. 6, the data separator portion 1101A receives each 8-bit parallel video data of the RGB signal, separates the received video data into first pixel data A, second pixel data B adjacent to the first pixel data A, and third pixel data C adjacent to the second pixel data B every data group, and outputs the first pixel data A to the difference calculator portion 1107a. Further, the data separator portion 1101A outputs the first pixel data A as first transmission data to the multi-value amplitude modulator portion 1106. Further, the data separator portion 1101A outputs the second pixel data B to the difference calculator portion 1107a and the difference calculator portion 1107b, and outputs the third pixel data C to the difference calculator portion 1107b.

Referring to FIG. 6, the difference calculator portion 1107b receives the second pixel data B and the third pixel data C, and generates and outputs the difference information C1 between the second pixel data B and the third pixel data C adjacent to the second pixel data B by calculating the difference information as the third transmission data to the multi-value amplitude modulator portion 1106. That is, the difference calculator portion 1107b is difference calculator means configured to calculate the one difference information C1 based on the second pixel data B and the third pixel data C separated by the data separator portion 1101A, and to output the difference information C1 as the third transmission data. In this case, the difference information C1 represents a difference between the second pixel data B and the third pixel data C, for example, the difference information C1 is obtained by performing an exclusive-OR operation, which compares the second pixel data B with the third pixel data C every bit. If the bit value of the second pixel data B is identical with that of the third pixel data C, the difference information C1 has a bit value of "0". If the bit value of the second pixel data B is different from that of the third pixel data C, the difference information C1 has a bit value of "1".

FIG. 7A is a table showing a multi-value signal level arrangement of a multi-value amplitude modulation signal generated by a multi-amplitude modulator portion 1106 of the transmitter apparatus 1100A of FIG. 6 based on the first pixel data A, the difference information B1, and the difference information C1. In this case, in the high definition video data, the data difference between the adjacent pixels becomes smaller. Accordingly, when the first pixel data A is compared with the second pixel data B, and when the second pixel data B is compared with the third pixel data C, the number of bits having different values becomes smaller. For example, if the bit value is set to "0" when the data difference between pixels becomes smaller, in the difference information B1 and C1 representing a difference between the adjacent pixel data, the occurrence probability of the bit value "0" is larger than that of the bit value "1". Accordingly, in the difference information B1 and C1, it is possible to increase the occurrence probability of the multi-value signal level closest to the intermediate level by allocating the bit value "0" to the multi-value signal levels (+1 and −1) closest to the intermediate level (0) having the intermediate value between the maximum level (+7) and the minimum level (−7) of the multi-value signal level of the generated multi-value amplitude modulation signal. Accordingly, it is possible to lower the average signal amplitude of the multi-value amplitude modulation signal and to reduce the consumed power of the transmission system. In addition, in the difference information B1 and C1, it is possible to lower the occurrence probabilities of the maximum level and the minimum level by allocating the bit value "1" having a lower occurrence probability to the maximum level and the minimum level. Accordingly, it is possible to lower the average signal amplitude of the multi-value amplitude modulation signal and to reduce the consumed power of the transmission system.

According to the transmitter apparatus 1100A of the present embodiment as described above, the transmitter apparatus 1100A allocates the bit value "0" of the second transmission data and the third transmission data to the multi-value signal level closest to the intermediate level having the intermediate value between the maximum level and the minimum level of the signal level of the multi-value amplitude modulation signal. Accordingly, it is possible to secure the same SN ratio as that of the binary transmission, and to reduce the consumed power as compared with the conventional transmission system of the multi-value amplitude modulation method.

Figure 8:
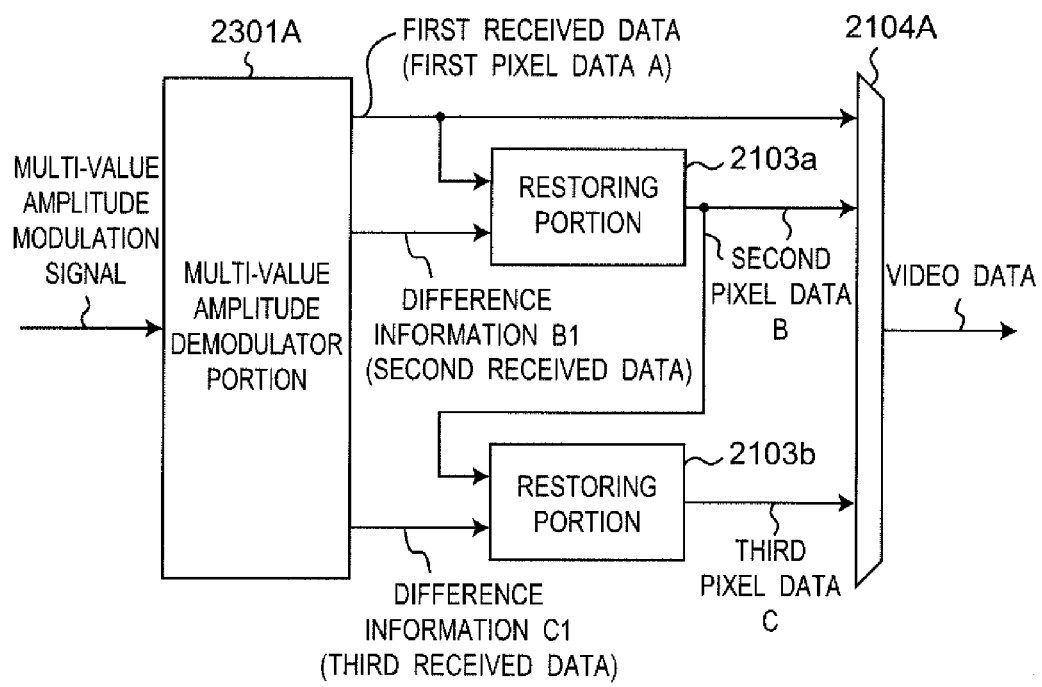
FIG. 8 is a block diagram showing a configuration of a receiver apparatus 2100A of the transmission system using the 8-value amplitude modulation method according to the second embodiment of the present disclosure.

FIG. 8 is a block diagram showing a configuration of a receiver apparatus 2100A of the transmission system using the 8-value amplitude modulation method according to the second embodiment of the present disclosure. As compared with the receiver apparatus 2100 of FIG. 5, the receiver apparatus 2100A of FIG. 8 is configured to include a multi-value amplitude demodulator portion 2301A instead of the multi-value amplitude demodulator portion 2301, a data coupler portion 2104A instead of the data coupler portion 2104, and a restoring portion 2103b. Referring to FIG. 8, the receiver apparatus 2100A performs a reverse process of the transmitter apparatus 1100A of FIG. 6. In this case, when the number of multi-values of the multi-value amplitude modulation is set to 8 (3-bit transmission by one symbol), and the number of pixels included in one data group is set to 3, a function of each portion of the receiver apparatus 2100A is described as follows.

Referring to FIG. 8, the multi-value amplitude demodulator portion 2301A receives and decodes the received multi-value amplitude modulation signal, outputs data corresponding to the first bit such as the highest-order bit or the most significant bit of the multi-value amplitude modulation as first received data to the restoring portion 2103a, and outputs the same data as the first pixel data A to the data coupler portion 2104A. Further, the multi-value amplitude demodulator portion 2301A outputs the difference information B1 corresponding to the second bit such as an intermediate bit of the demodulated multi-value amplitude modulation as second received data to the restoring portion 2103a, and outputs the difference information C1 corresponding to the third bit such as a lower bit of the demodulated amplitude modulation as third received data to the restoring portion 2103b. That is, in case that the first bit of the multi-value amplitude modulation is allocated to the first received data and the second to third bits of the multi-value amplitude modulation is allocated to the second to third received data, the multi-value amplitude demodulator portion 2301A demodulates the multi-value amplitude modulation signal to the first to third received data so that the predetermined 3-bit data corresponds to the multi-value signal level closest to the intermediate level having the intermediate value between the maximum level and the minimum level of the multi-value signal level of the multi-value amplitude modulation signal. The predetermined 3-bit data is defined by such data that the predetermined first bit value "0" is allocated to the second to third bit of the predetermined 3-bit data, where the occurrence probability of the predetermined first bit value "0" is higher than that of the predetermined second bit value "1".

In addition, in case that the first bit of the multi-value amplitude modulation is allocated to the first received data and the second to third bits of the multi-value amplitude modulation are allocated to the second to third received data, the multi-value amplitude demodulator portion 2301A demodulates the multi-value amplitude modulation signal to the first to third received data so that the predetermined 3-bit data corresponds to the multi-value signal level of the maximum level and the minimum level of the multi-value signal level of the multi-value amplitude modulation signal. The predetermined 3-bit data is defined by such data that the predetermined second bit value "1" is allocated to the second to third bits of the predetermined 3-bit data, where the occurrence probability of the predetermined second bit value "1" is lower than that of the predetermined first bit value "0".

Referring to FIG. 8, the restoring portion 2103b restores the second pixel data B and the difference information C1 to the third pixel data C by performing an exclusive-OR operation between the second pixel data B and the difference information C1, and outputs the third pixel data C to the data coupler portion 2104A. In this case, the difference information C1 represents the difference information C1 generated by the transmitter apparatus 1100A. In the present embodiment, the difference information C1 is calculated by performing by an operation such as the exclusive-OR operation between the adjacent pixel data.

Referring to FIG. 8, the data coupler portion 2104A inputs the first pixel data A, the second pixel data B, and the third pixel data C, rearranges each of the pixel data to an original order, and outputs rearranged data as original video data. Accordingly, the original video data can be obtained by demodulating the multi-value modulation signal transmitted from the transmitter apparatus 1100A.

According to the receiver apparatus 2100A of the present embodiment as described above, it is possible to receive the multi-value amplitude modulation signal transmitted from the transmitter apparatus 1100A.

An operation and an action of the transmission system including the transmitter apparatus 1100A and the receiver apparatus 2100A using the multi-value amplitude modulation method, as configured as described above, are described as follows.

First of all, the transmission system of the present embodiment transmits data by allocating the first pixel data A to the first bit such as the highest-order bit or the most significant bit of the multi-value amplitude modulation as it is, by allocating the difference information B1, which is calculated by performing an operation such as an exclusive-OR operation between the first pixel data A and the second pixel data B, to the second bit such as the intermediate bit of the multi-value amplitude modulation as data corresponding to the second pixel data B, and by allocating the difference information C1, which is calculated by performing an operation such as an exclusive-OR operation between the second pixel data B and the third pixel data C, to the third bit such as the lower bit of the multi-value amplitude modulation as data corresponding to the third pixel data C. In particular, in each of the difference information B1 and the difference information C1, it is possible to lower the average amplitude of the transmitted multi-value amplitude modulation signal by allocating the bit value "0" having a higher occurrence probability to the multi-value signal level closest to the intermediate level having the intermediate value between the maximum level and the minimum level of the signal level of the multi-value amplitude modulation signal.

In addition, FIG. 7B is a table showing a modified embodiment of the multi-value signal level arrangement of the multi-value amplitude modulation signal generated by the multi-amplitude modulator portion 1106 of the transmitter apparatus 1100A of FIG. 6 based on the first pixel data A, the difference information B1, and the difference information C1, and FIG. 7B shows a modified embodiment of the present embodiment. In this case, the present modified embodiment can obtain the same advantageous effects as those of the first embodiment. Please note that FIG. 7B is obtained by inverting the bit values of the first pixel data A of FIG. 7A.

According to each of the transmission systems of the embodiment and the modified embodiments thereof as described above, the transmission system transmits data by allocating the first pixel data A to the first bit such as the highest-order bit or the most significant bit of the multi-value amplitude modulation as it is, by allocating the difference information B1, which is calculated by performing an operation such as the exclusive-OR operation between the first pixel data A and the second pixel data B, to the second bit such as the intermediate bit of the multi-value amplitude modulation as data corresponding to the second pixel data B, and by allocating the difference information C1, which is calculated by performing an operation such as the exclusive-OR operation between the second pixel data B and the third pixel data C, to the third bit such as the lower bit of the multi-value amplitude modulation as data corresponding to the third pixel data C. In particular, in each of the difference information B1 and the difference information C1, the bit value "0" is allocated to the multi-value signal level closest to the intermediate level having the intermediate value between the maximum level and the minimum level of the signal level of the multi-value amplitude modulation signal. Accordingly, it is possible to secure the same SN ratio as that of the binary transmission, and to reduce the consumed power as compared with the conventional transmission system of the multi-value amplitude modulation method.

In addition, according to each of the transmission systems of the embodiment and the modified embodiments thereof as described above, the difference information between adjacent pixel data is calculated by the operation such as the exclusive-OR operation between the pixel data. Accordingly, it is possible to simplify a configuration and to reduce the consumed power as compared with the conventional transmission system of the multi-value amplitude modulation method. Further, it is possible to reduce the waste such as the continuous transmission of similar data.

In the embodiment as described above, the case where the number of multi-values is set to 8 is described. However, the embodiment of the present disclosure is not limited thereto. For example, the number of multi-values may be set to a value other than 8 and equal to or more than 2, and may be more optimally set to be a power of two.

Third Embodiment

Figure 9:
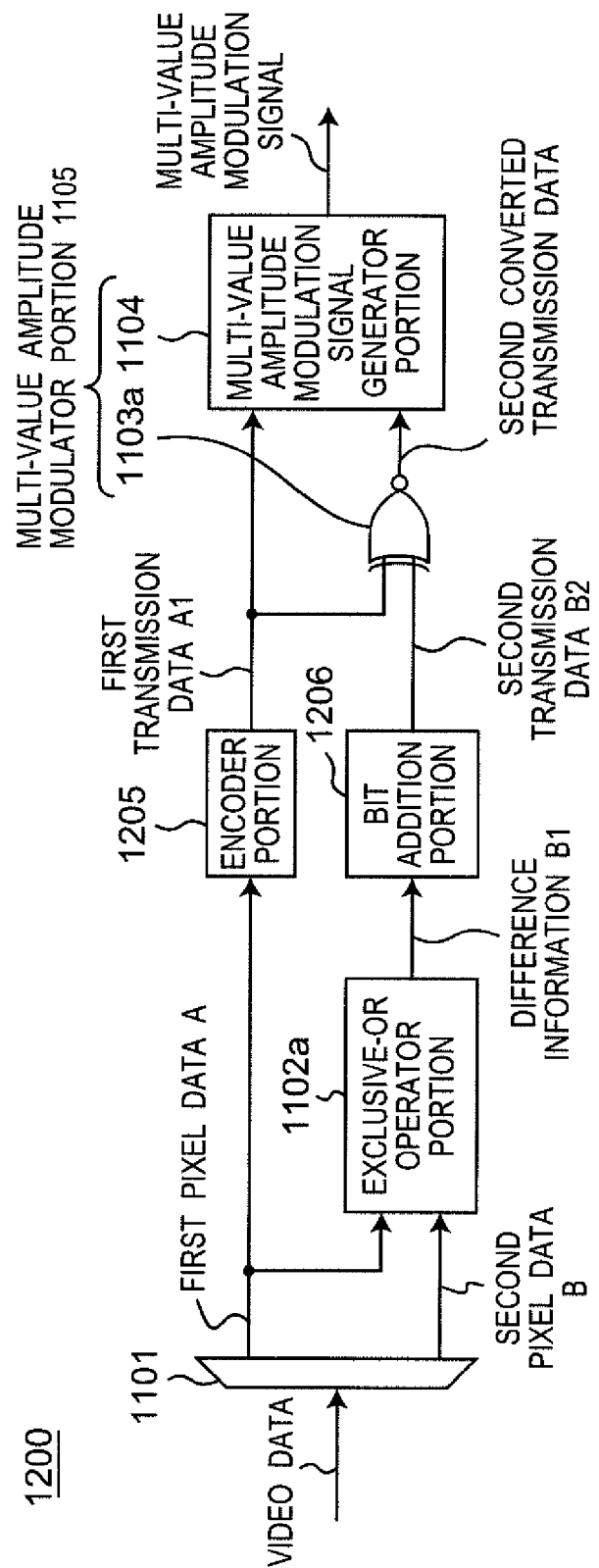
FIG. 9 is a block diagram showing a configuration of a transmitter apparatus 1200 of a transmission system using a 4-value amplitude modulation method according to a third embodiment of the present disclosure.

FIG. 9 is a block diagram showing a configuration of a transmitter apparatus 1200 of a transmission system using a 4-value amplitude modulation method according to a third embodiment of the present disclosure. Referring to FIG. 9, in a video data transmitter apparatus configured to generate and transmit a multi-value amplitude modulation signal by performing a multi-value amplitude modulation of a plurality of N bits per one symbol according to video data of a video signal or a color signal constituting the video signal, or a brightness signal and a color-difference signal, the video data transmitter apparatus transmits the video data, where first pixel data of a data group obtained by dividing the transmitted video data into N pixel data adjacent to each other is allocated to a highest-order bit of the multi-value amplitude modulation, and second to N-th pixel data other than the first pixel data are respectively allocated to a lower bit other than the highest-order bit of multi-value amplitude modulation signal as second to N-th transmission data of the difference information corresponding to each of the pixel data. In this case, the difference information represents the data difference between each of the pixels included in the data group. In particular, since the data difference between adjacent pixels in high definition video data becomes smaller, for example, if the bit value is set to "0" when the data difference between the pixels is smaller, in the difference information between the adjacent pixel data, the occurrence probability of the bit value "0" is larger than that of the bit value "1". Accordingly, the bit value "0" of the difference information is allocated to a multi-value signal level closest to an intermediate level having an intermediate value between the maximum level and the minimum level of the multi-value signal level of the multi-value amplitude modulation signal generated by the transmitter apparatus 1200, and therefore, it is possible to lower an average signal amplitude of the multi-value amplitude modulation signal and to reduce the consumed power of the transmission system. It is noted that the video data means a video signal or a color signal constituting the video signal, or a brightness signal and a color-difference signal, and the pixel data means data corresponding to a pixel, or data of respective colors of a RGB signal in each of the pixels, or the brightness signal and the color-difference signal in each of the pixels, in the following descriptions.

Referring to FIG. 9, the transmitter apparatus 1200 is configured to include the data separator portion 1101 of the data separator means, an encoder portion 1205, which is disposed in the post stage of the data separator portion 1101 and performs an encoding process on the first pixel data A, an exclusive-OR operator portion 1102a for performing an exclusive-OR operation every bit, a bit addition portion 1206 for adding bits to the difference information B1, which is disposed in the post stage of the exclusive-OR operator portion 1102a, and the multi-value amplitude modulator portion 1105. Further, the multi-value amplitude modulator portion 1105 is configured to include an exclusive-NOR circuit 1103a, and a multi-value amplitude modulation signal generator portion 1104.

Referring to FIG. 9, the data separator portion 1101 receives each 8-bit parallel video data of the RGB signal, separates the received video data into first pixel data A and second pixel data B adjacent to the first pixel data A every data group, and outputs the first pixel data A to the exclusive-OR operator portion 1102a. Further, the data separator portion 1101 outputs the second pixel data B to the exclusive-OR operator portion 1102a. It is noted that pixels included in the same horizontal line (that is, which are adjacent to each other in a transverse direction) are set as one data group, as illustrated in FIG. 25.

Referring to FIG. 9, the exclusive-OR operator portion 1102a receives the first pixel data A and the second pixel data B, and generates and outputs the difference information B1 by performing the exclusive-OR operation. That is, the exclusive-OR operator portion 1102a is difference calculator means configured to calculate and output the one difference information B1 based on the first pixel data A and the second pixel data B separated by the data separator portion 1101. In this case, the difference information B1 represents a difference between the first pixel data A and the second pixel data B, for example, the difference information B1 is obtained by performing the exclusive-OR operation, which compares the first pixel data A with the second pixel data B every bit. If the bit value of the first pixel data A is identical with that of the second pixel data B, the difference information B1 has a bit value of "0". If the bit value of the first pixel data A is different from that of the second pixel data B, the difference information B1 has a bit value of "1".

Referring to FIG. 9, the multi-value amplitude modulator portion 1105 allocates the first transmission data to the highest-order bit or the most significant bit of the multi-value amplitude modulation signal, and allocates the second transmission data to bits other than the highest-order bit or the most significant bit of the multi-value amplitude modulation signal. The multi-value amplitude modulator portion 1105 generates the multi-value amplitude modulation signal by performing the multi-value amplitude modulation according to the allocated bit data. That is, the multi-value amplitude modulator portion 1105 is multi-value amplitude modulation means configured to perform the multi-value amplitude modulation means according to N-bit data obtained by allocating the encoded first pixel data as the first transmission data to the highest-order bit or the most significant bit of the multi-value amplitude modulation signal, and by allocating the second transmission data to bits other than the highest-order bit or the most significant bit, where the N-bit data is obtained by allocating the bit value "0" of the second transmission data to a proximity level of the intermediate level having the intermediate value between the maximum level and the minimum level of the multi-value signal level of the multi-value amplitude modulation signal. Referring to FIG. 9, the exclusive-NOR circuit 1103a inputs the first transmission data and the second transmission data, converts the first transmission data and the second transmission data to a second converted transmission data by performing an exclusive-NOR operation between the first transmission data and the second transmission data, and outputs the second converted transmission data to the multi-value amplitude modulation signal generator portion 1104.

Referring to FIG. 9, the multi-value amplitude modulation signal generator portion 1104 inputs the first transmission data A1 and the second converted transmission data, generates a multi-value amplitude modulation signal by adding two times amplitude of the second converted transmission data to the first transmission data, and transmits the multi-value amplitude modulation signal to a receiver apparatus 2200. In addition, in case that the first transmission data A1 and the second converted transmission data are parallel signal, respectively, the multi-value amplitude modulation signal generator portion 1104 also has a function of a parallel to serial conversion for converting these signals to serial signals, respectively.

Referring to FIG. 9, the encoder portion 1205 inputs the first pixel data A, and performs an encoding process and outputs encoded data as the first transmission data A1 to the exclusive-NOR circuit 1103a and the multi-value amplitude modulation signal generator portion 1104. In this case, the encoding process executes a process such as an encoding process by an 8B10B encoding or a scramble process so that the occurrence probability of the bit value "0" of the first transmission data A1 is equal to that of the bit value "1" thereof.

Referring to FIG. 9, the bit addition portion 1206 inputs the difference information B1 from the exclusive-OR operator portion 1102a, and outputs data as the second transmission data B2 to the exclusive-NOR circuit 1103a, where the data is obtained by adding addition bits of the same number of bits as that of an overhead caused by the encoder portion 1205 to the difference information B1. For example, in case that the encoder portion 1205 performs the 8B10B encoding, when the first pixel data A of 8-bit is inputted to the encoder portion 1205, the first transmission data of 10-bit is outputted from the encoder portion 1205. Accordingly, an overhead of 2 bits occurs. In contrast, the bit addition portion 1206 adds an addition bit of 2 bits (For example, "00") to the exclusive-NOR circuit 1103a, and therefore, the number of bits of the second transmission data B2 is the same 10-bit as that of the first transmission data A1. In this case, it is possible to perform a fine adjustment of the occurrence probabilities of the bit value "1" and the bit value "0" of the second transmission data B2 by setting a value of the addition bit. It is noted that the bit addition portion 1206 may be omitted in case that the overhead does not occur by performing the encoding process of the encoder portion 1205 (For example, in case of the scramble process).

FIG. 10A is a table showing a multi-value signal level arrangement of a multi-value amplitude modulation signal generated by the multi-amplitude modulator portion 1105 of the transmitter apparatus 1200 of FIG. 9 based on first transmission data A1 and second transmission data B2. In this case, the occurrence probability of the bit value "0" of the first transmission data A1 is equal to that of the bit value "0" thereof according to the advantageous effects of the encoder portion 1205 as described above. Accordingly, a sum of the occurrence probability of the multi-value signal level +3 and that of the multi-value signal level +1 larger than the intermediate level having the intermediate value between the maximum level and the minimum level of the multi-value signal level of the multi-value amplitude modulation signal is equal to a sum of the occurrence probability of the multi-value signal level −3 and that of the multi-value signal level −1 lower than the intermediate level.

Figure 11:
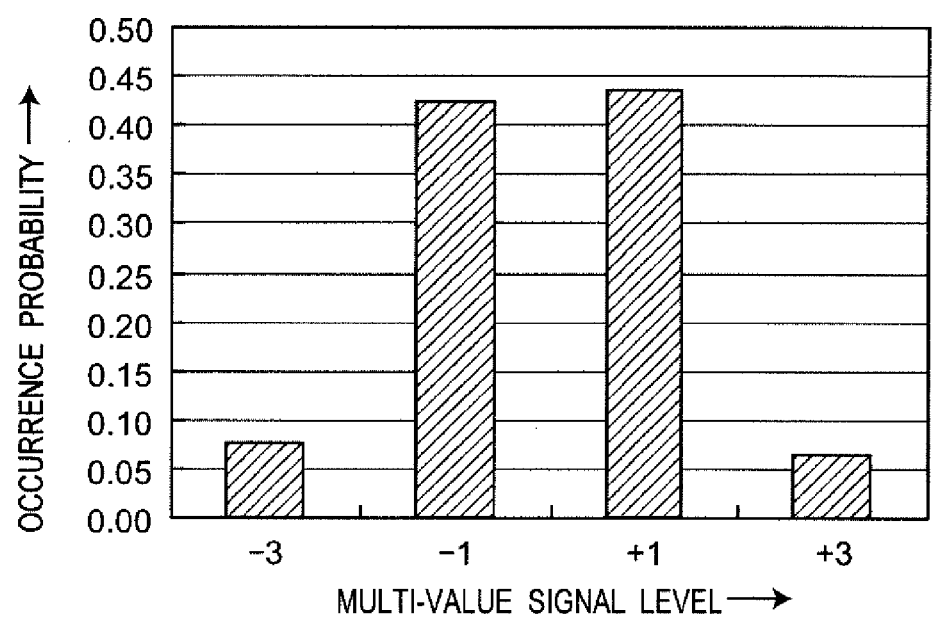
FIG. 11 is a graph showing an occurrence probability distribution of the multi-value signal level of the multi-value amplitude modulation signal of FIG. 10A of the transmitter apparatus 1200 of FIG. 9, which is obtained by a calculation.

FIG. 11 is a graph showing an occurrence probability distribution of the multi-value signal level of the multi-value amplitude modulation signal of FIG. 10A of the transmitter apparatus 1200 of FIG. 9, which is obtained by a calculation. Referring to FIG. 11, in fact, it is understood that the sum of the occurrence probability of the multi-value signal level +3 and that of the multi-value signal level +1 larger than the intermediate level is equal to the sum of the occurrence probability of the multi-value signal level −3 and that of the multi-value signal level −1 lower than the intermediate level.

According to the transmitter apparatus 1200 of the present embodiment as described above, in addition to the advantageous effects of the first embodiment as described above, the sum of the occurrence probability of the multi-value signal level and that of the multi-value signal level larger than the intermediate level having the intermediate value between the maximum level and the minimum level of the multi-value signal level of the multi-value amplitude modulation signal can be equal to the sum of the occurrence probability of the multi-value signal level and that of the multi-value signal level lower than the intermediate level. Accordingly, it is possible to secure a DC balance of the multi-value amplitude modulation signal, and to apply to a transmission line such as an AC coupled transmission line, which is limited to a lower frequency band.

Figure 12:
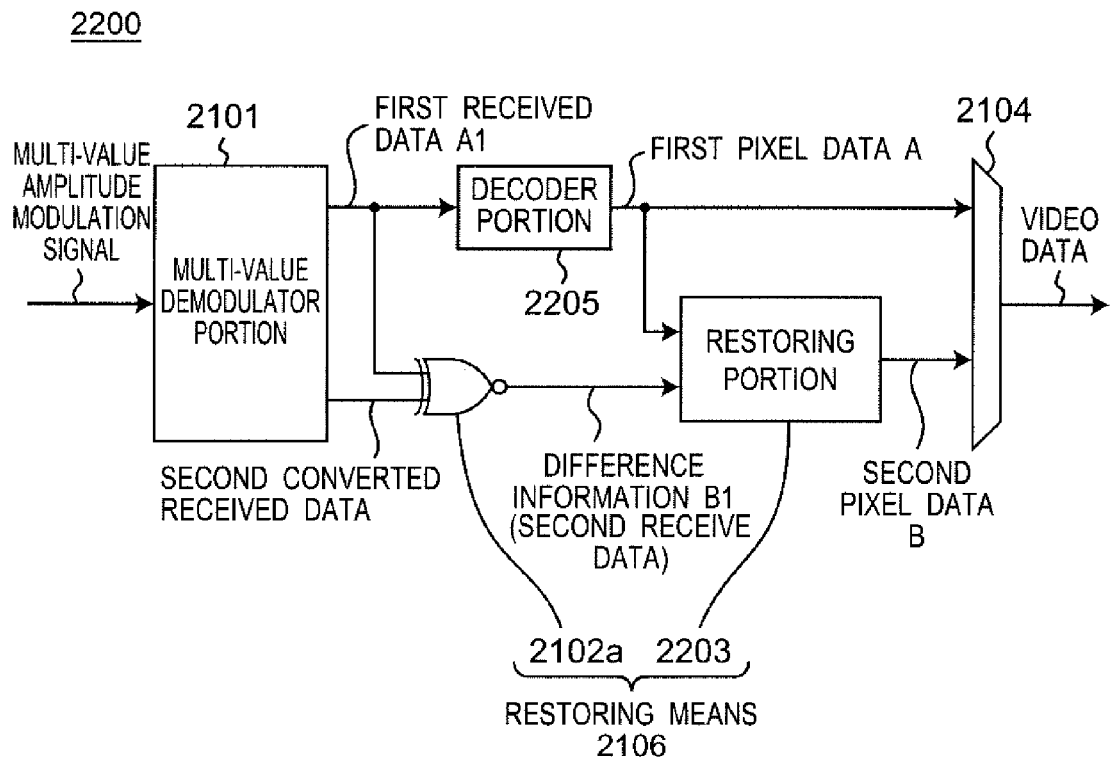
FIG. 12 is a block diagram showing a configuration of a receiver apparatus 2200 of the transmission system using the 4-value amplitude modulation method according to the third embodiment of the present disclosure.

FIG. 12 is a block diagram showing a configuration of a receiver apparatus 2200 of the transmission system using the 4-value amplitude modulation method according to the third embodiment of the present disclosure. The receiver apparatus 2200 of FIG. 12 is configured to include a multi-value demodulator portion 2101, the data coupler portion 2104, and restoring means 2106. Further, the restoring means 2106 is configured to include an exclusive-NOR circuit 2102a and a restoring portion 2203. Referring to FIG. 12, the receiver apparatus 2200 performs a reverse process of the transmitter apparatus 1200. In this case, when the number of multi-values of the multi-value amplitude modulation is set to 4 (binary transmission by one symbol), and the number of pixels included in one data group is set to 2, a function of each portion of the receiver apparatus 2200 is described as follows.

Referring to FIG. 12, the multi-value demodulator portion 2101 receives and decodes the multi-value amplitude modulation signal transmitted from the transmitter apparatus 1200, outputs data corresponding to a higher-order bit of the multi-value amplitude modulation signal as first received data A1 to the restoring means 2106, and outputs data corresponding to a lower bit of the multi-value amplitude modulation signal as second converted received data to the restoring means 2106. That is, the multi-value demodulator portion 2101 is multi-value modulation means configured to decode the multi-value amplitude modulation signal to the first received data A1 and the second converted received data, and to output the first received data A1 to a decoder portion 2205.

Referring to FIG. 12, the restoring means 2106 is a restoring circuit, which calculates the difference information B1 and restores the same to the second pixel data B based on the decoded first received data A1 and the second converted received data. A restoring portion 2203 constituting the restoring means 2106 removes the addition bits added by the bit addition portion 1206 of the transmission apparatus 1200 of FIG. 9 from the difference information B1, and thereafter, the restoring portion 2203 restores data to the second pixel data B by performing an exclusive-OR operation between the same and the first pixel data A, and outputs the second pixel data B to the data coupler portion 2104. In this case, the difference information B1 represents the difference information generated by the transmitter apparatus 1200, the difference information B1 is calculated in the present embodiment by the exclusive-OR operation between the adjacent pixel data. Referring to FIG. 12, the data coupler portion 2104 inputs the first pixel data A and the second pixel data B, rearranges each of the pixel data to an original order, and outputs rearranged data as original video data.

Referring to FIG. 12, the decoder portion 2205 inputs the first received data A1, performs the decoding process based on a decoding format used in the decoder portion 1205 of the transmitter apparatus 1200 of FIG. 9, and outputs the result thereof as the first pixel data A to the data coupler portion 2104 and the restoring portion 2203.

Referring to FIG. 12, the restoring portion 2203 removes the addition bits added by the bit addition portion 1206 of the transmission apparatus 1200 of FIG. 9 from the second received data, and thereafter, the restoring portion 2203 restores data to the second pixel data B by performing the exclusive-OR operation between the same and the first pixel data A, and outputs the restored data as the second pixel data B to the data coupler portion 2104. Accordingly, it is possible to decode the multi-value modulation signal transmitted from the transmitter apparatus 1200 to obtain the original video data.

According to the receiver apparatus 2200 of the present embodiment as described above, it is possible to secure the DC balance of the multi-value amplitude modulation signal by using with the transmitter apparatus 1200. Accordingly, it is possible to apply to a transmission line such as an AC coupled transmission line, which is limited to a lower frequency band.

An operation and an action of the transmission system including the transmitter apparatus 1200 and the receiver apparatus 2200 using the multi-value amplitude modulation method, as configured as described above, are described as follows.

First of all, in addition to the transmission system of the first embodiment as described above, the transmission system according to the present embodiment can perform the 8B10B encoding process and the scramble process of the first pixel data A. Accordingly, it is possible that the occurrence probabilities of the bit value "0" of the first transmitter data A1 is equal to that of the bit value "1" thereof. Further, since the transmission system according to the present embodiment adds the bits to the difference information corresponding to the second pixel data B, it is possible to perform a fine adjustment of the occurrence probabilities of the bit value "0" and the bit value "1" of the second transmission data B2 corresponding to the second pixel data B by setting a value of the addition bit. Accordingly, it is possible to perform a fine adjustment of the occurrence probabilities of the multi-value signal level of the multi-value amplitude modulation signal.

In addition, each of FIGS. 10B to 10F is a table showing a modified embodiment of the multi-value signal level arrangement of the multi-value amplitude modulation signal generated by the multi-amplitude modulator portion 1105 of the transmitter apparatus 1200 of FIG. 9 based on the first transmission data A1 and the second transmission data B2, and shows a modified embodiment of the present embodiment. In each of these cases, it is possible that the sum of the occurrence probabilities of the multi-value signal levels larger than the intermediate level having the intermediate value between the maximum level and the minimum level of the multi-value signal level of the multi-value amplitude modulation signal is equal to the sum of the occurrence probabilities of the multi-value signal levels lower than the intermediate level, and has the same advantageous effects as those of FIG. 10A.

According to the transmission system of each of the embodiment and the modified embodiment as described above, in addition to the advantageous effects of the transmission system according to the first embodiment as described above, it is possible that the sum of the occurrence probabilities of the multi-value signal levels larger than the intermediate level having the intermediate value between the maximum level and the minimum level of the multi-value signal level of the multi-value amplitude modulation signal is equal to the sum of the occurrence probabilities of the multi-value signal levels lower than the intermediate level. Accordingly, it is possible to secure a DC balance of the multi-value amplitude modulation signal, and therefore, it is possible to apply to a transmission line such as an AC coupled transmission line, which is limited to a lower frequency band.

In addition, according to the transmission system of the embodiment and the modified embodiment as described above, in addition to the encoding process, the transmission system adds any number of bits to the difference information B1 so that the number of bits is equal to numbers of bits increased by the encoding process. Accordingly, it is possible to perform a fine adjustment of the occurrence probability of the multi-value signal level of the multi-value amplitude modulation signal.

In the embodiment as described above, the case where the number of multi-values is set to 4 is described. However, the embodiment of the present disclosure is not limited thereto. For example, the number of multi-values may be set to a value other than 4 and equal to or more than 2, and may be more optimally set to be a power of two.

Fourth Embodiment

Figure 13:
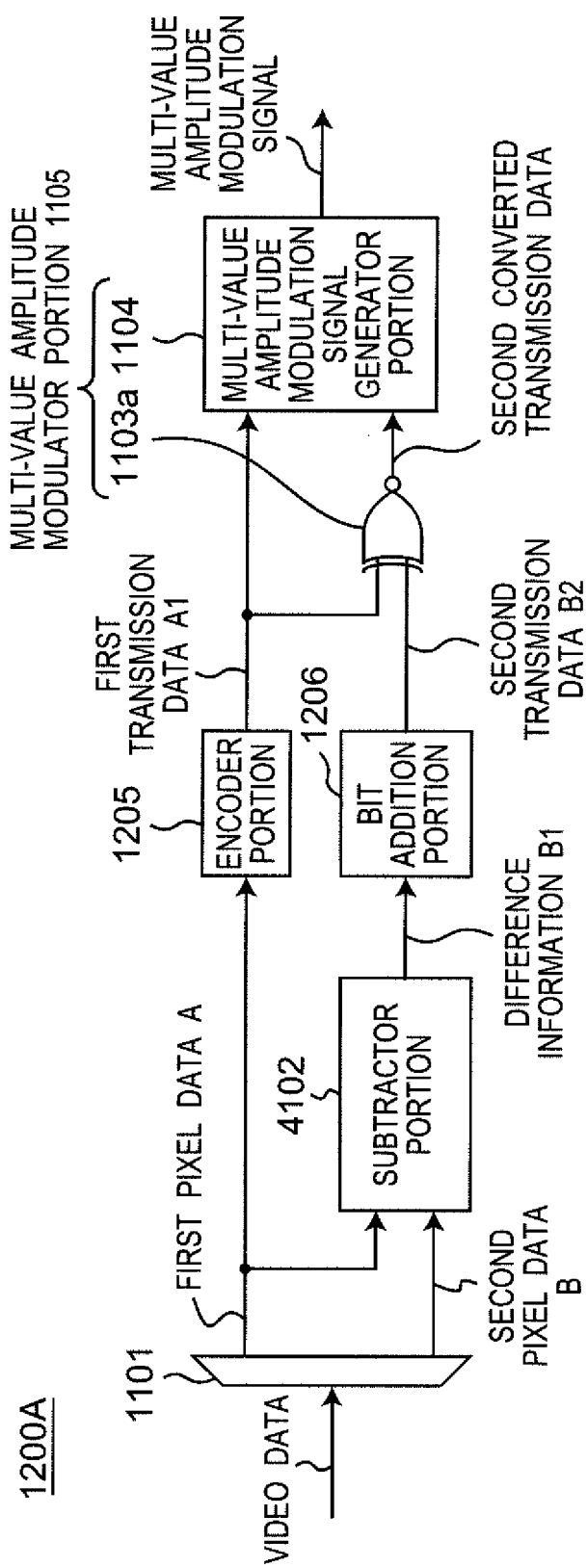
FIG. 13 is a block diagram showing of a configuration of a transmitter apparatus 1200A of a transmission system using a 4-value amplitude modulation method according to a fourth embodiment of the present disclosure.

FIG. 13 is a block diagram showing of a configuration of a transmitter apparatus 1200A of a transmission system using a 4-value amplitude modulation method according to a fourth embodiment of the present disclosure. As compared with the transmission apparatus 1200 of FIG. 9, the transmitter apparatus 1200A is configured to include a subtractor portion 4102 instead of the exclusive-OR operator portion 1102a. Referring to FIG. 13, the subtractor portion 4102 inputs the first pixel data A and the second pixel data B, subtracts the value of the first pixel data A from that of the second pixel data B, and outputs the result thereof as the difference information B1 between the first pixel data A and the second pixel data B to the bit addition portion 1206. That is, the subtractor portion 4102 is difference calculator means configured to calculate the one difference information B1 based on the first pixel data A and the second pixel data B separated by the data separator portion 1101, and to output the difference information B1 to the bit addition portion 1206. In this case, the difference information B1 represents a difference between the first pixel data A and the second pixel data B.

Referring to FIG. 13, the bit addition portion 1206 adds bits of a value corresponding to a code of the value of the difference information B1 to the difference information B1. For example, if the value of the difference information B1 is positive, a value "00" is added to the difference information B1. If the value of the difference information B1 is negative, a value "01" is added to the difference information B1. The bit addition portion 1206 outputs the added difference information as the second transmission data B2 to the exclusive-NOR circuit 1103a. It is noted that the value of the bits to be added may be set to the other value other than the value "00" and the value "01", if it is possible to distinguish the positive and the negative of the value of the difference information B1.

Figure 14:
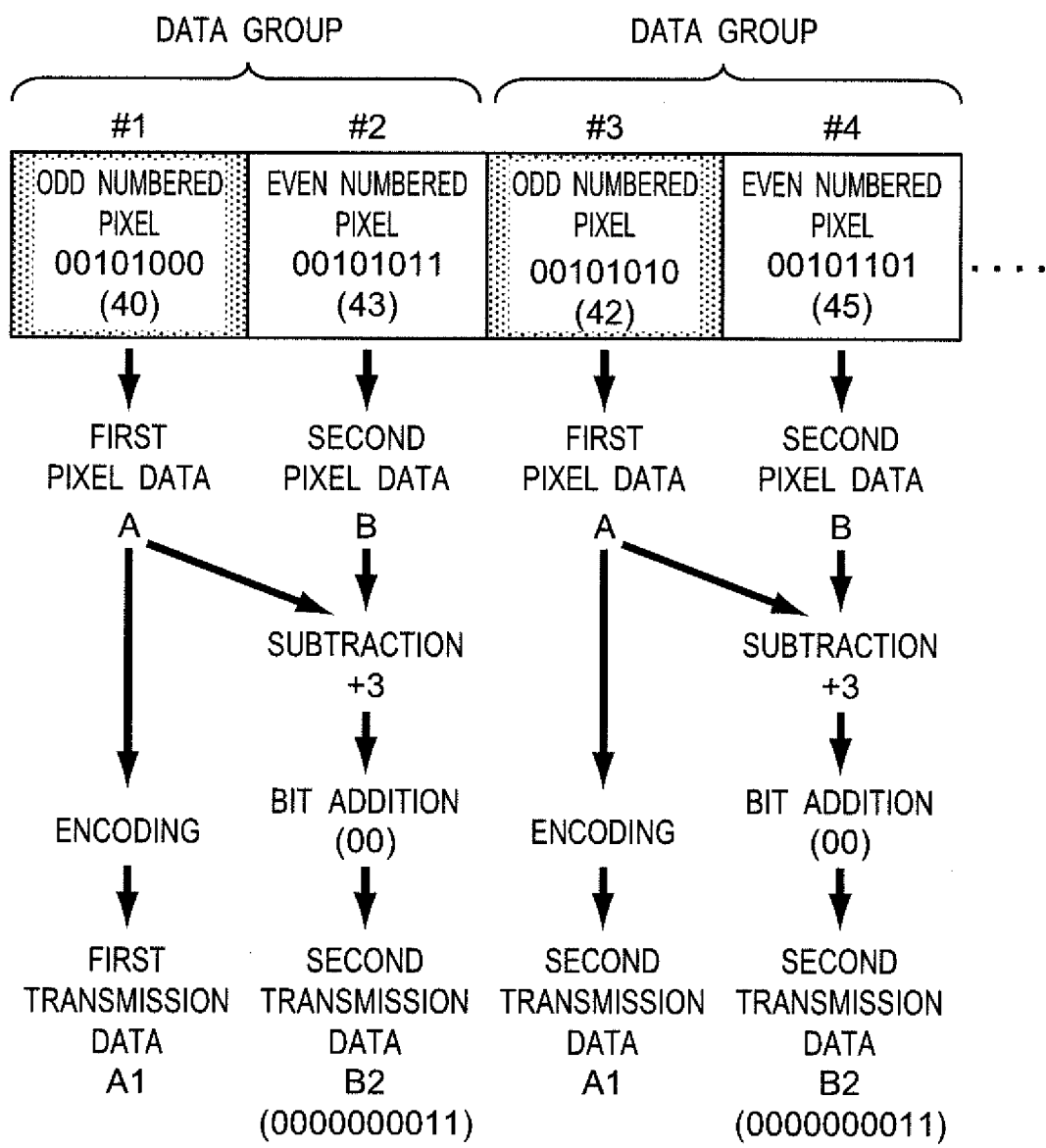
FIG. 14 is a flow chart showing a data process, when a number of bits of pixel data is 8-bit, inside the transmitter apparatus 1200A of FIG. 13.

FIG. 14 is a flow chart showing a data process, when a number of bits of pixel data is 8-bit, inside the transmitter apparatus 1200A of FIG. 13.

Referring to FIGS. 13 and 14, for example, in case that the value of the first pixel data A is "00101000" in binary notation (corresponding to 40 in decimal notation), and the value of the second pixel data B is "00101011" in binary notation (corresponding to 43 in decimal notation), the difference information B1 becomes a value of +3 obtained by subtracting 40 from 43. Accordingly, the value of difference information B1 becomes +3, and the value of the second transmission data B2 becomes "0000000011".

In the third embodiment as described above, in case that the difference of the value of the adjacent pixel data is smaller, there are many bits having a different value in binary notation, as a result, a number of bit value "1" included in the difference information B1 possibly becomes larger. For example, in case that the value of the first pixel data A is set to 127 (corresponding to "01111111" in binary notation), and the value of the first pixel data B is set to 128 (corresponding to "10000000" in binary notation), the value obtained by subtracting the first pixel data A from the second pixel data B is 1. In contrast, the difference information B1 outputted from the exclusive-OR operator portion 1102a according to the third embodiment as described above is "11111111". In contrast, in the transmitter apparatus 1200A according to the present embodiment, the difference information B1 calculated by the subtractor portion 4102 is +1 ("00000001" in binary notation). Accordingly, in case that the difference of the value of the adjacent pixel data is smaller, it is possible to lower the number of bit value "1" included in the difference information B1 at any time. Accordingly, as compared with the transmitter apparatus 1200 of FIG. 9 according to the third embodiment, which calculates the difference information between the adjacent pixel data by the exclusive-OR operation, the transmitter apparatus 1200A according to the present embodiment can have the occurrence probability of the multi-value signal level close to the intermediate level having the intermediate value between the maximum level and the minimum level of the multi-value signal level of the multi-value amplitude modulation signal much larger than that of the transmitter apparatus 1200.

Figure 15:
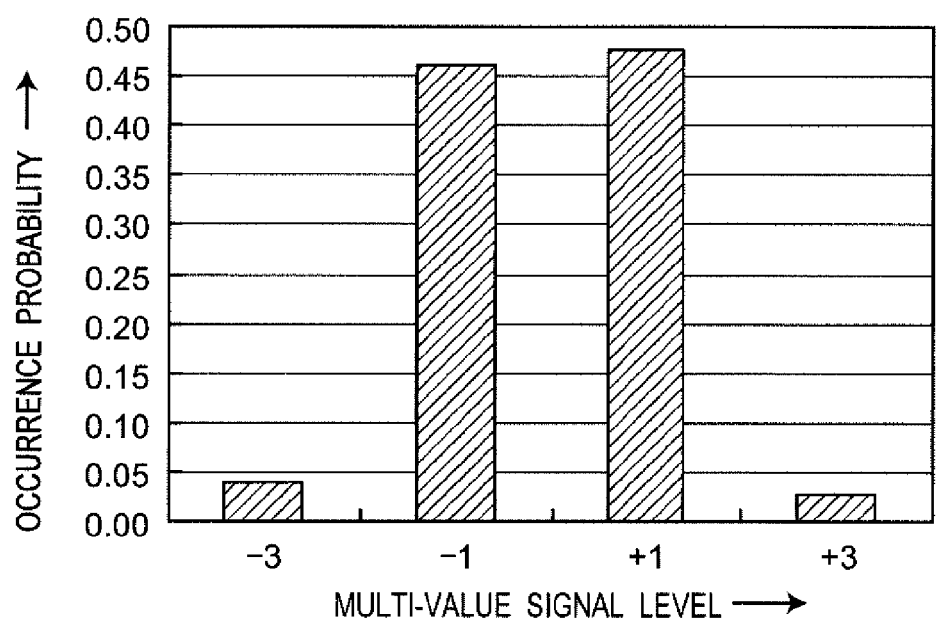
FIG. 15 is a graph showing an occurrence probability distribution of a multi-value signal level of a multi-value amplitude modulation signal of the transmitter apparatus 1200A according to the present embodiment, which is obtained by a calculation.

FIG. 15 is a graph showing an occurrence probability distribution of a multi-value signal level of a multi-value amplitude modulation signal of the transmitter apparatus 1200A according to the present embodiment, which is obtained by a calculation. Referring to FIG. 15, as compared with FIG. 11 showing the occurrence probability distribution of the multi-value signal level of the multi-value amplitude modulation signal of the transmitter apparatus 1200, in fact, it is understood that the occurrence probability of the multi-value signal level close to the intermediate level of the transmitter apparatus 1200A becomes much larger than that of the transmitter apparatus 1200. Accordingly, it is possible to further reduce the consumed power of the transmission system.

Figure 16:
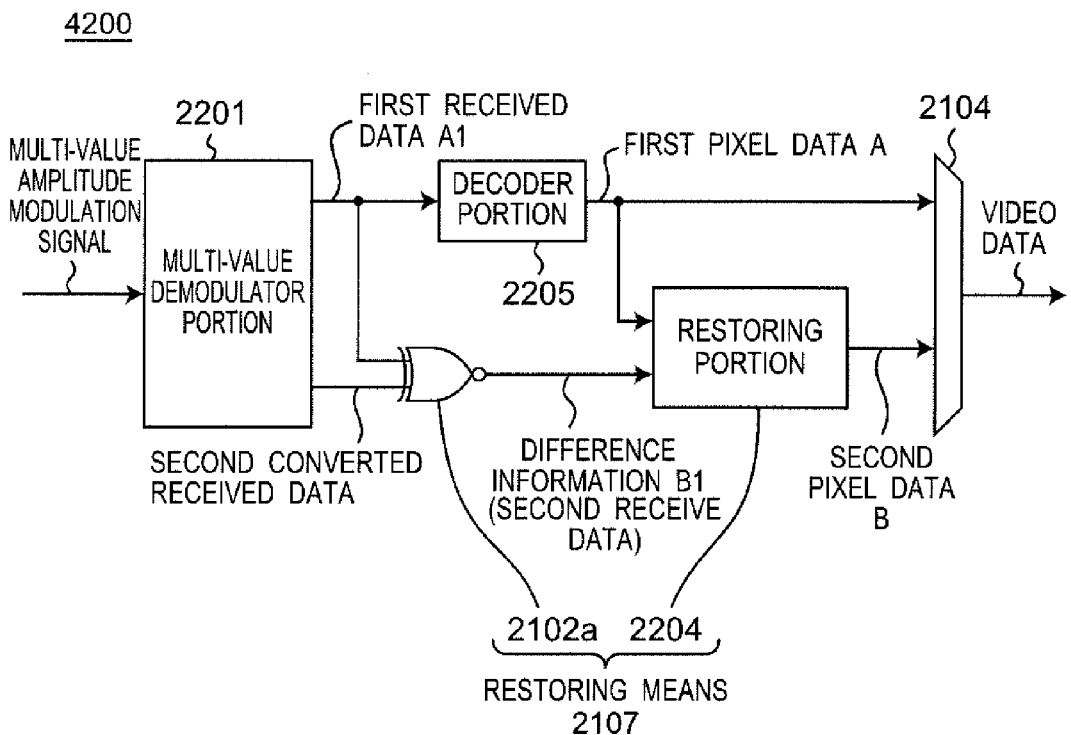
FIG. 16 is a block diagram showing a configuration of a receiver apparatus 4200 of the transmission system using the 4-value amplitude modulation method according to the fourth embodiment of the present disclosure.

FIG. 16 is a block diagram showing a configuration of a receiver apparatus 4200 of the transmission system using the 4-value amplitude modulation method according to the fourth embodiment of the present disclosure. As compared with the receiver apparatus 2200 of FIG. 12, the receiver apparatus 4200 as illustrated in FIG. 12 is configured to include a restoring portion 2204 instead of the restoring portion 2203. Further, the exclusive-NOR circuit 2102a and the restoring portion 2204 constitute restoring means 2107.

Referring to FIG. 16, the restoring means 2107 is a restoring circuit, which calculates the difference information B1 and converts the same to the second pixel data B based on the decoded first received data A1 and the second converted received data. The restoring portion 2204 for constituting the restoring means 2107 restores a code and a value of the difference information B1 based on the difference information B1 and the addition bit added by the bit addition portion 1206 of the transmitter apparatus 1200A of FIG. 13, and thereafter, the restoring portion 2204 restores the value of the second pixel data B, and outputs the same to the data coupler portion 2104 by adding the code and the value of the difference information B1 to the value of the first pixel data A. Accordingly, it is possible to decode the multi-value amplitude modulation signal transmitted from the transmitter apparatus 1200A of FIG. 13 to obtain the original video data.

According to the receiver apparatus 4200 of the present embodiment as described above, it is possible that the occurrence probability of the multi-value signal level close to the intermediate level of the transmitter apparatus 1200A becomes larger by using with the transmitter apparatus 1200A, and therefore, it is possible to further reduce the consumed power of the transmission system.

An operation and an action of the transmission system including the transmitter apparatus 1200A and the receiver apparatus 4200 using the multi-value amplitude modulation method, as configured as described above, are described as follows.

First of all, as compared with the transmission system according to the third embodiment, the transmission system according to the present embodiment calculates the difference information between the adjacent pixel data by performing the subtraction operation between the adjacent pixel data, instead of performing the exclusive-OR operation. Accordingly, in case that the difference between the adjacent pixel data is smaller, it is possible to enlarge the occurrence probability of the multi-value signal level close to the intermediate level having the intermediate value between the maximum level and the minimum level of the multi-value amplitude modulation signal included in the difference information at any time.

According to the transmission system of the embodiment as described above, in addition to the advantageous effects of the transmission system according to the third embodiment as described above, it is possible that the occurrence probability of the multi-value signal level close to the intermediate level having the intermediate value between the maximum level and the minimum level of the multi-value amplitude modulation signal is much larger than that of the transmission system according to the third embodiment. Accordingly, it is possible to further reduce the consumed power of the transmission system.

In addition, according to the transmission system of the embodiment as described above, the difference information between the adjacent pixel data is calculated by the subtraction operation between the pixel data. Accordingly, it is possible to simplify a configuration and to reduce the consumed power as compared with the conventional transmission system of the multi-value amplitude modulation method. Further, it is possible to reduce the waste such as the continuous transmission of similar data.

In the embodiment as described above, the case where the number of multi-values is set to 4 is described. However, the embodiment of the present disclosure is not limited thereto. For example, the number of multi-values may be set to a value other than 4 and equal to or more than 2, and may be more optimally set to be a power of two.

Fifth Embodiment

Figure 17:
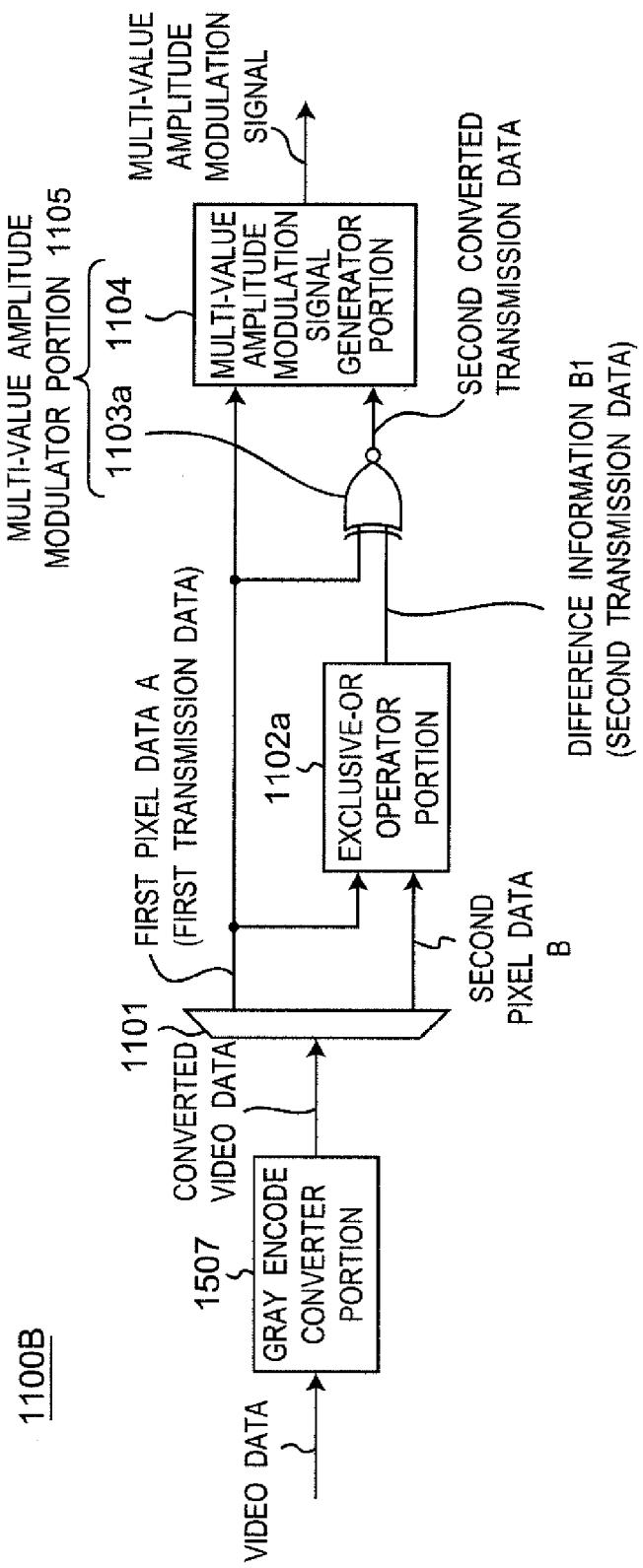
FIG. 17 is a block diagram showing a configuration of a transmitter apparatus 1100B of a transmission system using a 4-value amplitude modulation method according to a fifth embodiment of the present disclosure.

FIG. 17 is a block diagram showing a configuration of a transmitter apparatus 1100B of a transmission system using a 4-value amplitude modulation method according to a fifth embodiment of the present disclosure. The transmitter apparatus 1100B of FIG. 17 is configured to include the data separator portion 1101 of the data separator means, the exclusive-OR operator portion 1102a for performing the exclusive-OR operation every bit, the multi-value amplitude modulator portion 1105, and a gray encode converter portion 1507 disposed in the former stage of the data separator portion 1101. Further, the multi-value amplitude modulator portion 1105 is configured to include the exclusive-NOR circuit 1103a and the multi-value amplitude modulation signal generator portion 1104.

Referring to FIG. 17, the data separator portion 1101 receives each 8-bit parallel video data of the RGB signal, separates the received video data into first pixel data A and second pixel data B adjacent to the first pixel data A, and outputs the first pixel data A to the exclusive-OR operator portion 1102a and the exclusive-NOR circuit 1103a. Further, the data separator portion 1101 outputs the first pixel data A as the first transmission data to the multi-value amplitude modulation signal generator portion 1104. Further, the data separator portion 1101 outputs the second pixel data B to the exclusive-OR operator portion 1102a. It is noted that pixels included in the same horizontal line (that is, which are adjacent to each other in a transverse direction) are set as one data group, as illustrated in FIG. 25.

Referring to FIG. 17, the exclusive-OR operator portion 1102a receives the first pixel data A and the second pixel data B, generates the difference information B1 by performing the exclusive-OR operation, and outputs the same as the second transmission data to the exclusive-NOR circuit 1103a. That is, the exclusive-OR operator portion 1102a is difference calculator means configured to calculate the one difference information B1 based on the first pixel data A and the second pixel data B separated by the data separator portion 1101, and to output the difference information B1 as the second transmission data. In this case, the difference information B1 represents a difference between the first pixel data A and the second pixel data B, for example, the difference information B1 is obtained by performing the exclusive-OR operation, which compares the first pixel data A with the second pixel data B every bit. If the bit value of the first pixel data A is identical with that of the second pixel data B, the difference information B1 has a bit value of "0". If the bit value of the first pixel data A is different from that of the second pixel data B, the difference information B1 has a bit value of "1".

Referring to FIG. 17, the multi-value amplitude modulator portion 1105 allocates the first transmission data to the highest-order bit or the most significant bit of the multi-value amplitude modulation signal, and allocates the second transmission data to bits other than the highest-order bit or the most significant bit. The multi-value amplitude modulator portion 1105 generates the multi-value amplitude modulation signal by performing the multi-value amplitude modulation according to the allocated bit data. That is, the multi-value amplitude modulator portion 1105 is multi-value amplitude modulation means configured to perform the multi-value amplitude modulation according to N-bit data obtained by performing such a bit allocation that the first pixel data is allocated as the first transmission data to the highest-order bit or the most significant bit of the multi-value amplitude modulation signal, and the second transmission data is allocated to bits other than the highest-order bit or the most significant bit, where the N-bit data is obtained by allocating the bit value "0" of the second transmission data to the multi-value signal level closest to the intermediate level having the intermediate value between the maximum level and the minimum level of the multi-value signal level of the multi-value amplitude modulation signal. Referring to FIG. 17, the exclusive-NOR circuit 1103a inputs the first pixel data A and the second transmission data, converts the pixel data and the second transmission data to the second converted transmission data by performing the exclusive-NOR operation, and outputs the second converted transmission data to the multi-value amplitude modulation signal generator portion 1104.

Referring to FIG. 17, the multi-value amplitude modulation signal generator portion 1104 inputs the first transmission data, (which is identical with the first pixel data A), and the second converted transmission data, and generates the multi-value amplitude modulation signal by adding two times amplitude of the second converted transmission data to the first transmission data, and transmits the multi-value amplitude modulation signal to a receiver apparatus 2100B. In addition, in case that the first transmission data A1 and the second converted transmission data is a parallel signal, the multi-value amplitude modulation signal generator portion 1104 also has a function of a parallel to serial conversion for converting these signals to serial signals, respectively.

Referring to FIG. 17, the gray encode converter portion 1507 converts video data represented in binary notation to video data in gray encode notation, and outputs the same as converted video data to the data separator portion 1101. In this case, the gray code means such a code that a Hamming distance between adjacent codes is set to 1, that is, the code having a plurality of digits is mapped so that only one of the digits is different between the adjacent codes.

FIG. 18 is a table showing one example of a correspondence relationship between a numerical value and a bit value of video data, in a gray encode converter portion 1507 of FIG. 17.

Figure 19:
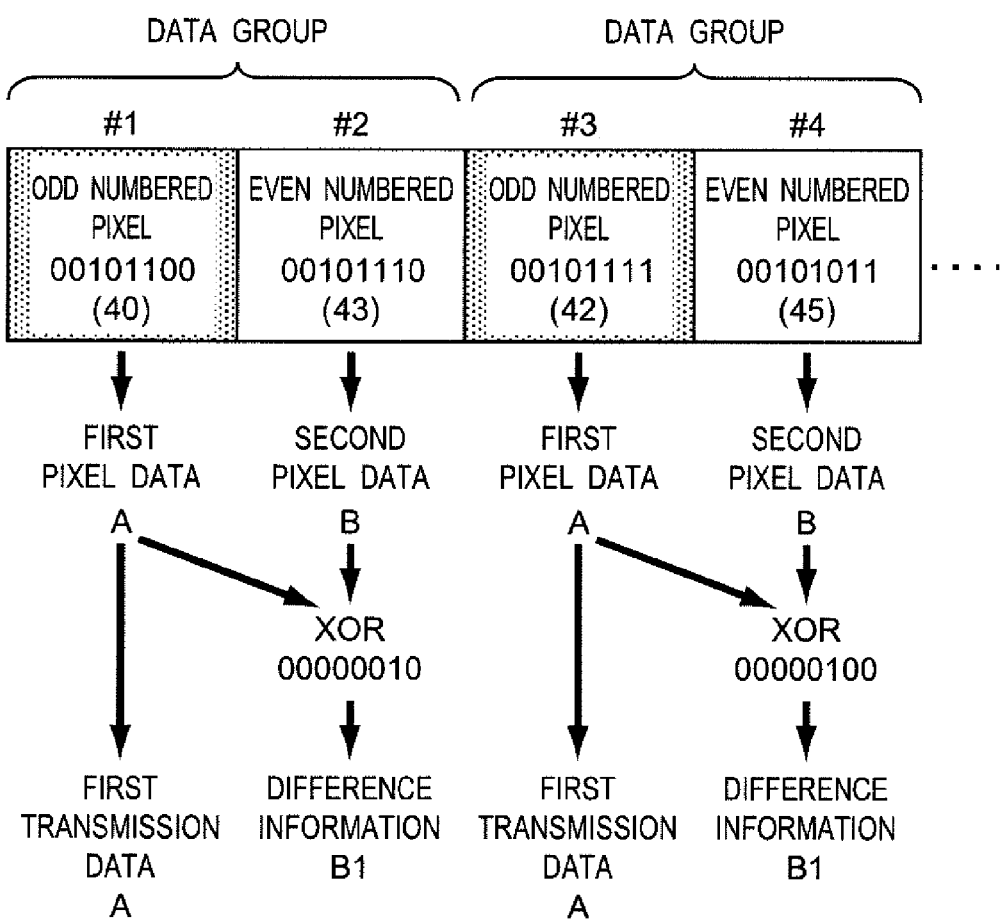
FIG. 19 is a flow chart showing a data process, when a number of bits of pixel data is 8-bit, inside the transmitter apparatus 1100B of FIG. 17.

FIG. 19 is a flow chart showing a data process, when a number of bits of pixel data is 8-bit, inside the transmitter apparatus 1100B of FIG. 17. Referring to FIG. 19, in case that the value of the first pixel data A is 40 in decimal notation, and the value of the second pixel data B is 43 in decimal notation, referring to FIG. 18, the value of the first pixel data A and the value of the second pixel data B are "00101100" and "00101110" in gray encode notation, respectively. The difference information B1 is "00000010", which is calculated by the exclusive-OR of these data.

Figure 20:
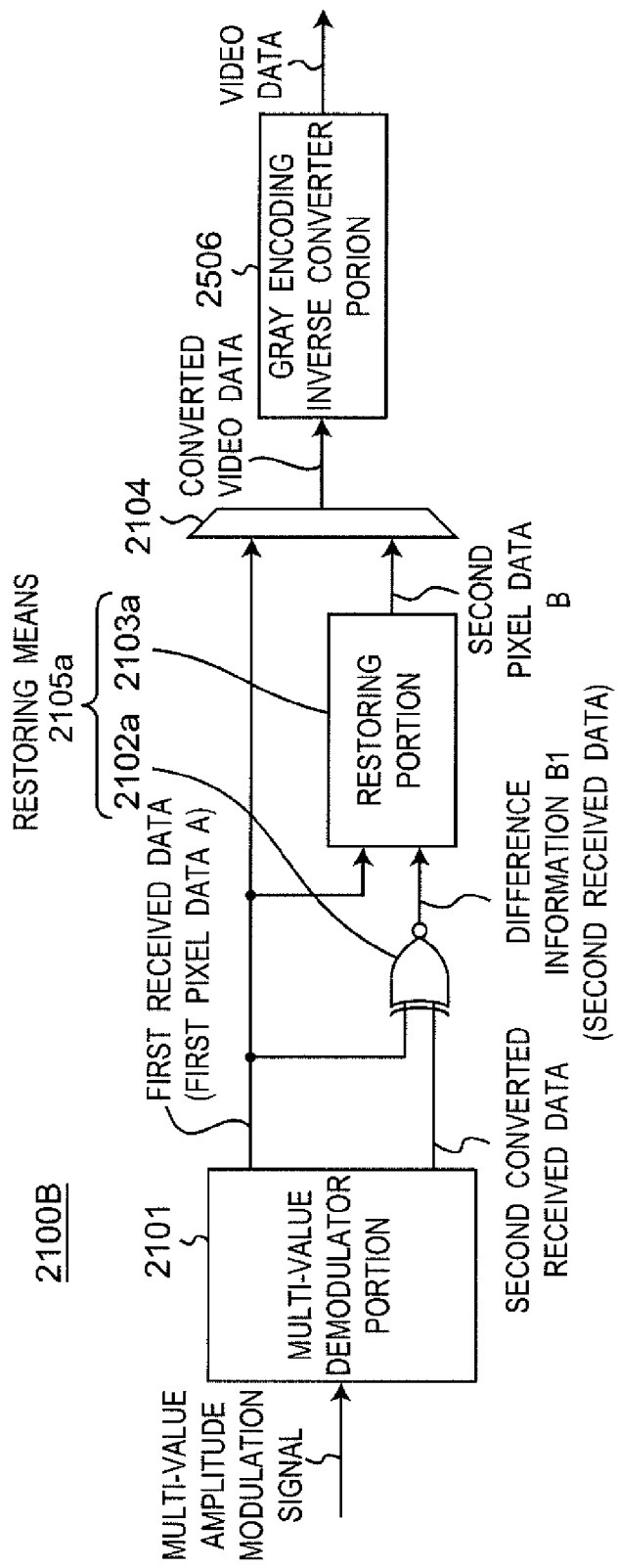
FIG. 20 is a block diagram showing a configuration of a receiver apparatus 2100B of the transmission system using the 4-value amplitude modulation method according to the fifth embodiment of the present disclosure.

FIG. 20 is a block diagram showing a configuration of the receiver apparatus 2100B of the transmission system using the 4-value amplitude modulation method according to the fifth embodiment of the present disclosure. Referring to FIG. 20, the received data corresponding to the highest-order bit or the most significant bit, which is obtained by receiving and decoding the multi-value amplitude modulation signal transmitted by performing the multi-value amplitude modulation of the plurality of N bits per one symbol according to video data of a video signal or a color signal constituting the video signal, or a brightness signal and a color-difference signal, is restored to the first pixel data A, and the received data corresponding to bits other than the highest-order bit or the most significant bit is restored to the second pixel data B.

Referring to FIG. 20, the receiver apparatus 2100B is configured to include the multi-value demodulator portion 2101, the data coupler portion 2104, a gray encoding inverse converter portion 2506 arranged in the post stage of the data coupler portion 2104, and restoring means 2105a. Further, the restoring means 2105a is configured to include the exclusive-NOR circuit 2102a and the restoring portion 2103a. Referring to FIG. 20, the receiver apparatus 2100B performs a reverse process of the transmitter apparatus 1100B. In the present embodiment, when the number of multi-values of the multi-value amplitude modulation is set to 4 (binary transmission by one symbol), and the number of pixels included in one data group is set to 2, a function of each portion of the receiver apparatus 2100B is described as follows.

Referring to FIG. 20, the multi-value amplitude demodulator portion 2101 receives and decodes the multi-value amplitude modulation signal transmitted from the transmitter apparatus 1100B, outputs data corresponding to a higher-order bit of the multi-value amplitude modulation signal as first received data to the restoring means 2105a, outputs data corresponding to a lower bit of the multi-value amplitude modulation signal as second converted received data to the restoring means 2105a, and outputs the same data as the first pixel data A to the data coupler portion 2104. That is, the multi-value demodulator portion 2101 is multi-value demodulator means for demodulating the multi-value amplitude modulation signal to the first received data and the second converted received data, and outputting the first received data as the first pixel data A.

Referring to FIG. 20, the restoring means 2105*a* is a restoring circuit, which calculates the difference information B1 and restores the same to the second pixel data B based on the demodulated first received data and the second converted received data. The exclusive-NOR circuit 2102*a* constituting the restoring means 2105*a* inputs the first received data and the second converted received data, and calculates the difference information B1 by performing the exclusive-NOR operation, and outputs the same as the second received data to the restoring portion 2103*a*. Further, the restoring portion 2103*a* constituting the restoring means 2105*a* restores the first pixel data A and the difference information B1 to the second pixel data B by performing the exclusive-OR operation of the first pixel data A and the difference information B1 to the second pixel data B, and outputs the same to the data coupler portion 2104. In this case, the difference information B1 represents the difference information B1 generated by the transmitter apparatus 1100B, in the present embodiment, the difference information B1 is calculated by the exclusive-OR operation between the adjacent pixel data. Referring to FIG. 20, the data coupler portion 2104 inputs the first pixel data A and the second pixel data B, rearranges each of the pixel data to an original order, and outputs rearranged data as converted video data.

Referring to FIG. 20, the gray encoding inverse converter portion 2506 converts the converted video data notated in the gray encode to data in the normal binary notation, and outputs converted data as the video data. This allows to demodulate the multi-value amplitude modulation signal transmitted from the transmitter apparatus 1100B to obtain the original video data.

An operation and an action of the transmission system including the transmitter apparatus 1100B and the receiver apparatus 2100B using the multi-value amplitude modulation method, as configured as described above, are described as follows.

First of all, as compared with the transmission system according to the first embodiment, the transmission system according to the present embodiment is characterized in that the pixel data is notated in the gray encode instead of the binary notation. Accordingly, in case that the difference of the value between the adjacent pixel data is smaller, the number of different bits becomes smaller.

According to the transmission system of the embodiment as described above, as compared with the transmission system of the first embodiment, the occurrence probability of the bit value "1" in the difference information B1 becomes smaller. Accordingly, the occurrence probability of the multi-value signal level close to the intermediate level having the intermediate value between the maximum level and the minimum level of the multi-value signal level of the multi-value amplitude modulation signal becomes larger. Therefore, it is possible to simplify a configuration and to further reduce the consumed power of the transmission system.

In addition, according to the transmission system of the embodiment as described above, if the value of the pixel data is closer, the small number of bits has changed. Accordingly, even if a bit error causes, it is highly possible to read out the close numeral value of the pixel data in the wrong, that is, it is highly possible to read out the close color in the wrong. Accordingly, it is possible to reduce an influence on the received video of the bit error.

In addition, as a modified embodiment of the present embodiment, the gray encode converter portion 1507 may be disposed in the former stage of the data separator portion 1101 of the transmitter apparatus 1200 of FIG. 9 according to the third embodiment, and the gray encoding inverse converter portion 2506 may be disposed in the post stage of the data coupler portion 2104 of the receiver apparatus 2200 of FIG. 12 according to the third embodiment. In this modified embodiment, in addition to the advantageous effects of the present embodiment, it is further possible to secure the DC balance of the multi-value amplitude modulation signal of the advantageous effects according to the third embodiment. Accordingly, it is possible to also apply to a transmission line such as an AC coupled transmission line, which is limited to a lower frequency band.

In the embodiment as described above, the case where the number of multi-values is set to 4 is described. However, the embodiment of the present disclosure is not limited thereto. For example, the number of multi-values may be set to a value other than 4 and equal to or more than 2, and may be more optimally set to be a power of two.

Sixth Embodiment

Figure 21:
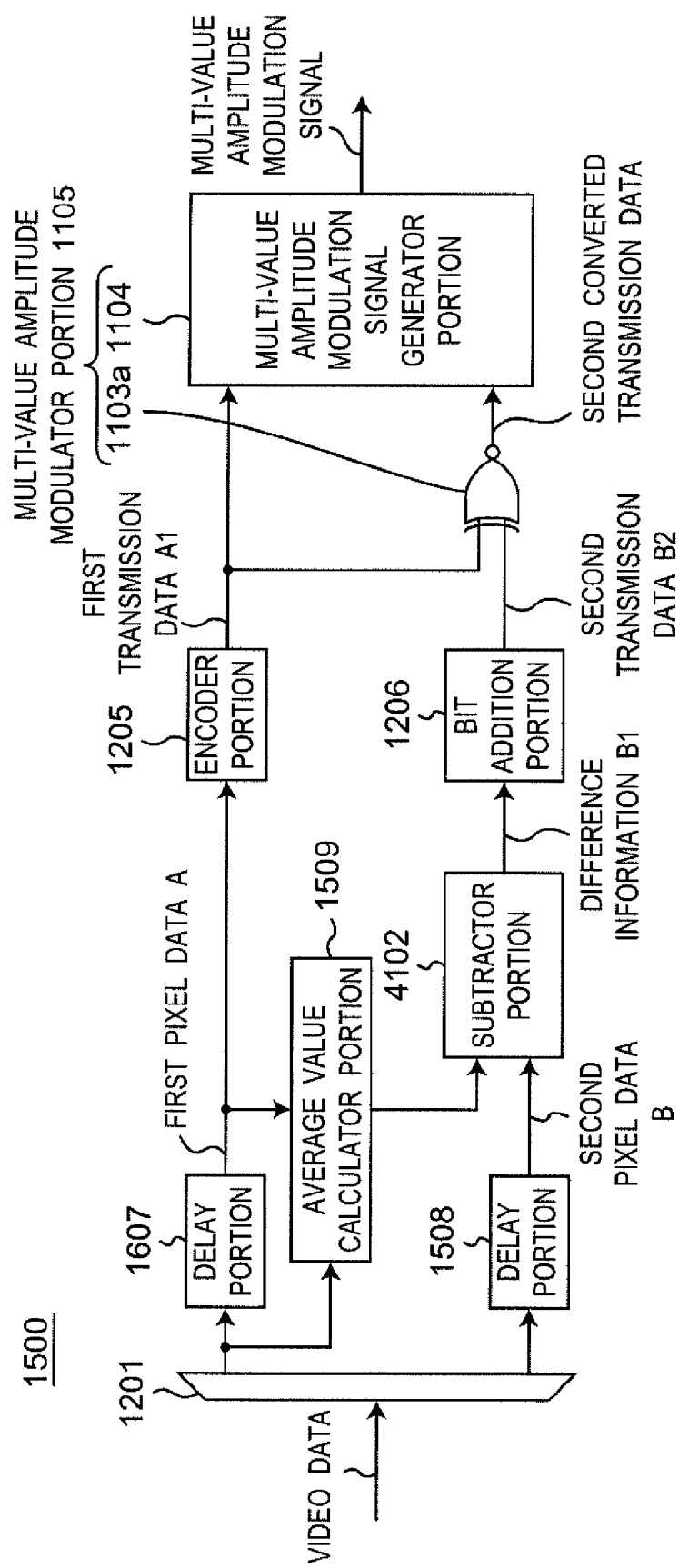
FIG. 21 is a block diagram showing a configuration of a transmitter apparatus 1500 of a transmission system using a 4-value amplitude modulation method according to a sixth embodiment of the present disclosure.

FIG. 21 is a block diagram showing a configuration of a transmitter apparatus 1500 of a transmission system using a 4-value amplitude modulation method according to a sixth embodiment of the present disclosure. As compared with the transmitter apparatus 1200A of FIG. 13, the transmitter apparatus 1500 of FIG. 21 is configured to include a data separator portion 1201 instead of the data separator portion 1101, and to further include a delay portion 1607 disposed in the former stage of the encoder portion 1205, an average value calculator portion 1509 for inputting input and output data of the delay portion 1607, which is disposed in the former stage of the subtractor portion 4102, and a delay portion 1508 disposed between the subtractor portion 4102 and the data separator portion 1101.

Referring to FIG. 21, the data separator portion 1201 receives each 8-bit parallel video data of the RGB signal, separates the received video data into first pixel data A and second pixel data B adjacent to the first pixel data A every data group, and outputs the first pixel data A to the delay portion 1607 and the average value calculator portion 1509. Further, the data separator portion 1201 outputs the second pixel data B to the delay portion 1508. Referring to FIG. 21, the delay portion 1607 inputs the first pixel data A, gives a delay corresponding to a time necessary to transmit one data group to the first pixel data A, and outputs the same to the encoder portion 1205 and the average value calculator portion 1509. In addition, referring to FIG. 21, the delay portion 1508 inputs the second pixel data B, and gives a delay corresponding to a time necessary to transmit one data group to the second pixel data B, and outputs the same to the subtractor portion 4102.

Referring to FIG. 21, the average value calculator portion 1509 calculates an average of two pixel data adjacent to the second pixel data B, that is, the average value calculator portion 1509 obtains an average value between the first pixel data A included in the same data group and the first pixel data A included in the following transmitted data group, and outputs the average value to the subtractor portion 4102. In this case, if these average values are not integer numbers, these average values are rounded-down or rounded-up. The subtractor portion 4102 calculates a difference between the second pixel data B and the average value outputted from the average value calculator portion 1509, and outputs the same as the difference information B1 to the bit addition portion 1206.

Figure 22:
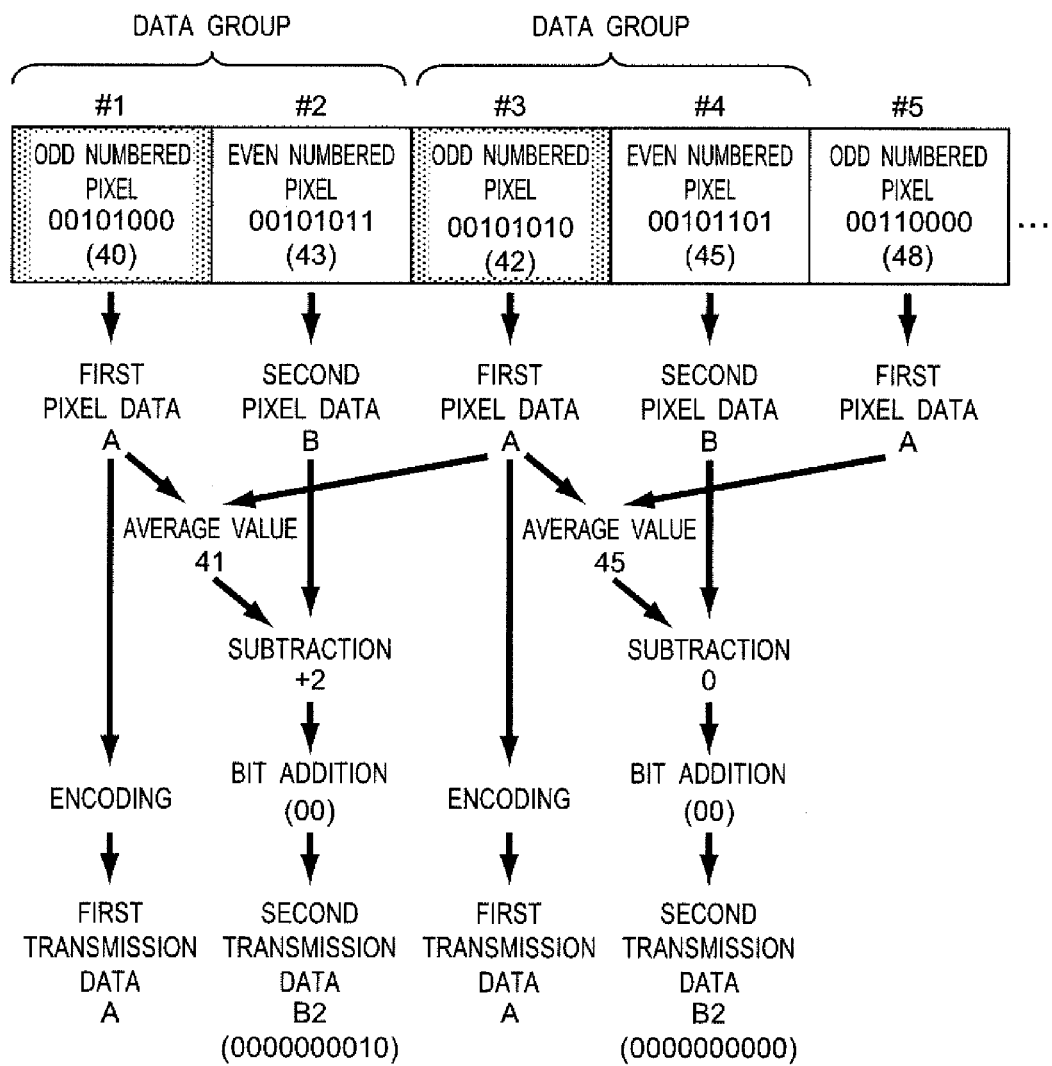
FIG. 22 is a flow chart showing a data process, when a number of bits of pixel data is 8-bit, inside the transmitter apparatus 1500 of FIG. 21.

Next, a calculation method of the difference information B1 of the present embodiment is described using FIG. 22.

FIG. 22 is a flow chart showing a data process, when a number of bits of pixel data is 8-bit, inside the transmitter apparatus 1500 of FIG. 21. Referring to FIG. 22, an even numbered pixel #2 is described as an example. An pixel adjacent to the even numbered pixel #2 in a transverse direction is an odd numbered pixel #1 adjacent to the left thereof, and is an odd numbered pixel #3 adjacent to the right thereof. The odd numbered pixel #1 corresponds to the first pixel data A included in the same data group as that of the even numbered pixel #2, and the odd numbered pixel #3 corresponds to the first pixel data A included in the following transmitted data group. The value of the odd numbered pixel #1 is 40 in decimal notation, and the value of the odd numbered pixel #3 is 42 in decimal notation. Accordingly, the average value of these values is 41. Next, the value of second pixel data B (the even numbered pixel #2) is 43 in decimal notation, and therefore, the value "+2" of the difference information B1 is obtained by subtracting the average value 41 from this value of 43. The following bit addition process is performed in the same way as that of the third embodiment.

Figure 23:
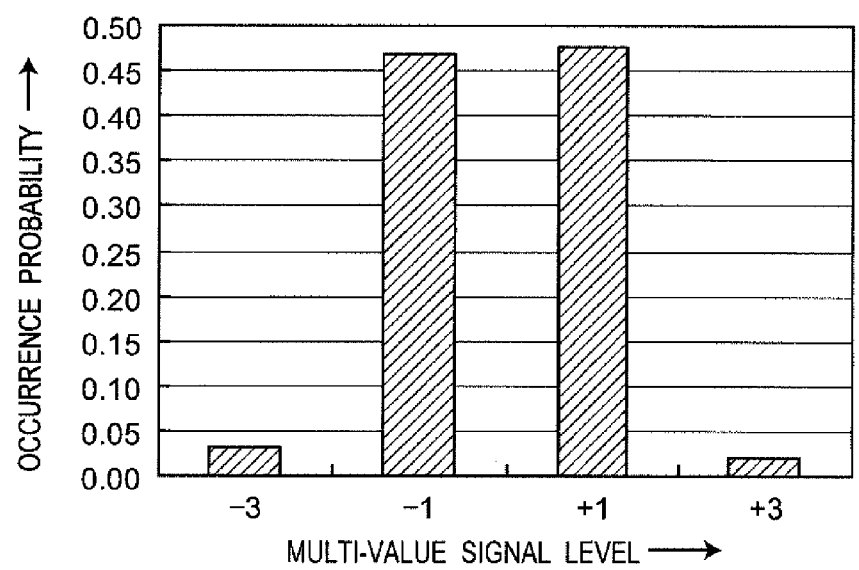
FIG. 23 is a graph showing an occurrence probability distribution of a multi-value signal level of a multi-value amplitude modulation signal of the transmitter apparatus 1500 of FIG. 21, which is obtained by a calculation.

FIG. 23 is a graph showing an occurrence probability distribution of a multi-value signal level of a multi-value amplitude modulation signal of the transmitter apparatus 1500 of FIG. 21, which is obtained by a calculation. Referring to FIG. 23, as compared with FIG. 15 showing the occurrence probability distribution of a multi-value signal level of a multi-value amplitude modulation signal of the transmitter apparatus 1200A of FIG. 13, in fact, it is understood that the occurrence probability of the multi-value signal level close to the intermediate level due to the transmitter apparatus 1500 according to the present embodiment becomes larger. That is, according to the transmitter apparatus 1200A of FIG. 13, the value of the difference information B1 becomes larger in an image portion having a larger variation of the value of the pixel data, and the multi-value signal level +3 or the multi-value signal level −3 occurs in relatively large numbers. On the other hand, according to the transmitter apparatus 1500 of the present embodiment, the value of the difference information B1 is close to 0 even in an image portion having a larger variation of the value of the pixel data, and therefore, it is possible to further reduce the occurrence probabilities of the multi-value signal level +3 and the multi-value signal level −3. Accordingly, it is possible to further reduce the consumed power of the transmission system.

Figure 24:
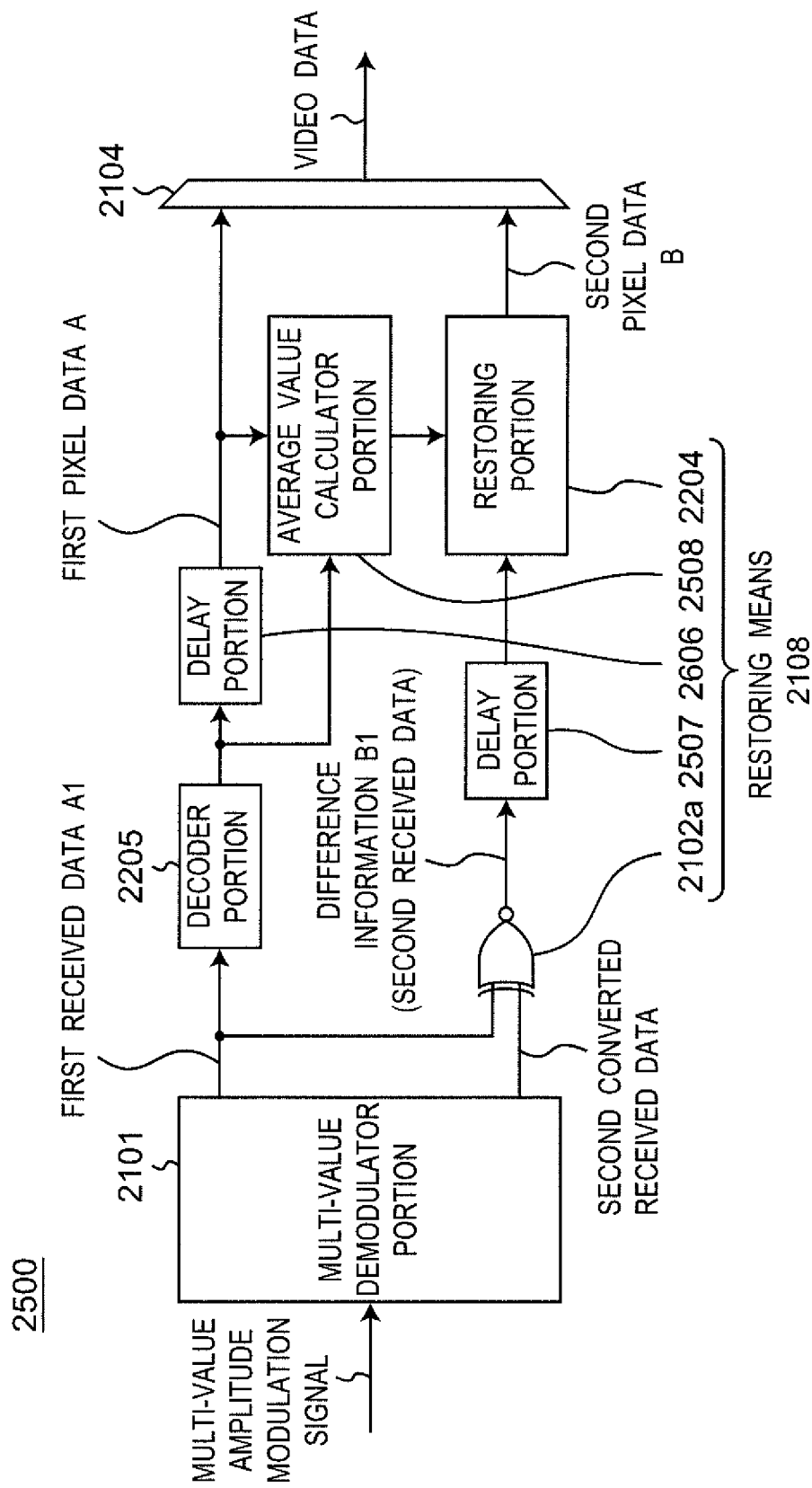
FIG. 24 is a block diagram showing a configuration of a receiver apparatus 2500 of the transmission system using the 4-value amplitude modulation method according to the sixth embodiment of the present disclosure.

FIG. 24 is a block diagram showing a configuration of a receiver apparatus 2500 of the transmission system using the 4-value amplitude modulation method according to the sixth embodiment of the present disclosure. As compared with the receiver apparatus 4200 of FIG. 16, the receiver apparatus 2500 of FIG. 24 is configured to further include a delay portion 2606 disposed in the post stage of the decoder portion 2205, an average value calculator portion 2508 for inputting input and output data of the delay portion 2606, which is disposed in the former stage of the restoring portion 2103a, and a delay portion 2507 disposed between the exclusive-NOR circuit 2102a and the restoring portion 2103a. In addition, the exclusive-NOR circuit 2102a, the average value calculator portion 2508, the restoring portion 2103a, the delay portions 2606 and 2507 constitute restoring means 2108.

As compared with the restoring means 2107 of the receiver apparatus 4200 according to the fourth embodiment, the restoring means 2108 of FIG. 24 restores the pixel data based on the average value between the pixel data adjacent to the pixel data to be restored and the difference information between the pixel data to be restored, instead of the pixel data to be restored based on the difference information calculated by the subtraction between the adjacent pixel data. Referring to FIG. 24, the restoring means 2108 is a restoring circuit for calculating the difference information B1 and restoring the same to the second pixel data B based on the demodulated first received data A1 and the second converted received data, the restoring means 2108 restores and outputs the second pixel data B to the data coupler portion 2104 in the same operation as that of the restoring means 2107 of FIG. 16. This is described in detail as follows.

Referring to FIG. 24, the delay portion 2606 inputs the first received data A1 decoded by the decoder portion 2205, gives a delay corresponding to a time necessary to transmit one data group to the decoded first received data A1, and outputs the same to the average value calculator portion 2508 and the data coupler portion 2104. In addition, referring to FIG. 24, the delay portion 2507 inputs the second received data, gives a delay corresponding to a time necessary to transmit one data group to the second received data B2, and outputs the same to the restoring portion 2204.

Referring to FIG. 24, the average value calculator portion 2508 calculates an average value of two pixel data adjacent to the second pixel data, that is, the average value calculator portion 2508 calculates an average value between the first pixel data included in the same data group and the first pixel data A included in the following received data group, and outputs the same to the restoring portion 2204. If these average values are not integer numbers, these average values are rounded-down or rounded-up. The restoring portion 2204 restores a code and a value of the difference information B1 from the difference information B1, and restores the value of the second pixel data B by adding the same to the average value outputted from the average value calculator portion 2508. This allows to demodulate the multi-value amplitude modulation signal transmitted from the transmitter apparatus 1500 of FIG. 21 to obtain the original video data.

First of all, as compared with the transmission system according to the fourth embodiment, the transmission system according to the present embodiment calculates the average value between the pixels adjacent to both sides For example, left side and right side) of an objective pixel, and calculates the difference information between the adjacent pixels by subtracting between the following objective pixel and the average value. Therefore, in case that the variation of the value of the pixel data is relatively large, the value of the difference information can be smaller than that of the difference information due to the subtraction according to the fourth embodiment. Accordingly, as compared with the transmission system according to the fourth embodiment, it is possible to enlarge the occurrence probability of the multi-value signal level close to the intermediate level having the intermediate value between the maximum level and the minimum level of the multi-value signal level of the multi-value amplitude modulation signal.

According to the transmission system of the embodiment as described above, as compared with the transmission system of the fourth embodiment as described above, even in case that the variation of the value of the pixel data is relatively large, it is possible to further reduce the consumed power of the transmission system.

It is noted that the exclusive-OR operator portion 1102a of FIG. 1 may be used instead of the subtractor portion 4102 of FIG. 21 as a modified embodiment of the present embodiment. In this case, it is possible to obtain the same advantageous effects as those of the present embodiment.

In the embodiment as described above, the case where the number of multi-values is set to 4 is described. However, the embodiment of the present disclosure is not limited thereto. For example, the number of multi-values may be set to a value other than 4 and equal to or more than 2, and may be more optimally set to be a power of two.

Seventh Embodiment

Figure 28:
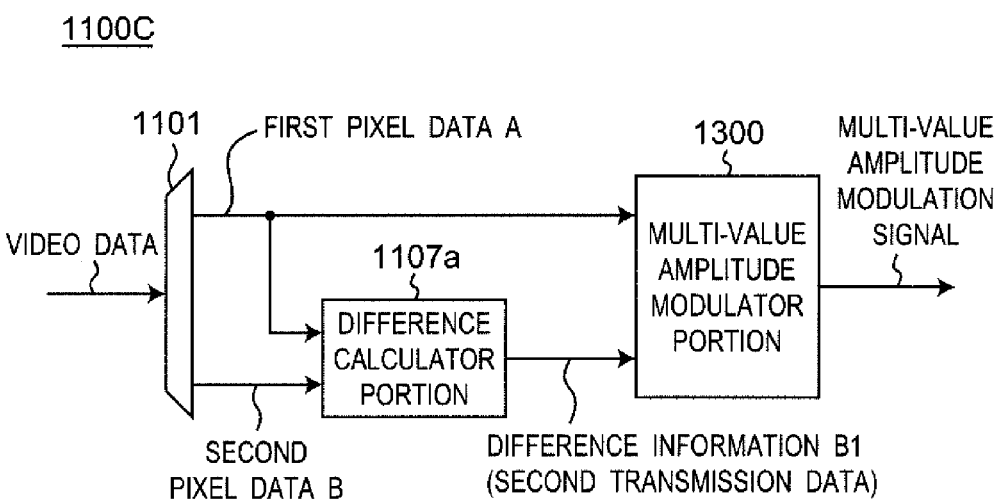
FIG. 28 is a block diagram showing a configuration of a transmitter apparatus 1100C of a transmission system using a 4-value amplitude modulation method according to a seventh embodiment of the present disclosure.

FIG. 28 is a block diagram showing a configuration of a transmitter apparatus 1100C of a transmission system using a 4-value amplitude modulation method according to a seventh embodiment of the present disclosure. As compared with the transmitter apparatus 1100 of FIG. 1, the transmitter apparatus 1100C of FIG. 28 is configured to include a multi-amplitude modulator portion 1300 instead of the multi-value amplitude modulator portion 1105.

Figure 29:
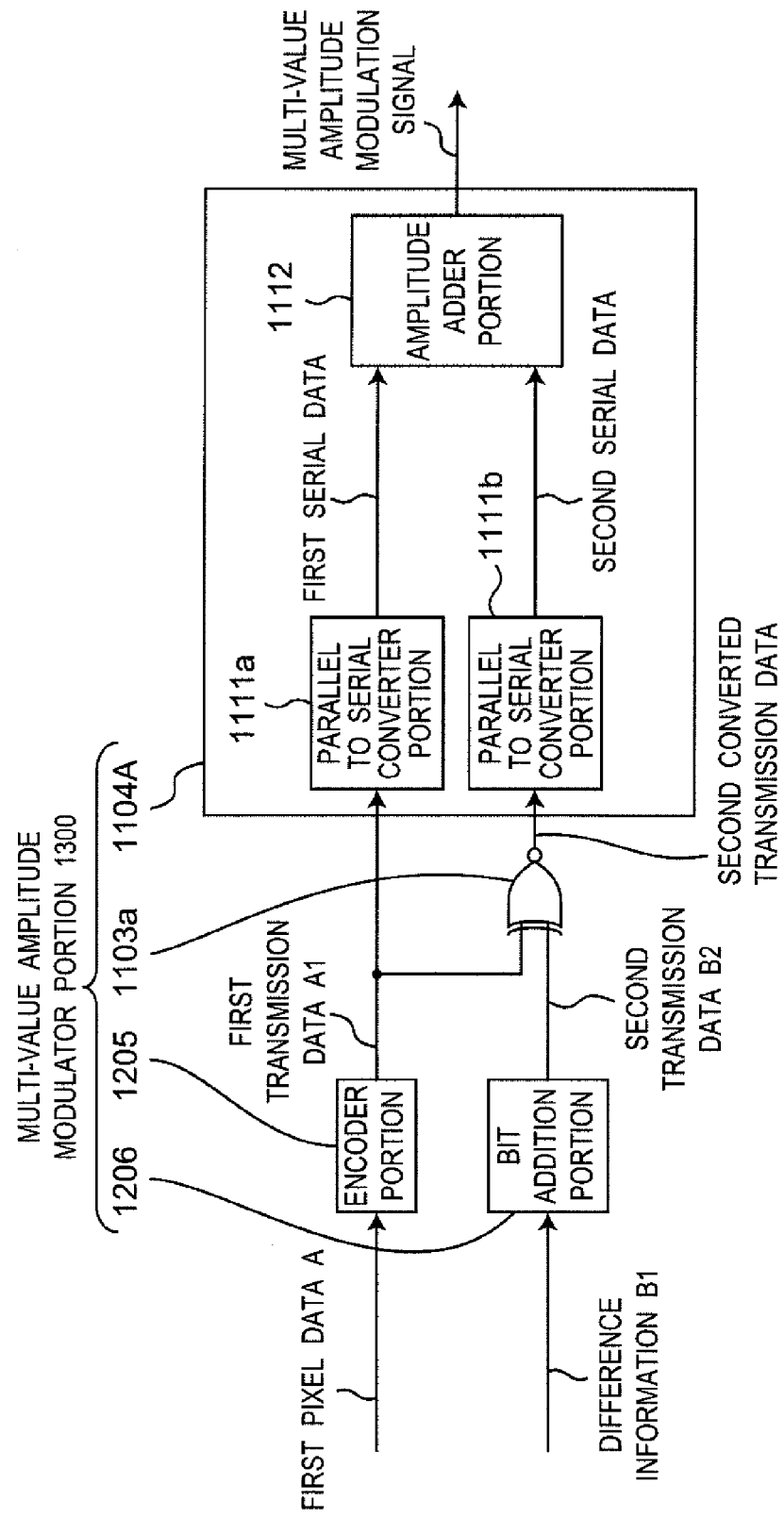
FIG. 29 is a block diagram showing components of a multi-value amplitude modulator portion 1300 of FIG. 28.

FIG. 29 is a block diagram showing components of the multi-value amplitude modulator portion 1300 of FIG. 28. Referring to FIG. 29, the multi-value amplitude modulator portion 1300 is configured to include the encoder portion 1205, the bit addition portion 1206, the exclusive-NOR circuit 1103a, and a multi-value amplitude modulation signal generator portion 1104A. Further, the multi-value amplitude modulation signal generator portion 1104A is configured to include parallel to serial converter portions 1111a and 1111b, and an amplitude adder portion 1112.

Referring to FIG. 29, the encoder portion 1205 inputs the first pixel data A, performs an encoding process thereof, and outputs data as the first transmission data A1 to the exclusive-NOR circuit 1103a and the multi-value amplitude modulation signal generator portion 1104A. In this case, the encoding process executes a process such as an encoding process by an 8B10B encoding or a scramble process so that the occurrence probability of the bit value "0" of the first transmission data A1 is equal to that of the bit value "1" thereof.

Referring to FIG. 29, the bit addition portion 1206 inputs the difference information B1 from the difference calculator portion 1107a, and outputs data as the second transmission data B2 to the exclusive-NOR circuit 1103a, where the data is obtained by adding addition bits of the same number of bits as that of an overhead caused by the encoder portion 1205 to the difference information B1. For example, in case that the encoder portion 1205 performs the 8B10B encoding, when the first pixel data A of 8 bits is inputted to the encoder portion 1205, the first transmission data of 10 bits is outputted from the encoder portion 1205. Accordingly, an overhead of 2 bits occurs. In contrast, the bit addition portion 1206 adds an addition bit of 2 bits (For example, "00") to the exclusive-NOR circuit 1103a, and therefore, the number of bits of the second transmission data B2 is the same 10-bit as that of the first transmission data A1. In this case, it is possible to perform a fine adjustment of the occurrence probabilities of the bit value "1" and the bit value "0" of the second transmission data B2 by setting a value of the addition bit. It is noted that the bit addition portion 1206 may be omitted in case that the overhead does not occur by performing the encoding process of the encoder portion 1205 (For example, in case of the scramble process).

Referring to FIG. 29, the exclusive-NOR circuit 1103a inputs the first transmission data A1 and the second transmission data B2, converts the first transmission data A1 and the second transmission data B2 to a second converted transmission data by performing the exclusive-NOR operation, and outputs the second converted transmission data to the multi-value amplitude modulation signal generator portion 1104A.

Referring to FIG. 29, the parallel to serial converter portion 1111a of the multi-value amplitude modulation signal generator portion 1104A parallel-to-serial-converts the first transmission data A1 of the parallel signal outputted from the encoder portion 1205 to generate and output a serial signal as first serial data to the amplitude adder portion 1112. In addition, the parallel to serial converter portion 1111b of the multi-value amplitude modulation signal generator portion 1104A parallel-to-serial-converts the second converted transmission data of the parallel signal outputted from the exclusive-NOR circuit 1103a to generate and output a serial signal as second serial data to the amplitude adder portion 1112.

Referring to FIG. 29, the amplitude adder portion 1112 inputs the first serial data and the second serial data, generates the multi-value amplitude modulation signal by adding two times amplitude of the second serial data to the first serial data, and transmits the same to a receiver apparatus 2200A.

Referring to FIGS. 28 and 29, the multi-amplitude modulator portion 1300 allocates the first transmission data A1 to a first bit such as the highest-order bit or the most significant bit of the multi-value amplitude modulation, and allocates the second transmission data B2 to a second bit such as a bit other than the highest-order bit or the most significant bit of the multi-value amplitude modulation. The multi-amplitude modulator portion 1300 generates the multi-value amplitude modulation signal by performing the multi-value amplitude modulation according to the allocated bit data. That is, in case that the multi-amplitude modulator portion 1300 allocates the first pixel data as the first transmission data to a first bit such as the highest-order bit or the most significant bit of the multi-value amplitude modulation, and allocates the second transmission data to a second bit such as a bit other than the highest-order bit or the most significant bit, the multi-amplitude modulator portion 1300 performs the multi-value amplitude modulation so that predetermined binary data corresponds to the multi-value signal level closest to the intermediate level having the intermediate value between the maximum level and the minimum level of the multi-value signal level of the multi-value amplitude modulation signal. The predetermined binary data is defined by such data that a predetermined first bit value "0" is allocated to the second bit of the predetermined binary data, where the occurrence probability of the predetermined first bit value "0" is larger than that of the predetermined second bit value "1".

In other words, in case that the first pixel data is allocated as the first transmission data to the first bit of the multi-value amplitude modulation, and each of the difference information is allocated as the second transmission data to the second bit of the multi-value amplitude modulation, the multi-amplitude modulator portion 1300 performs the multi-value amplitude modulation so that the predetermined binary data corresponds to the maximum level and the minimum level of the multi-value signal level of the multi-value amplitude modulation signal. The predetermined binary data is defined by such data that the predetermined second bit value "1" is allocated to the second bit of the predetermined binary data, where the occurrence probability of the predetermined second bit value "1" is lower than that of the predetermined first bit value "0".

Figure 30:
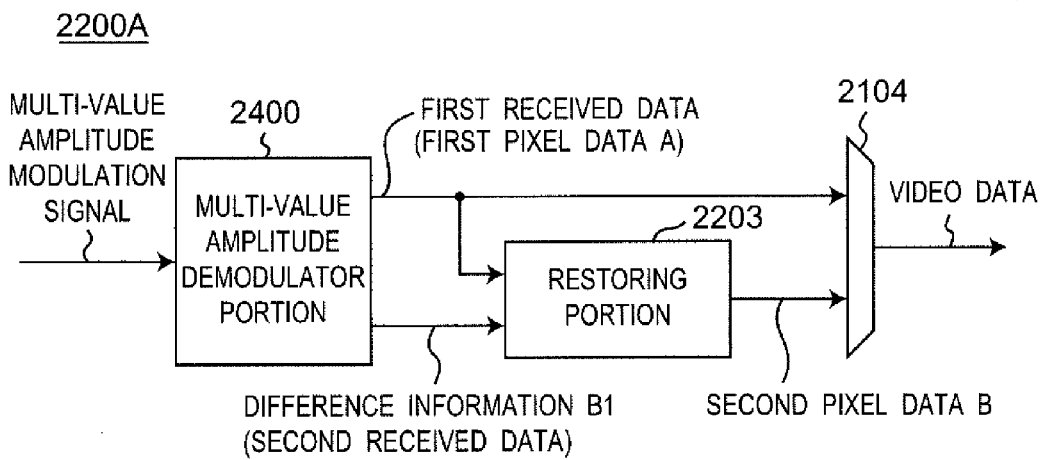
FIG. 30 is a block diagram showing a configuration of a receiver apparatus 2200A of the transmission system using the 4-value amplitude modulation method according to the seventh embodiment of the present disclosure.

FIG. 30 is a block diagram showing a configuration of the receiver apparatus 2200A of the transmission system using the 4-value amplitude modulation method according to the seventh embodiment of the present disclosure. As compared with the receiver apparatus 2100 of FIG. 5, the receiver apparatus 2200A of FIG. 30 is configured to include a multi-value amplitude demodulator portion 2400 instead of the multi-value amplitude demodulator portion 2301, and the restoring portion 2203 instead of the restoring portion 2103a.

Referring to FIG. 30, the restoring portion 2203 removes the addition bits added by the bit addition portion 1206 of FIG. 29 from the difference information B1, and thereafter, the restoring portion 2203 restores data to the second pixel data B by performing an operation such as the exclusive-OR operation between the removed data and the first pixel data A, and outputs the second pixel data B as the second pixel data B to the data coupler portion 2104. In this case, the difference information B1 represents the difference information B1 generated by the transmitter apparatus 1100C. For example, in the transmitter apparatus 1100C, the difference information B1 is calculated by performing the exclusive-OR operation between the adjacent pixel data.

Figure 31:
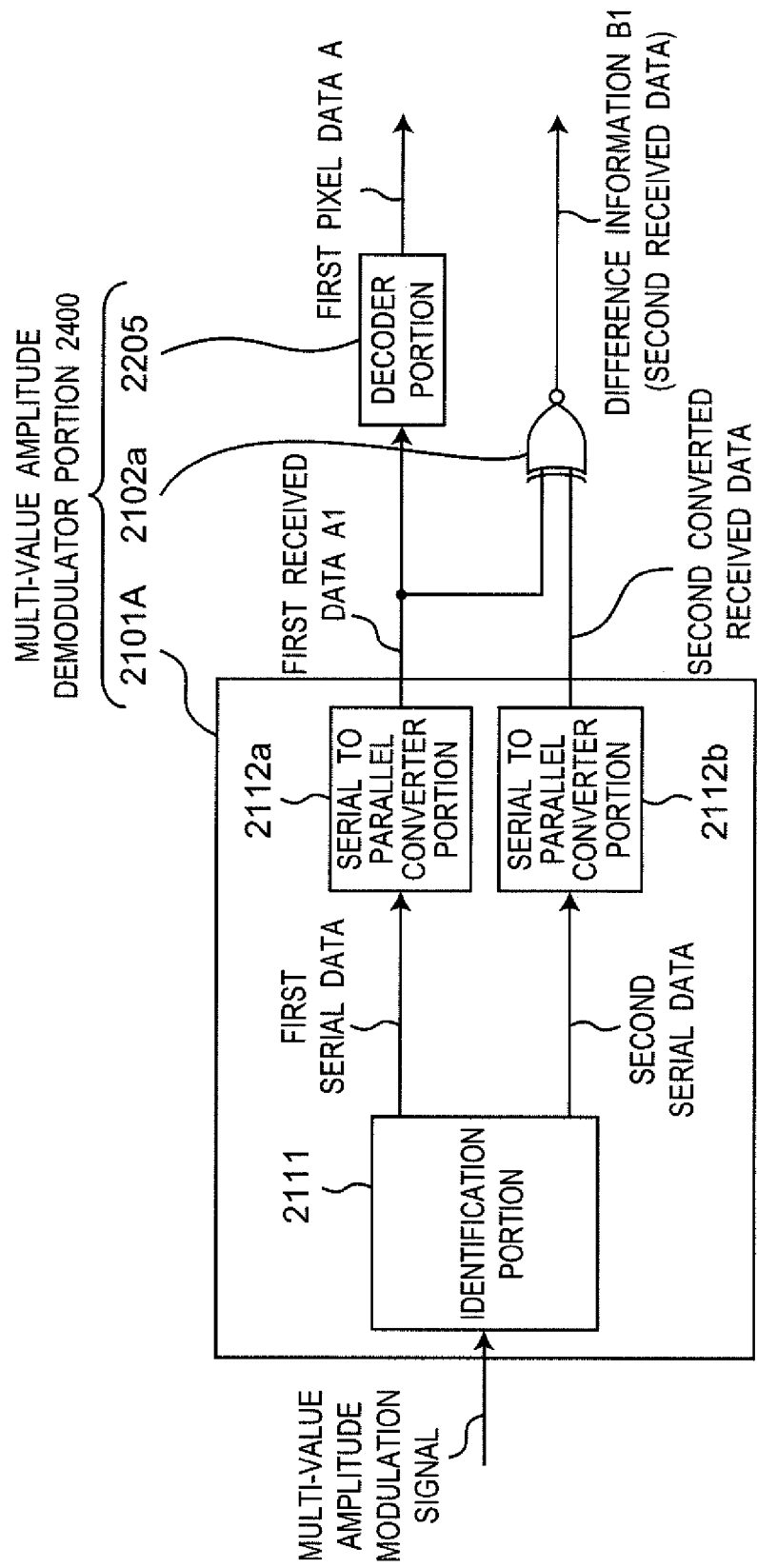
FIG. 31 is a block diagram showing components of a multi-value amplitude demodulator portion 2400 of FIG. 30.

FIG. 31 is a block diagram showing components of the multi-value amplitude demodulator portion 2400 of FIG. 30. Referring to FIG. 31, the multi-value amplitude demodulator portion 2400 is configured to include a multi-value demodulator portion 2101A, the exclusive-NOR circuit 2102a, and the decoder portion 2205. Further, the multi-value demodulator portion 2101A is configured to include an identification portion 2111, and serial to parallel converter portions 2112a and 2112b.

Referring to FIG. 31, the identification portion 2111 inputs the multi-value amplitude modulation signal outputted from the transmitter apparatus 1100C of FIG. 28, identifies first serial data and second serial data from the same signal, outputs the first serial data to the serial to parallel converter portion 2112a, and outputs the second serial data to the serial to parallel converter portion 2112b. In addition, the serial to parallel converter portion 2112a generates a parallel signal by serial-to-parallel-converting the first serial data to generate and output the parallel signal as the first received data A1 to the decoder portion 2205 and the exclusive-NOR circuit 2102a. Further, the serial to parallel converter portion 2112b generates a parallel signal by serial-to-parallel-converting the second serial data, and outputs the parallel signal as the second converted received data to the exclusive-NOR circuit 2102a.

Referring to FIG. 31, the exclusive-NOR circuit 2102a inputs the first received data A1 and the second converted received data, converts the same to the second received data by calculating the difference information B1 by the exclusive-NOR operation, and outputs the second received data to the restoring portion 2203. In addition, the decoder portion 2205 inputs the first received data A1, performs the decoding process based on a decoding format used in the decoder portion 1205 of the transmitter apparatus 1100C of FIG. 29, and outputs the result thereof as the first pixel data A to the data coupler portion 2104 and the restoring portion 2203.

Referring to FIGS. 30 and 31, in case that the multi-value amplitude demodulator portion 2400 allocates a first bit of the multi-value amplitude modulation to the first received data, and allocates a second bit of the multi-value amplitude modulation to the second received data, the multi-value amplitude demodulator portion 2400 demodulates the multi-value amplitude modulation signal to the first received data so that predetermined binary data corresponds to the multi-value signal level closest to the intermediate level having the intermediate value between the maximum level and the minimum level of the multi-value signal level of the multi-value amplitude modulation signal. The predetermined binary data is defined by such data that a predetermined first bit value "0" is allocated to the second bit of the predetermined binary data, where the occurrence probability of the predetermined first bit value "0" is larger than that of the predetermined second bit value "1".

In other words, in case that the first bit of the multi-value amplitude modulation is allocated to the first received data, and the second bit of the multi-value amplitude modulation is allocated to the second received data, the multi-value amplitude demodulator portion 2400 demodulates the multi-value amplitude modulation signal to the first received data so that the predetermined binary data corresponds to the multi-value signal level of the maximum level and the minimum level of the multi-value signal level of the multi-value amplitude modulation signal. The predetermined binary data is defined by such data that the predetermined second bit value "1" is allocated to the second bit of the predetermined binary data, where the occurrence probability of the predetermined second bit value "1" is lower than that of the predetermined first bit value "0".

According to the receiver apparatus 2200A of the present embodiment as described above, it is possible to receive the multi-value amplitude modulation signal transmitted from the transmitter apparatus 1100C.

An operation and an action of the transmission system including the transmitter apparatus 1100C and the receiver apparatus 2200A using the multi-value amplitude modulation method, as configured as described above, are described as follows.

First of all, the transmission system of the present embodiment transmits data by allocating the first transmission data obtained by encoding the first pixel data A to the first bit such as the highest-order bit or the most significant bit of the multi-value amplitude modulation, and by allocating the difference information B1, which is calculated by performing a difference calculation between the first pixel data A and the second pixel data B, to the second bit such as a lower bit of the multi-value amplitude modulation as data corresponding to the second pixel data B. In particular, the bit value "0" of the difference information B1 having a larger occurrence probability is allocated to the multi-value signal level closest to the intermediate level having the intermediate value between the maximum level and the minimum level of the multi-value signal level of the multi-value amplitude modulation signal. In other words, the bit value "1" of the difference information B1 having a smaller occurrence probability is allocated to the maximum level and the minimum level of the multi-value signal level of the multi-value amplitude modulation signal. Accordingly, it is possible to secure the same SN ratio as that of the binary transmission, and to reduce the consumed power as compared with the conventional transmission system of the multi-value amplitude modulation method.

In addition, according to each of the transmission systems of the embodiment as described above, the difference information between the adjacent pixel data is calculated by the operation such as the exclusive-OR operation between the pixel data. Accordingly, it is possible to simplify a configuration and to reduce the consumed power as compared with the conventional transmission system of the multi-value amplitude modulation method. Further, it is possible to reduce the waste such as the continuous transmission of similar data.

In the embodiment as described above, the parallel to serial converter portions 1111a and 1111b are disposed in the right former stage of the amplitude adder portion 1112, respectively. However, the embodiment of the present disclosure is not limited thereto. Instead of this, the parallel to serial converter portions 1111a and 1111b may be disposed in the right post stage of the encoder portion 1205 and the bit addition portion 1206, respectively. In addition, the parallel to serial converter portions 1111*a* and 1111*b* may be disposed in the right former stage of the encoder portion 1205 and the bit addition portion 1206, respectively. In this case, it is possible to obtain the same advantageous effects as those of the present embodiment.

In addition, in the embodiment as described above, the case where the number of multi-values is set to 4 is described. However, the embodiment of the present disclosure is not limited thereto. For example, the number of multi-values may be set to a value other than 4 and equal to or more than 2, and may be more optimally set to be a power of two.

Eighth Embodiment

Figure 32:
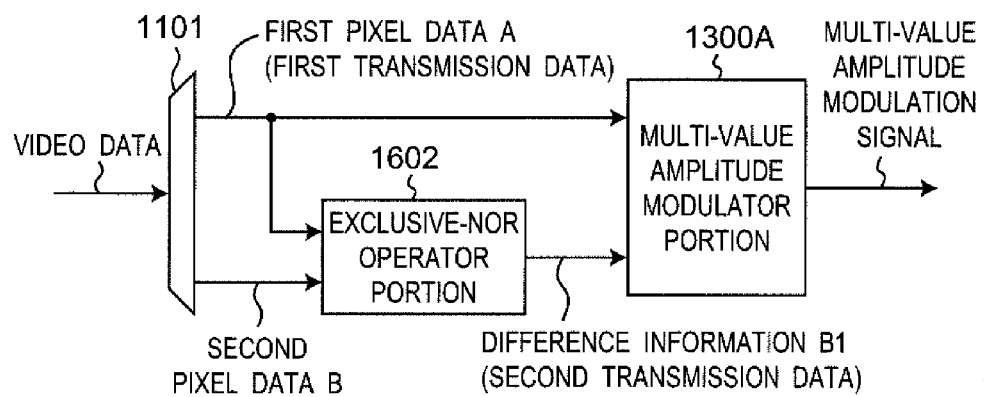
FIG. 32 is a block diagram showing a configuration of a transmitter apparatus 1100D of a transmission system using a 4-value amplitude modulation method according to an eighth embodiment of the present disclosure.

FIG. 32 is a block diagram showing a configuration of a transmitter apparatus 1100D of a transmission system using a 4-value amplitude modulation method according to an eighth embodiment of the present disclosure. As compared with the transmitter apparatus 1100C of FIG. 28, the transmitter apparatus 1100D of FIG. 32 is configured to include an exclusive-NOR operator portion 1602 instead of the difference calculator portion 1107*a*, and a multi-amplitude modulator portion 1300A instead of the multi-amplitude modulator portion 1300. Referring to FIG. 32, the exclusive-NOR operator portion 1602 inputs the first pixel data A and the second pixel data B separated by the data separator portion 1101, calculates the difference information B1 by performing the exclusive-NOR operation, and outputs the difference information B1 as the second transmission data to the multi-amplitude modulator portion 1300A.

Figure 33:
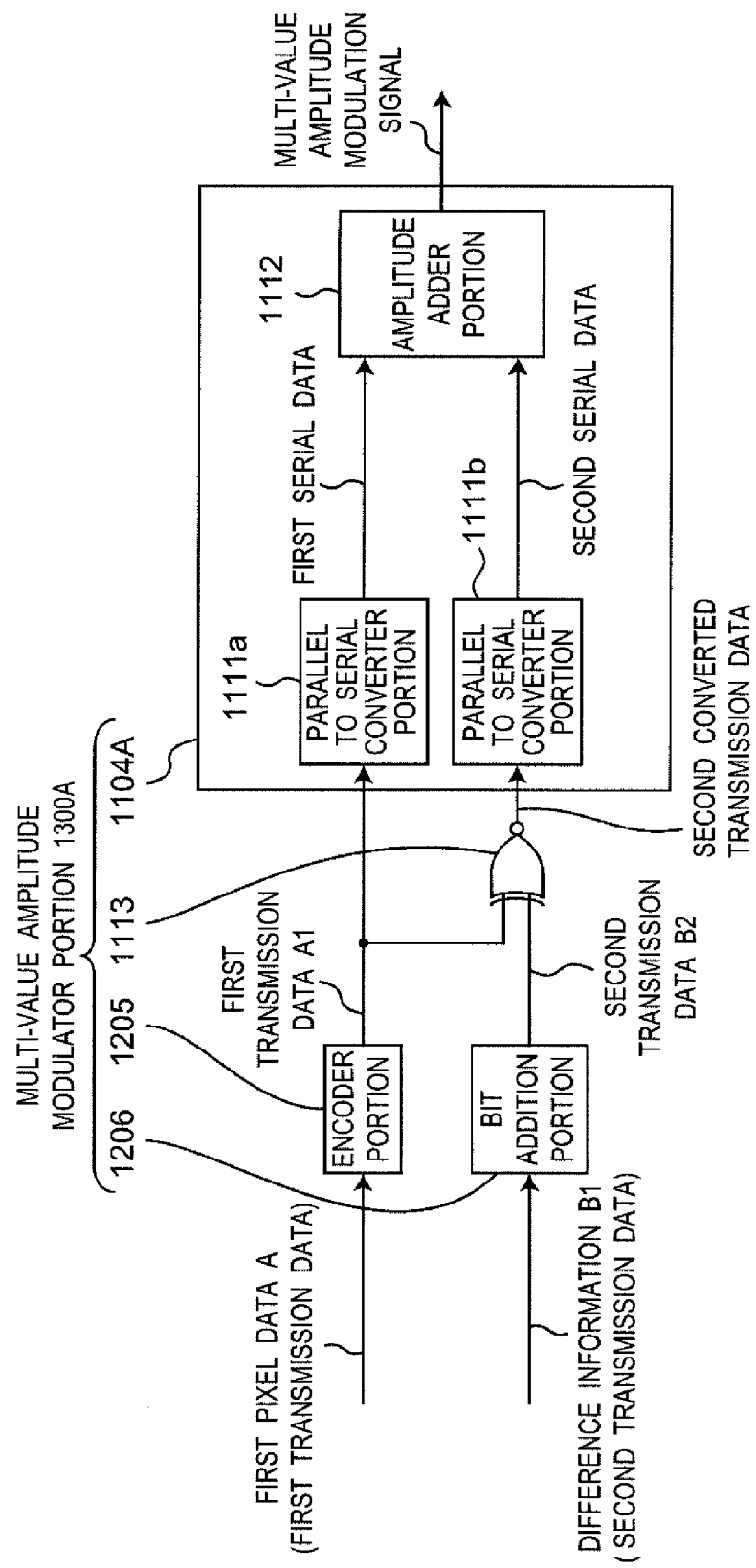
FIG. 33 is a block diagram showing components of a multi-value amplitude modulator portion 1300A of FIG. 32.

FIG. 33 is a block diagram showing components of the multi-value amplitude modulator portion 1300A of FIG. 32. As compared with the multi-value amplitude modulator portion 1300 of FIG. 29, the multi-value amplitude modulator portion 1300A of FIG. 33 is configured to include an exclusive-OR circuit 1113 instead of the exclusive-NOR circuit 1103*a*. Referring to FIG. 33, the exclusive-OR circuit 1113 inputs the first transmission data A1 and the second transmission data B2, performs the exclusive-OR operation, and outputs the result thereof as the second converted transmission data to the parallel to serial converter portion 1111*b*.

Referring to FIGS. 32 and 33, in case that the multi-amplitude modulator portion 1300A allocates data obtained by performing an encoding process on the first pixel data as the first transmission data to the first bit of the multi-value amplitude modulation, and allocates data obtained by adding one bit or a plurality of predetermined bits to the difference information as the second transmission data to the second bit of the multi-value amplitude modulation, the multi-amplitude modulator portion 1300A performs a multi-value amplitude modulation so that the predetermined binary data corresponds to the multi-value signal level closest to the intermediate level having the intermediate value between the maximum level and the minimum level of the multi-value signal level of the multi-value amplitude modulation signal. The predetermined binary data is defined by such data that the predetermined second bit value "0" is allocated to the second bit of the predetermined binary data, where the occurrence probability of the predetermined first bit value "1" is higher than that of the predetermined second bit value "0".

In other words, in case that the multi-amplitude modulator portion 1300A allocates data obtained by performing an encoding process on the first pixel data as the first transmission data to the first bit of the multi-value amplitude modulation, and allocates data obtained by adding one bit or a plurality of predetermined bits to each of the difference information as the second transmission data to the second bit of the multi-value amplitude modulation, the multi-amplitude modulator portion 1300A performs a multi-value amplitude modulation so that the predetermined binary data corresponds to the maximum level and the minimum level of the multi-value signal level of the multi-value amplitude modulation signal. The predetermined binary data is defined by such data that the predetermined second bit value "0" is allocated to the second bit, where the occurrence probability of the predetermined second bit value "0" is lower than that of the predetermined first bit value "1".

Figure 34:
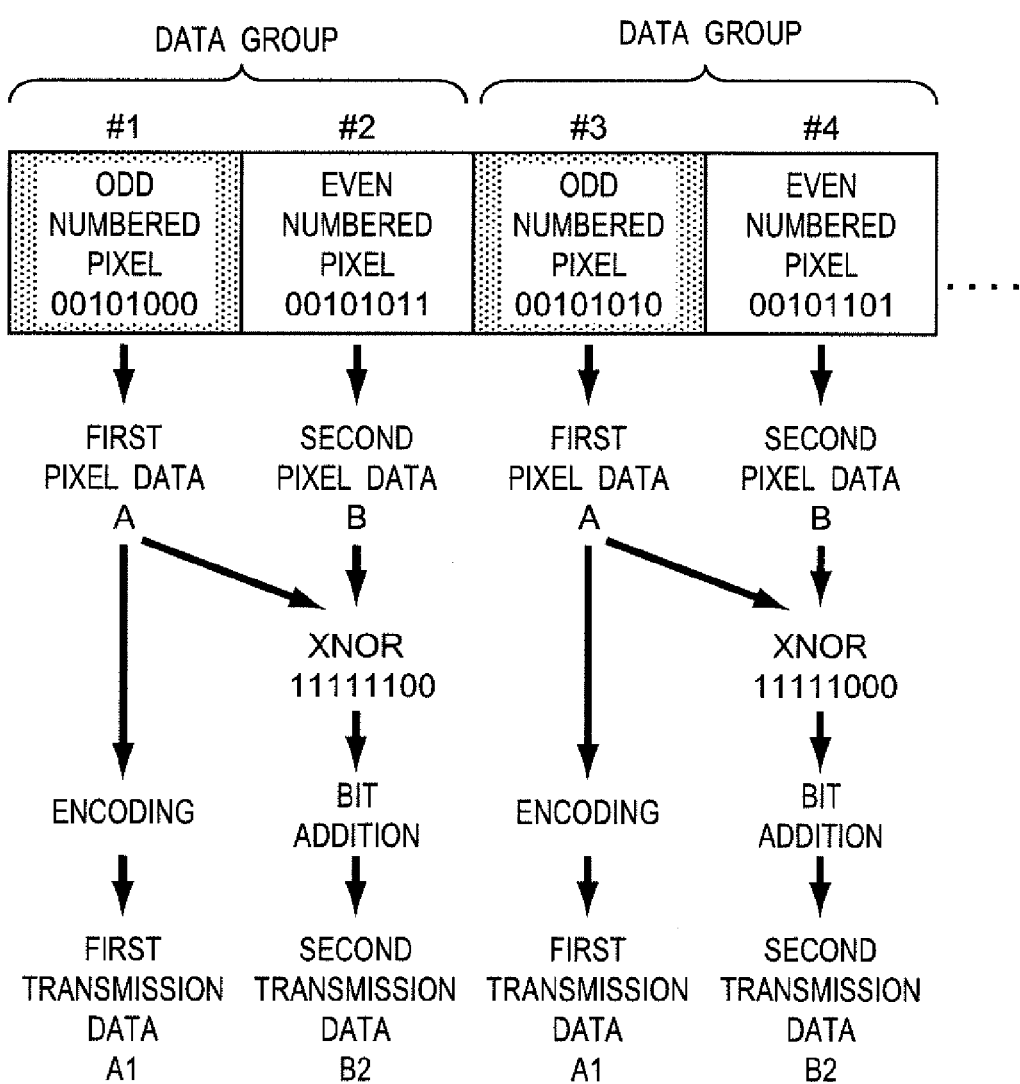
FIG. 34 is a flow chart showing a data process, when a number of pixel data is 8-bit, inside the transmitter apparatus 1100D of FIG. 32.

FIG. 34 is a flow chart showing a data process, when a number of pixel data is 8-bit, inside the transmitter apparatus 1100D of FIG. 32. Referring to FIG. 34, for example, in case that a value of the first pixel data A is "00101000" in binary notation, and a value of the second pixel data B is "00101011" in binary notation, when performing the exclusive-NOR operation between the first pixel data A and the second pixel data B, the bit value of the last 2 bits differs from each other, and therefore, the value of the difference information B1 is "11111100" in binary notation.

FIG. 35A is a table showing a multi-value signal level arrangement of a multi-value amplitude modulation signal generated by the multi-amplitude modulator portion 1300A of the transmitter apparatus 1100D of FIG. 32 based on first pixel data A and difference information B1. In this case, in the high definition video data, the data difference between the adjacent pixels is smaller. Accordingly, when the first pixel data A is compared with the second pixel data B, the number of bits having different values is smaller. For example, if the bit value is "1" when the data difference between the pixels becomes smaller, in the difference information B1 representing a difference between the adjacent pixel data, the occurrence probability of the bit value "1" is larger than that of the bit value "0". Accordingly, it is possible to lower the average signal amplitude of the multi-value amplitude modulation signal and to reduce the consumed power of the transmission system by allocating the bit value "1" to the multi-value signal levels (+1 and −1) closest to the intermediate level having the intermediate value between the maximum level (+3) and the minimum level (−3) of the multi-value signal level of the generated multi-value amplitude modulation signal. In other words, it is possible to lower the average signal amplitude of the multi-value amplitude modulation signal and to reduce the consumed power of the transmission system by allocating the bit value "0" to the maximum level (+3) and the minimum level (−3) of the multi-value signal level of the generated multi-value amplitude modulation signal.

Figure 36:
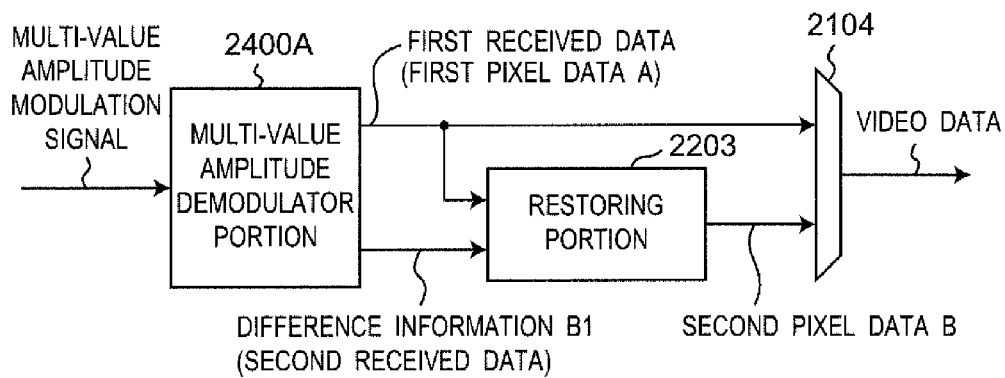
FIG. 36 is a block diagram showing a configuration of a receiver apparatus 2200B of the transmission system using the 4-value amplitude modulation method according to the eighth embodiment of the present disclosure.

FIG. 36 is a block diagram showing a configuration of a receiver apparatus 2200B of the transmission system using the 4-value amplitude modulation method according to the eighth embodiment of the present disclosure. As compared with the receiver apparatus 2200B of FIG. 30, the receiver apparatus 2200B of FIG. 36 is configured to include a multi-value amplitude demodulator portion 2400A of FIG. 37 instead of the multi-value amplitude demodulator portion 2400.

FIG. 37 is a block diagram showing components of the multi-value amplitude demodulator portion 2400A of FIG. 36. As compared with the multi-value amplitude demodulator portion 2400 of FIG. 31, the multi-value amplitude demodulator portion 2400A of FIG. 37 is configured to include an exclusive-OR circuit 2602 instead of the exclusive-NOR circuit 2102*a*. Referring to FIGS. 36 and 37, the exclusive-OR circuit 2602 inputs the first received data A1 and the second converted received data, converts the same to the second received data by calculating the difference information B1 by the exclusive-NOR operation, and outputs the second received data to the restoring portion 2203.

Referring to FIGS. 36 and 37, in case that the multi-value amplitude demodulator portion 2400A allocates the first bit of the multi-value amplitude modulation to the first received data, and the second bit of the multi-value amplitude modulation to the second received data, the multi-value amplitude demodulator portion 2400A demodulates the multi-value amplitude modulation signal to the first and second received data so that predetermined binary data corresponds to the multi-value signal level closest to the intermediate level having the intermediate value between the maximum level and the minimum level of the multi-value signal level of the multi-value amplitude modulation signal. The predetermined binary data is defined by such data that a predetermined first bit value "1" is allocated to the second bit of the predetermined binary data, where the occurrence probability of the predetermined first bit value "1" is larger than that of the predetermined second bit value "0".

In other words, in case that the multi-value amplitude demodulator portion 2400A allocates the first bit of the multi-value amplitude modulation to the first received data, and allocates the second bit of the multi-value amplitude modulation to the second received data, the multi-value amplitude demodulator portion 2400A demodulates the multi-value amplitude modulation signal to the first and second received data so that the predetermined binary data corresponds to the multi-value signal level of the maximum level and the minimum level of the multi-value signal level of the multi-value amplitude modulation signal. The predetermined binary data is defined by such data that the predetermined second bit value "0" is allocated to the second bit, where the occurrence probability of the predetermined second bit value "0" is lower than that of the predetermined first bit value "1".

An operation and an action of the transmission system including the transmitter apparatus 1100D and the receiver apparatus 2200B using the multi-value amplitude modulation method, as configured as described above, are similar to those of the seventh embodiment.

Each of FIGS. 358 to 35F is a table showing a modified embodiment of the multi-value signal level arrangement of the multi-value amplitude modulation signal generated by the multi-amplitude modulator portion 1300A of the transmitter apparatus 1100D of FIG. 32 based on first pixel data A and difference information B1, and showing a modified embodiment of the present embodiment. Referring to FIGS. 35B and 35E, it is possible to lower the average signal amplitude of the multi-value amplitude modulation signal and to reduce the consumed power of the transmission system by allocating the bit value "1" to the multi-value signal levels (+4 and +2) close to the intermediate level (+3) having the intermediate value between the maximum level (+6) and the minimum level (−6) of the multi-value signal level of the generated multi-value amplitude modulation signal. In addition, referring to FIGS. 35C and 35F, it is possible to lower the average signal amplitude of the multi-value amplitude modulation signal and to reduce the consumed power of the transmission system by allocating the bit value "1" to the multi-value signal levels (−2 and −4) close to the intermediate level (−3) having the intermediate value between the maximum level (0) and the minimum level (−6) of the multi-value signal level of the generated multi-value amplitude modulation signal. In addition, FIG. 35D is the same as FIG. 35A. It is noted that FIG. 35D is obtained by inverting bit values of the first pixel data A of FIG. 35A, FIG. 35E is obtained by inverting bit values of the first pixel data A of FIG. 35B, and FIG. 35F is obtained by inverting bit values of the first pixel data A of FIG. 35C.

First of all, the transmission system of the present embodiment allocates data obtained by performing an encoding process on the first pixel data A as the first transmission data to the first bit such as the highest-order bit or the most significant bit of the multi-value amplitude modulation, and allocates the difference information B1, which is calculated by the difference calculation between the first pixel data A and the second pixel data B to the second bit such as a lower bit of the multi-value amplitude modulation as data corresponding to the second pixel data B. In particular, the bit value "1" of the difference information B1 having a larger occurrence probability is allocated to the multi-value signal level closest to the intermediate level having the intermediate value between the maximum level and the minimum level of the multi-value signal level of the multi-value amplitude modulation signal. In other words, the bit value "0" of the difference information B1 having a smaller occurrence probability is allocated to the maximum level and the minimum level of the multi-value signal level of the multi-value amplitude modulation signal. Accordingly, it is possible to secure the same SN ratio as that of the binary transmission, and to reduce the consumed power as compared with the conventional transmission system of the multi-value amplitude modulation method.

In addition, according to the transmission systems of the embodiment as described above, the difference information between the adjacent pixel data is calculated by the operation such as the exclusive-NOR operation between the pixel data. Accordingly, it is possible to simplify a configuration and to reduce the consumed power as compared with the conventional transmission system of the multi-value amplitude modulation method. Further, it is possible to reduce the waste such as the continuous transmission of similar data.

In the embodiment as described above, the parallel to serial converter portions 1111a and 1111b are disposed in the right former stage of the amplitude adder portion 1112. However, the embodiment of the present disclosure is not limited thereto. Instead of this, the parallel to serial converter portions 1111a and 1111b may be disposed in the right post stage of the encoder portion 1205 and the bit addition portion 1206, respectively. In addition, the parallel to serial converter portions 1111a and 1111b may be disposed in the right former stage of the encoder portion 1205 and the bit addition portion 1206, respectively. In this case, it is possible to obtain the same advantageous effects as those of the present embodiment.

In addition, in the embodiment as described above, the case where the number of multi-values is set to 4 is described. However, the embodiment of the present disclosure is not limited thereto. For example, the number of multi-values may be set to a value other than 4 and equal to or more than 2, and may be more optimally set to be a power of two.

In addition, the configurations of the first to eighth embodiments and the modified embodiments thereof may be arbitrarily combined. For example, the encoder portion and the bit addition portion of the third embodiment are applied to the transmitter apparatuses of the first and second embodiments. In addition, the decoder portion of the third embodiment may be applied to the receiver apparatus of the first or second embodiment. In addition, the restoring portion of the fourth embodiment may be applied to the receiver apparatus of the first or second embodiment. In addition, the gray encode converter portion may be applied to the transmitter apparatuses of the other embodiments and the modified embodiments thereof. In addition, the gray encoding inverse converter portion may be applied to the receiver apparatuses of the other embodiments and the modified embodiments thereof. In addition, the delay portion and the average value calculator portion of the sixth embodiment may be applied to the transmitter apparatuses and the receiver apparatuses of the other embodiments and the modified embodiments thereof.

First Modified Embodiment

Figure 27:
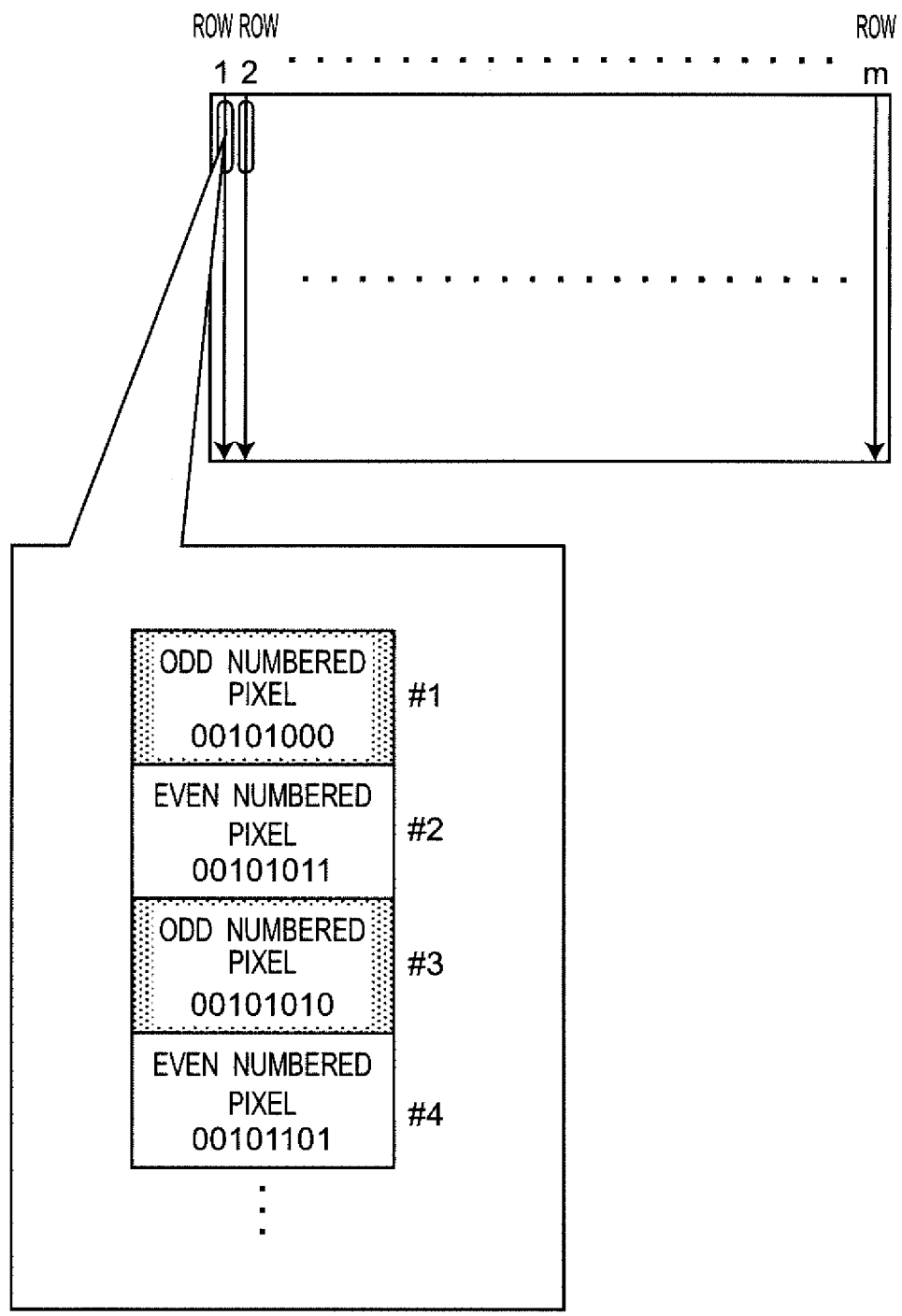
FIG. 27 is a diagram showing another example of an allocation of a video signal to a bit of the multi-value amplitude modulation signal.

In the embodiments as described above, the pixels included in the same horizontal line (that is, which are adjacent to each other in a transverse direction) are set as one data group. However, the embodiment of the present disclosure is not limited thereto. For example, as illustrated in FIG. 27, the pixels included in the same row (that is, which are adjacent to each other in a longitudinal direction) may be set as one data group. For example, the average value of the data of the adjacent two pixels in a transverse direction is calculated in the sixth embodiment. However, the embodiment of the present disclosure is not limited thereto. For example, the average value of the data of the adjacent two pixels in a longitudinal direction may be calculated.

Second Modified Embodiment

In addition, in the embodiments as described above, a case that the data of each color of the RGB signal are transmitted via separate transmission lines (total three transmission lines), respectively, and the data of each color transmitted by one transmission line is 8 bits per one pixel are described. However, the present disclosure is not limited thereto. For example, the number of multi-values may be set to a value other than 8 and equal to or more than 2. Further, in the embodiments as described above, the case that the RGB signal is transmitted is described. However, the present disclosure is not limited thereto. For example, the present disclosure may be configured to transmit a brightness signal and a color-difference signal. In addition, the signal of each pixel may be transmitted via one or two transmission lines in a lump, in addition, may be divided into transmission lines more than 4 and be transmitted via the divided transmission line. It is noted that in case that the number of bits of the pixel data is different from that of bits inputted to the encoder portion 1205, the first pixel data A and the difference information B1 are separated every the number of bits (in case of the 8B10B encoding, it is 8 bits) inputted to the encoder portion 1205, respectively, the encoding process in the encoder portion 1205 and the bit addition in the bit addition portion 1206 may be performed every this unit.

Third Modified Embodiment

In the transmission system according to the above embodiments as constituted above, the case that the transmission system transmits the multi-value amplitude modulation signal by performing the multi-value amplitude modulation of 2 bits or 3 bits per one symbol to the video data is described. However, the embodiment of the present disclosure is not limited thereto. For example, as a modified embodiment of the embodiments as described above, the present disclosure can be applied to a transmission system including a transmitter apparatus for generating and transmitting a multi-value amplitude modulation signal by performing a multi-value amplitude modulation of a plurality of N bits per one symbol according to video data, and a receiver apparatus for receiving the multi-value amplitude modulation signal transmitted from the transmitter apparatus and restoring the video data.

The transmission system includes a video data transmitter apparatus configured to generate and transmit a multi-value amplitude modulation signal by performing a multi-value amplitude modulation of a plurality of N bits per one symbol according to video data of data such as a video signal or a color signal constituting the video signal, or a brightness signal and a color-difference signal. The video data transmitter apparatus includes data separator means configured to separate the video data into first to N-th pixel data and output the first pixel data as first transmission data, a difference calculator means configured to calculate (N−1) pieces of predetermined difference information based on the separated first to N-th pixel data and to output the (N−1) pieces of predetermined difference information as second to N-th transmission data, and multi-value amplitude modulator means configured to perform the multi-value amplitude modulation according to N-bit data obtained by performing such a bit allocation that the first pixel data is allocated as the first transmission data to the highest-order bit or the most significant bit of the multi-value amplitude modulation signal, and the second to N-th transmission data are allocated to bits other than the highest-order bit or the most significant bit, where the N-bit data is obtained by allocating the bit value "0" of the second to N-th transmission data.

The multi-value amplitude modulator means may include an exclusive-NOR circuit for converting the second to N-th transmission data to second to N-th converted transmission data by performing an exclusive-NOR operation between each of the second to N-th transmission data and the first pixel data, and outputting the second to N-th converted transmission data, and multi-value amplitude modulation means for performing the multi-value amplitude modulation according to the allocated N bits.

The difference calculator means may calculate the (N−1) pieces of predetermined difference information between each of n-th (2≤n≤N) pixel data of the separated first to N-th pixel data and a predetermined n-th reference data corresponding to each of the n-th pixel data.

Each of the n-th reference data is a (n−1)-th pixel data adjacent to each of the n-th pixel data, respectively, and the difference calculator means may calculate the (N−1) pieces of predetermined difference information by performing an exclusive-OR operation between each of the n-th pixel data and each of the (n−1)-th pixel data, respectively, or by subtracting each of the (n−1)-th pixel data from each of the n-th pixel data, respectively.

In addition, the difference calculator means may include an average value calculator portion configured to calculate an average value between each of (n−1)-th pixel data adjacent to each of n-th pixel data, respectively, and each of (n+1)-th pixel data, and output the average value as each of the n-th reference data, and the difference calculator means may calculate the (N−1) pieces of predetermined difference information by subtracting each of the n-th reference data from each of the n-th pixel data, respectively.

In addition, the transmitter apparatus may further include an encoder portion configured to perform an encoding process on the first pixel data and output encoded data as the first transmission data. In addition, the transmitter apparatus may further include a bit addition portion configured to add bits to each of the difference information so that a number of bits of each of the difference information is equal to that of the first transmission data increased by the encoding process, and output the resulting data as the second to N-th transmission data. Further, the transmitter apparatus may further include a gray encode converter portion configured to convert video data in binary notation to video data in gray encode notation, and output converted data to the data separator portion.

Further, the transmission system includes a video data receiver apparatus configured to receive, demodulate, and restore multi-value amplitude modulation signal transmitted by performing the multi-value amplitude modulation of the plurality of N bits per one symbol according to video data of data such as a video signal or a color signal constituting the video signal, or a brightness signal and a color-difference signal. The video data receiver apparatus may include multi-value demodulator means configured to demodulate the multi-value amplitude modulation signal to first received data and second to N-th converted received data, and output the first received data as first pixel data, and (N−1) restoring means configured to calculate (N−1) pieces of predetermined difference information and restores second to N-th pixel data based on the demodulated first pixel data and the second to N-th converted received data.

The restoring means may include an exclusive-NOR circuit configured to calculate (N−1) pieces of predetermined difference information by performing an exclusive-NOR operation between the second to N-th converted received data and the first received data, respectively, and a restoring portion configured to restore the (N−1) pieces of predetermined difference information and the first to N-th pixel data to generate and output the second to N-th pixel data.

The exclusive-NOR circuit may calculate (N−1) pieces of predetermined difference information between each of n-th (2≤n≤N) pixel data of the first to N-th pixel data and each of n-th reference data corresponding to each of the n-th pixel data.

Each of the n-th reference data is a (n−1)-th pixel data adjacent to each of the n-th pixel data, respectively, and the restoring portion may restore the second to N-th pixel data by performing an exclusive-OR operation between each of the n-th pixel data and each of the (n−1) pixel data, or by adding each of the n-th pixel data to each of the (n−1)-th pixel data.

In addition, the restoring means may further include an average value calculator portion configured to calculate an average value between each of (n−1)-th pixel data adjacent to each of n-th pixel and each of (n+1)-th pixel data, and output the average value to the restoring portion, and the restoring portion may restore input data to the second to N-th pixel data by adding each of the n-th pixel data to each of the n-th reference data, and may output the second to N-th pixel data.

In addition, the receiver apparatus may further include a decoder portion configured to perform a decoding process on the first received data and output decoded data as the first pixel data. Further, the receiver apparatus may further include a gray encoding inverse converter portion configured to convert data in gray encode notation outputted from the data coupler portion to data in binary notation. Furthermore, the receiver apparatus may further include a data coupler portion configured to rearranges the first to N-th pixel data in an original order, and outputs rearranged data.

Fourth Modified Embodiment

In the transmission system according to the above embodiments as constituted above, the case that the transmission system transmits the multi-value amplitude modulation signal by performing the multi-value amplitude modulation of 2 bits or 3 bits per one symbol to the video data is described. However, the embodiment of the present disclosure is not limited thereto. For example, as a modified embodiment of the embodiments as described above, the present disclosure can be applied to a transmission system including a transmitter apparatus for generating and transmitting a multi-value amplitude modulation signal by performing a multi-value amplitude modulation of a plurality of N bits per one symbol according to video data, and a receiver apparatus for receiving the multi-value amplitude modulation signal transmitted from the transmitter apparatus and restoring the video data.

The transmission system includes a video data transmitter apparatus configured to generate and transmit a multi-value amplitude modulation signal by performing a multi-value amplitude modulation of a plurality of N bits per one symbol according to video data of data such as a video signal or a color signal constituting the video signal, or a brightness signal and a color-difference signal. The video data transmitter apparatus includes a data separator portion configured to separate the video data into first to N-th pixel data, and a difference calculator portion configured to calculate (N−1) pieces of predetermined difference information based on the separated first to N-th pixel data. The video data transmitter apparatus includes a multi-value amplitude modulator portion configured to perform a multi-value modulation on the (N−1) pieces of predetermined difference information so that predetermined N-bit data corresponds to a multi-value signal level closest to an intermediate level having an intermediate value between a maximum level and a minimum level of the multi-value signal level of the multi-value amplitude modulation signal, when the first pixel data or data obtained by performing an encoding process on the first pixel data is allocated to a first bit of the multi-value amplitude modulation as first transmission data, and when the respective pieces of differential information or data obtained by adding one bit or a plurality of predetermined bits to the respective pieces of differential information are respectively allocated to second to N-th bits of the multi-value amplitude modulation as second to N-th transmission data. A predetermined first bit value of the predetermined N-bit data is allocated to the second to N-th bits, and an occurrence probability of the predetermined first bit value of the predetermined N-bit data is higher than that of a predetermined second bit value.

The predetermined first bit value may be "0", and the predetermined second bit value may be "1".

In addition, for example, the transmission system includes a video data transmitter apparatus configured to generate and transmit a multi-value amplitude modulation signal by performing a multi-value amplitude modulation of a plurality of N bits per one symbol according to video data of a video signal or a color signal constituting the video signal, or a brightness signal and a color-difference signal. The video data transmitter apparatus includes a data separator portion configured to separate the video data into first to N-th pixel data, and a difference calculator portion configured to calculate (N−1) pieces of predetermined difference information based on the separated first to N-th pixel data. The video data transmitter apparatus includes a multi-value amplitude modulator portion configured to perform a multi-value modulation on the (N−1) pieces of predetermined difference information so that predetermined N-bit data corresponds to a maximum level and a minimum level of the multi-value signal level of the multi-value amplitude modulation signal, when the first pixel data or data obtained by performing an encoding process on the first pixel data is allocated to a first bit of the multi-value amplitude modulation as first transmission data, and when the respective pieces of differential information or data obtained by adding one bit or a plurality of predetermined bits to the respective pieces of differential information are respectively allocated to second to N-th bits of the multi-value amplitude modulation as second to N-th transmission data. A predetermined second bit value of the predetermined N-bit data is allocated to the second to N-th bits, and an occurrence probability of the predetermined second bit value of the predetermined N-bit data is lower than that of a predetermined first bit value.

The predetermined first bit value may be "0", and the predetermined second bit value may be "1".

Further, the transmission apparatus may further include an encoder portion configured to perform an encoding process on the first pixel data and to output encoded data as the first transmission data. Furthermore, the transmission apparatus may further include a bit addition portion configured to add one bit or a plurality of predetermined bits to each of the difference information so that a number of bits of each of the difference information is equal to that of the first transmission data, and to output resulting data as the second to N-th transmission data, when a number of bits of the first transmission data is larger than that of the first pixel data by the encoding process. In addition, the multi-value amplitude modulator portion may include an exclusive-NOR circuit configured to convert the second to N-th transmission data to second to N-th converted transmission data by performing an exclusive-NOR operation between each of the second to N-th transmission data and the first transmission data, and to output the second to N-th converted transmission data, and a multi-value amplitude modulation signal generator portion configured to generate a multi-value amplitude modulation signal based on the first transmission data and the second to N-th converted transmission data.

In addition, the difference calculator portion may calculate the (N−1) pieces of predetermined difference information by performing a predetermined operation including at least one of exclusive-OR and subtraction. Further, the difference calculator portion may calculate the (N−1) pieces of predetermined difference information between each of n-th (2≤n≤N) pixel data of the separated first to N-th pixel data and each of predetermined n-th reference data corresponding to each of the n-th pixel data. Furthermore, each of the n-th reference data is each of (n−1)-th pixel data adjacent to each of the n-th pixel data, respectively, and the difference calculator portion may calculate the (N−1) pieces of predetermined difference information by performing an exclusive-OR operation between each of the n-th pixel data and each of the (n−1)-th pixel data, or may calculate the (N−1) pieces of predetermined difference information by subtracting each of the (n−1)-th pixel data from each of the n-th pixel data.

In addition, the difference calculator portion may include an average value calculator portion configured to calculate an average value between each of (n−1)-th pixel data and each of (n+1)-th pixel data adjacent to each of n-th pixel data, and to output the average value as each of the n-th reference data, and the difference calculator portion may calculate the (N−1) pieces of predetermined difference information by subtracting each of the n-th reference data from each of the n-th pixel data, respectively. Further, the video data transmitter apparatus may further includes a gray encode converter portion configured to convert video data in binary notation to video data in gray encode notation, and to output the video data in gray encode notation as the video data to the data separator portion.

Further, for example, the transmission system includes a video data receiver apparatus configured to receive, demodulate, and restore a multi-value amplitude modulation signal transmitted by performing a multi-value amplitude modulation of a plurality of N bits per one symbol according to video data of a video signal or a color signal constituting the video signal, or a brightness signal and a color-difference signal. The video data receiver apparatus includes a multi-value amplitude demodulator portion configured to demodulate the multi-value amplitude modulation signal to first to N-th received data so that predetermined N-bits data corresponds to a multi-value signal level closest to an intermediate level having an intermediate value between a maximum level and a minimum level of the multi-value signal level of the multi-value amplitude modulation signal, when a first bit of the multi-value amplitude modulation is allocated to the first received data, and second to N-th bits of the multi-value amplitude modulation are allocated to the second to N-th received data. The video data receiver apparatus includes a restoring portion configured to restore to second to N-th pixel data based on the demodulated first received data and the second to N-th received data of (N−1) pieces of predetermined difference information. A predetermined first bit value of the predetermined N-bit data is allocated to the second to N-th bits, and an occurrence probability of the predetermined first bit value of the predetermined N-bit data is higher than that of a predetermined second bit value.

The predetermined first bit value may be "0", and the predetermined second bit value may be "1".

In addition, for example, the transmission system includes a video data receiver apparatus configured to receive, demodulate, and restore a multi-value amplitude modulation signal transmitted by performing a multi-value amplitude modulation of a plurality of N bits per one symbol according to video data of a video signal or a color signal constituting the video signal, or a brightness signal and a color-difference signal. The video data receiver apparatus includes a multi-value amplitude demodulator portion configured to demodulate the multi-value amplitude modulation signal to first to N-th received data so that predetermined N-bits data corresponds to a multi-value signal level of a maximum level and a minimum level of the multi-value amplitude modulation signal, when a first bit of the multi-value amplitude modulation is allocated to the first received data, and second to N-th bits of the multi-value amplitude modulation are allocated to the second to N-th received data. The video data receiver apparatus includes a restoring portion configured to restore to second to N-th pixel data based on the demodulated first received data and the second to N-th received data of (N−1) pieces of predetermined difference information. A predetermined second bit value of the predetermined N-bit data is allocated to the second to N-th bits, and an occurrence probability of the predetermined second bit value of the predetermined N-bit data is lower than that of a predetermined first bit value.

The predetermined first bit value may be "0", and the predetermined second bit value may be "1".

Further, the multi-value amplitude demodulator portion may further include a decoder portion configured to perform a decoding process on the first received data, and to output decoded data as first pixel data. Furthermore, the multi-value amplitude demodulator portion may include a multi-value demodulator portion configured to demodulate to first received data and second to N-th converted received data based on the multi-value amplitude modulation signal, and an exclusive-NOR circuit configured to convert the second to N-th converted received data to the second to N-th received data by performing an exclusive-NOR operation between each of the second to N-th converted received data and the first received data, and to output the second to N-th received data. In addition, the restoring portion may restore the second to N-th pixel data by performing an operation between each of n-th (2≤n≤N) received data of the first to N-th received data and each of n-th reference data corresponding to each of the n-th received data.

Further, each of the n-th reference data is each of (n−1)-th pixel data adjacent to each of the n-th pixel data, respectively, and the restoring portion may restore to the second to N-th pixel data by performing an exclusive-OR operation between each of the n-th received data and each of the (n−1) pixel data, and outputs the second to N-th pixel data, or may restore to the second to N-th pixel data by adding each of the n-th received data to each of the (n−1)-th pixel data, and outputs the second to N-th pixel data. Furthermore, the receiver apparatus may further include an average value calculator portion configured to calculate an average value between each of (n−1)-th pixel data and each of (n+1)-th pixel data adjacent to each of n-th pixel data, and to output the average value as n-th reference data to the restoring portion, and the restoring portion may restore to the second to N-th pixel data by adding each of the n-th received data to each of the n-th reference data, and may output the second to N-th pixel data. In addition, the receiver apparatus may further include a data coupler portion configured to rearranges the first to N-th pixel data to an original order, and outputs rearranged data. Further, the receiver apparatus may further include a gray encoding inverse converter portion configured to convert data in gray encode notation outputted from the data coupler portion to data in binary notation.

In addition, for example, there is provided a video data transmitting method of the present embodiment for generating and transmitting a multi-value amplitude modulation signal by performing a multi-value amplitude modulation of a plurality of N bits per one symbol according to video data of a video signal or a color signal constituting the video signal, or a brightness signal and a color-difference signal. The video data transmitting method includes the step of separating the video data into first to N-th pixel data, calculating (N−1) pieces of predetermined difference information based on the separated first to N-th pixel data, and performing a multi-value modulation on the (N−1) pieces of predetermined difference information so that predetermined N-bit data corresponds to a multi-value signal level closest to an intermediate level having an intermediate value between a maximum level and a minimum level of the multi-value signal level of the multi-value amplitude modulation signal, when the first pixel data or data obtained by performing an encoding process on the first pixel data is allocated to a first bit of the multi-value amplitude modulation as first transmission data, and when the respective pieces of differential information or data obtained by adding one bit or a plurality of predetermined bits to the respective pieces of differential information are respectively allocated to second to N-th bits of the multi-value amplitude modulation as second to N-th transmission data. A predetermined first bit value of the predetermined N-bit data is allocated to the second to N-th bits, and an occurrence probability of the predetermined first bit value of the predetermined N-bit data is higher than that of a predetermined second bit value.

Further, for example, there is provided a video data receiving method of the present embodiment for receiving, demodulating, and restoring a multi-value amplitude modulation signal transmitted by performing a multi-value amplitude modulation of a plurality of N bits per one symbol according to video data of a video signal or a color signal constituting the video signal, or a brightness signal and a color-difference signal. The video data receiving method includes the step of demodulating the multi-value amplitude modulation signal to first to N-th received data so that predetermined N-bits data corresponds to a multi-value signal level closest to an intermediate level having an intermediate value between a maximum level and a minimum level of the multi-value signal level of the multi-value amplitude modulation signal, when a first bit of the multi-value amplitude modulation is allocated to the first received data, and second to N-th bits of the multi-value amplitude modulation are allocated to the second to N-th received data, and restoring to second to N-th pixel data based on the demodulated first received data and the second to N-th received data of (N−1) pieces of predetermined difference information A predetermined first bit value of the predetermined N-bit data is allocated to the second to N-th bits, and an occurrence probability of the predetermined first bit value of the predetermined N-bit data is higher than that of a predetermined second bit value.

Furthermore, for example, the transmission system includes a video data transmitter apparatus configured to generate and transmit a multi-value amplitude modulation signal by performing a multi-value amplitude modulation of a plurality of N bits per one symbol according to video data of a video signal or a color signal constituting the video signal, or a brightness signal and a color-difference signal. The video data transmitter apparatus includes a data separator portion configured to separate the video data into first to N-th pixel data, and a difference calculator portion configured to calculate (N−1) pieces of predetermined difference information by performing an operation including at least an exclusive-NOR based on the separated first to N-th pixel data. The video data transmitter apparatus includes a multi-value amplitude modulator portion configured to perform a multi-value modulation on the (N−1) pieces of predetermined difference information so that predetermined N-bit data corresponds to a multi-value signal level closest to an intermediate level having an intermediate value between a maximum level and a minimum level of the multi-value signal level of the multi-value amplitude modulation signal, when the first pixel data or data obtained by performing an encoding process on the first pixel data is allocated to a first bit of the multi-value amplitude modulation as first transmission data, and when the respective pieces of differential information or data obtained by adding one bit or a plurality of predetermined bits to the respective pieces of differential information are respectively allocated to second to N-th bits of the multi-value amplitude modulation as second to N-th transmission data. A predetermined first bit value of the predetermined N-bit data is allocated to the second to N-th bits, and an occurrence probability of the predetermined first bit value of the predetermined N-bit data is higher than that of a predetermined second bit value.

In addition, for example, the transmission system includes a video data transmitter apparatus configured to generate and transmit a multi-value amplitude modulation signal by performing a multi-value amplitude modulation of a plurality of N bits per one symbol according to video data of a video signal or a color signal constituting the video signal, or a brightness signal and a color-difference signal. The video data transmitter apparatus includes a data separator portion configured to separate the video data into first to N-th pixel data, and a difference calculator portion configured to calculate (N−1) pieces of predetermined difference information by performing an operation including at least an exclusive-NOR based on the separated first to N-th pixel data. The video data transmitter apparatus includes a multi-value amplitude modulator portion configured to perform a multi-value modulation on the (N−1) pieces of predetermined difference information so that predetermined N-bit data corresponds to a maximum level and a minimum level of the multi-value signal level of the multi-value amplitude modulation signal, when the first pixel data or data obtained by performing an encoding process on the first pixel data is allocated to a first bit of the multi-value amplitude modulation as first transmission data, and when the respective pieces of differential information or data obtained by adding one bit or a plurality of predetermined bits to the respective pieces of differential information are respectively allocated to second to N-th bits of the multi-value amplitude modulation as second to N-th transmission data. A predetermined second bit value of the predetermined N-bit data is allocated to the second to N-th bits, and an occurrence probability of the predetermined second bit value of the predetermined N-bit data is lower than that of a predetermined first bit value.

What is claimed is:

1. A video data transmitter apparatus configured to generate and transmit a multi-value amplitude modulation signal by performing a multi-value amplitude modulation of a plurality of N bits per one symbol according to video data of a video signal or a color signal constituting the video signal, or a brightness signal and a color-difference signal, the video data transmitter apparatus comprising:

a data separator portion configured to separate the video data into first to N-th pixel data, a difference calculator portion configured to calculate (N−1) pieces of predetermined difference information based on the separated first to N-th pixel data, a multi-value amplitude modulator portion configured to perform a multi-value modulation on the (N−1) pieces of predetermined difference information so that predetermined N-bit data corresponds to a multi-value signal level closest to an intermediate level having an intermediate value between a maximum level and a minimum level of the multi-value signal level of the multi-value amplitude modulation signal, when the first pixel data or data obtained by performing an encoding process on the first pixel data is allocated to a first bit of the multi-value amplitude modulation as first transmission data, and when the respective pieces of differential information or data obtained by adding one bit or a plurality of predetermined bits to the respective pieces of differential information are respectively allocated to second to N-th bits of the multi-value amplitude modulation as second to N-th transmission data, wherein a predetermined first bit value of the predetermined N-bit data is allocated to the second to N-th bits, and wherein an occurrence probability of the predetermined first bit value of the predetermined N-bit data is higher than that of a predetermined second bit value.

2. The video data transmitter apparatus as claimed in claim 1, wherein the predetermined first bit value is "0", and the predetermined second bit value is "1".

3. The video data transmitter apparatus as claimed in claim 1, wherein the multi-value amplitude modulator portion includes an encoder portion configured to perform an encoding process on the first pixel data and to output encoded data as the first transmission data.

4. The video data transmitter apparatus as claimed in claim 3, wherein the multi-value amplitude modulator portion further includes a bit addition portion configured to add one bit or a plurality of predetermined bits to each of the difference information so that a number of bits of each of the difference information is equal to that of the first transmission data, and to output resulting data as the second to N-th transmission data, when a number of bits of the first transmission data is larger than that of the first pixel data by the encoding process.

5. The video data transmitter apparatus as claimed in claim 3, wherein the multi-value amplitude modulator portion comprises:

an exclusive-NOR circuit configured to convert the second to N-th transmission data to second to N-th converted transmission data by performing an exclusive-NOR operation between each of the second to N-th transmission data and the first transmission data, and to output the second to N-th converted transmission data, and a multi-value amplitude modulation signal generator portion configured to generate a multi-value amplitude modulation signal based on the first transmission data and the second to N-th converted transmission data.

6. The video data transmitter apparatus as claimed in claim 1, wherein the difference calculator portion calculates the (N−1) pieces of predetermined difference information by performing a predetermined operation including at least one of exclusive-OR and subtraction.

7. The video data transmitter apparatus as claimed in claim 1, wherein the difference calculator portion calculates the (N−1) pieces of predetermined difference information between each of n-th (2≤n≤N) pixel data of the separated first to N-th pixel data and each of predetermined n-th reference data corresponding to each of the n-th pixel data.

8. The video data transmitter apparatus as claimed in claim 7, wherein each of the n-th reference data is each of (n−1)-th pixel data adjacent to each of the n-th pixel data, respectively, and wherein the difference calculator portion calculates the (N−1) pieces of predetermined difference information by performing an exclusive-OR operation between each of the n-th pixel data and each of the (n−1)-th pixel data.

9. The video data transmitter apparatus as claimed in claim 7, wherein each of the n-th reference data is each of (n−1)-th pixel data adjacent to each of the n-th pixel data, respectively, and wherein the difference calculator portion calculates the (N−1) pieces of predetermined difference information by subtracting each of the (n−1)-th pixel data from each of the n-th pixel data.

10. The video data transmitter apparatus as claimed in claim 7, wherein the difference calculator portion includes an average value calculator portion configured to calculate an average value between each of (n−1)-th pixel data and each of (n+1)-th pixel data adjacent to each of n-th pixel data, and to output the average value as each of the n-th reference data, and wherein the difference calculator portion calculates the (N−1) pieces of predetermined difference information by subtracting each of the n-th reference data from each of the n-th pixel data, respectively.

11. The video data transmitter apparatus as claimed in claim 1, wherein the video data transmitter apparatus further includes a gray encode converter portion configured to convert video data in binary notation to video data in gray encode notation, and to output the video data in gray encode notation as the video data to the data separator portion.

12. A video data transmitter apparatus configured to generate and transmit a multi-value amplitude modulation signal by performing a multi-value amplitude modulation of a plurality of N bits per one symbol according to video data of a video signal or a color signal constituting the video signal, or a brightness signal and a color-difference signal, the video data transmitter apparatus comprising:
- a data separator portion configured to separate the video data into first to N-th pixel data,
- a difference calculator portion configured to calculate (N−1) pieces of predetermined difference information based on the separated first to N-th pixel data,
- a multi-value amplitude modulator portion configured to perform a multi-value modulation on the (N−1) pieces of predetermined difference information so that predetermined N-bit data corresponds to a maximum level and a minimum level of the multi-value signal level of the multi-value amplitude modulation signal, when the first pixel data or data obtained by performing an encoding process on the first pixel data is allocated to a first bit of the multi-value amplitude modulation as first transmission data, and when the respective pieces of differential information or data obtained by adding one bit or a plurality of predetermined bits to the respective pieces of differential information are respectively allocated to second to N-th bits of the multi-value amplitude modulation as second to N-th transmission data,
- wherein a predetermined second bit value of the predetermined N-bit data is allocated to the second to N-th bits, and
- wherein an occurrence probability of the predetermined second bit value of the predetermined N-bit data is lower than that of a predetermined first bit value.

13. The video data transmitter apparatus as claimed in claim 12,
- wherein the predetermined first bit value is "0", and the predetermined second bit value is "1".

14. A video data receiver apparatus configured to receive, demodulate, and restore a multi-value amplitude modulation signal transmitted by performing a multi-value amplitude modulation of a plurality of N bits per one symbol according to video data of a video signal or a color signal constituting the video signal, or a brightness signal and a color-difference signal, the video data receiver apparatus comprising:
- a multi-value amplitude demodulator portion configured to demodulate the multi-value amplitude modulation signal to first to N-th received data so that predetermined N-bits data corresponds to a multi-value signal level closest to an intermediate level having an intermediate value between a maximum level and a minimum level of the multi-value signal level of the multi-value amplitude modulation signal, when a first bit of the multi-value amplitude modulation is allocated to the first received data, and second to N-th bits of the multi-value amplitude modulation are allocated to the second to N-th received data, and
- a restoring portion configured to restore to second to N-th pixel data based on the demodulated first received data and the second to N-th received data of (N−1) pieces of predetermined difference information,
- wherein a predetermined first bit value of the predetermined N-bit data is allocated to the second to N-th bits, and
- wherein an occurrence probability of the predetermined first bit value of the predetermined N-bit data is higher than that of a predetermined second bit value.

15. The video data transmitter apparatus as claimed in claim 14,
- wherein the predetermined first bit value is "0", and the predetermined second bit value is "1".

16. A video data receiver apparatus configured to receive, demodulate, and restore a multi-value amplitude modulation signal transmitted by performing a multi-value amplitude modulation of a plurality of N bits per one symbol according to video data of a video signal or a color signal constituting the video signal, or a brightness signal and a color-difference signal, the video data receiver apparatus comprising:
- a multi-value amplitude demodulator portion configured to demodulate the multi-value amplitude modulation signal to first to N-th received data so that predetermined N-bits data corresponds to a multi-value signal level of a maximum level and a minimum level of the multi-value amplitude modulation signal, when a first bit of the multi-value amplitude modulation is allocated to the first received data, and second to N-th bits of the multi-value amplitude modulation are allocated to the second to N-th received data, and
- a restoring portion configured to restore to second to N-th pixel data based on the demodulated first received data and the second to N-th received data of (N−1) pieces of predetermined difference information,
- wherein a predetermined second bit value of the predetermined N-bit data is allocated to the second to N-th bits, and
- wherein an occurrence probability of the predetermined second bit value of the predetermined N-bit data is lower than that of a predetermined first bit value.

17. The video data receiver apparatus as claimed in claim 16,
- wherein the predetermined first bit value is "0", and the predetermined second bit value is "1".

18. The video data receiver apparatus as claimed in claim 14,
- wherein the multi-value amplitude demodulator portion includes a decoder portion configured to perform a decoding process on the first received data, and to output decoded data as first pixel data.

19. The video data receiver apparatus as claimed in claim 18,
- wherein the multi-value amplitude demodulator portion includes a multi-value demodulator portion configured to demodulate to first received data and second to N-th converted received data based on the multi-value amplitude modulation signal, and
- an exclusive-NOR circuit configured to convert the second to N-th converted received data to the second to N-th received data by performing an exclusive-NOR operation between each of the second to N-th converted received data and the first received data, and to output the second to N-th received data.

20. The video data receiver apparatus as claimed in claim 14,
- wherein the restoring portion restores the second to N-th pixel data by performing an operation between each of n-th (2≤n≤N) received data of the first to N-th received data and each of n-th reference data corresponding to each of the n-th received data.

21. The video data receiver apparatus as claimed in claim 20,
- wherein each of the n-th reference data is each of (n−1)-th pixel data adjacent to each of the n-th pixel data, respectively, and
- wherein the restoring portion restores to the second to N-th pixel data by performing an exclusive-OR operation between each of the n-th received data and each of the (n−1) pixel data, and outputs the second to N-th pixel data.

22. The video data receiver apparatus as claimed in claim 20, wherein each of the n-th reference data is each of (n−1)-th pixel data adjacent to each of the n-th pixel data, respectively, and wherein the restoring portion restores to the second to N-th pixel data by adding each of the n-th received data to each of the (n−1)-th pixel data, and outputs the second to N-th pixel data.

23. The video data receiver apparatus as claimed in claim 20, wherein the video data receiver apparatus further includes an average value calculator portion configured to calculate an average value between each of (n−1)-th pixel data and each of (n+1)-th pixel data adjacent to each of n-th pixel data, and to output the average value as n-th reference data to the restoring portion, and wherein the restoring portion restores to the second to N-th pixel data by adding each of the n-th received data to each of the n-th reference data, and outputs the second to N-th pixel data.

24. The video data receiver apparatus as claimed in claim 14, wherein the video data receiver apparatus further includes a data coupler portion configured to rearranges the first to N-th pixel data to an original order, and outputs rearranged data.

25. The video data receiver apparatus as claimed in claim 24, wherein the video data receiver apparatus further includes a gray encoding inverse converter portion configured to convert data in gray encode notation outputted from the data coupler portion to data in binary notation.

26. A video data transmitting method for generating and transmitting a multi-value amplitude modulation signal by performing a multi-value amplitude modulation of a plurality of N bits per one symbol according to video data of a video signal or a color signal constituting the video signal, or a brightness signal and a color-difference signal, the video data transmitter method including the step of:

separating the video data into first to N-th pixel data, calculating (N−1) pieces of predetermined difference information based on the separated first to N-th pixel data, performing a multi-value modulation on the (N−1) pieces of predetermined difference information so that predetermined N-bit data corresponds to a multi-value signal level closest to an intermediate level having an intermediate value between a maximum level and a minimum level of the multi-value signal level of the multi-value amplitude modulation signal, when the first pixel data or data obtained by performing an encoding process on the first pixel data is allocated to a first bit of the multi-value amplitude modulation as first transmission data, and when the respective pieces of differential information or data obtained by adding one bit or a plurality of predetermined bits to the respective pieces of differential information are respectively allocated to second to N-th bits of the multi-value amplitude modulation as second to N-th transmission data, wherein a predetermined first bit value of the predetermined N-bit data is allocated to the second to N-th bits, and wherein an occurrence probability of the predetermined first bit value of the predetermined N-bit data is higher than that of a predetermined second bit value.

27. A video data receiving method for receiving, demodulating, and restoring a multi-value amplitude modulation signal transmitted by performing a multi-value amplitude modulation of a plurality of N bits per one symbol according to video data of a video signal or a color signal constituting the video signal, or a brightness signal and a color-difference signal, the video data receiving method including the step of:

demodulating the multi-value amplitude modulation signal to first to N-th received data so that predetermined N-bits data corresponds to a multi-value signal level closest to an intermediate level having an intermediate value between a maximum level and a minimum level of the multi-value signal level of the multi-value amplitude modulation signal, when a first bit of the multi-value amplitude modulation is allocated to the first received data, and second to N-th bits of the multi-value amplitude modulation are allocated to the second to N-th received data, and restoring to second to N-th pixel data based on the demodulated first received data and the second to N-th received data of (N−1) pieces of predetermined difference information, wherein a predetermined first bit value of the predetermined N-bit data is allocated to the second to N-th bits, and wherein an occurrence probability of the predetermined first bit value of the predetermined N-bit data is higher than that of a predetermined second bit value.

28. A video data transmitter apparatus configured to generate and transmit a multi-value amplitude modulation signal by performing a multi-value amplitude modulation of a plurality of N bits per one symbol according to video data of a video signal or a color signal constituting the video signal, or a brightness signal and a color-difference signal, the video data transmitter apparatus comprising:

a data separator portion configured to separate the video data into first to N-th pixel data, a difference calculator portion configured to calculate (N−1) pieces of predetermined difference information by performing an operation including at least an exclusive-NOR based on the separated first to N-th pixel data, a multi-value amplitude modulator portion configured to perform a multi-value modulation on the (N−1) pieces of predetermined difference information so that predetermined N-bit data corresponds to a multi-value signal level closest to an intermediate level having an intermediate value between a maximum level and a minimum level of the multi-value signal level of the multi-value amplitude modulation signal, when the first pixel data or data obtained by performing an encoding process on the first pixel data is allocated to a first bit of the multi-value amplitude modulation as first transmission data, and when the respective pieces of differential information or data obtained by adding one bit or a plurality of predetermined bits to the respective pieces of differential information are respectively allocated to second to N-th bits of the multi-value amplitude modulation as second to N-th transmission data, wherein a predetermined first bit value of the predetermined N-bit data is allocated to the second to N-th bits, and wherein an occurrence probability of the predetermined first bit value of the predetermined N-bit data is higher than that of a predetermined second bit value.

29. A video data transmitter apparatus configured to generate and transmit a multi-value amplitude modulation signal by performing a multi-value amplitude modulation of a plurality of N bits per one symbol according to video data of a video signal or a color signal constituting the video signal, or a brightness signal and a color-difference signal, the video data transmitter apparatus comprising:
- a data separator portion configured to separate the video data into first to N-th pixel data,
- a difference calculator portion configured to calculate (N−1) pieces of predetermined difference information by performing an operation including at least an exclusive-NOR based on the separated first to N-th pixel data,
- a multi-value amplitude modulator portion configured to perform a multi-value modulation on the (N−1) pieces of predetermined difference information so that predetermined N-bit data corresponds to a maximum level and a minimum level of the multi-value signal level of the multi-value amplitude modulation signal, when the first pixel data or data obtained by performing an encoding process on the first pixel data is allocated to a first bit of the multi-value amplitude modulation as first transmission data, and when the respective pieces of differential information or data obtained by adding one bit or a plurality of predetermined bits to the respective pieces of differential information are respectively allocated to second to N-th bits of the multi-value amplitude modulation as second to N-th transmission data,
- wherein a predetermined second bit value of the predetermined N-bit data is allocated to the second to N-th bits, and
- wherein an occurrence probability of the predetermined second bit value of the predetermined N-bit data is lower than that of a predetermined first bit value.

* * * * *